United States Patent [19]
Kida et al.

[11] Patent Number: 5,455,955
[45] Date of Patent: Oct. 3, 1995

[54] DATA PROCESSING SYSTEM WITH DEVICE FOR ARRANGING INSTRUCTIONS

[75] Inventors: Hiroyuki Kida; Hideo Maejima; Ikuro Masuda, all of Hitachi; Shirou Baba, Tokorozawa, all of Japan

[73] Assignee: Hitachi, Ltd., Tokyo, Japan

[21] Appl. No.: 951,772

[22] Filed: Sep. 28, 1992

Related U.S. Application Data

[60] Continuation of Ser. No. 625,992, Dec. 11, 1990, abandoned, which is a division of Ser. No. 849,307, Apr. 8, 1986, abandoned.

[30] Foreign Application Priority Data

Apr. 8, 1985 [JP] Japan ................................. 60-072646
Aug. 14, 1985 [JP] Japan ................................. 60-177542

[51] Int. Cl.$^6$ .............................. G06F 9/26; G06F 9/30; G06F 9/32
[52] U.S. Cl. ................... 395/800; 364/229.5; 364/238.6; 364/255.8; 364/267.8; 364/262.2; 364/262.8; 364/262.9; 364/263.3; 364/259.9; 364/DIG. 1; 364/DIG. 2; 364/261.5
[58] Field of Search ..................... 395/800, 325, 395/250, 500, 550, 275, 375, 400, 425, 650, 775, 725, 600; 364/DIG. 1, DIG. 2

[56] References Cited

U.S. PATENT DOCUMENTS

| | | | |
|---|---|---|---|
| 4,481,581 | 11/1984 | Johnson | 395/725 |
| 4,594,661 | 6/1986 | Moore et al. | 364/DIG. 1 |
| 4,615,005 | 9/1986 | Maejima et al. | 395/550 |
| 4,674,063 | 6/1987 | Sato | 395/375 |
| 4,680,701 | 7/1987 | Cochran | 395/375 |
| 4,713,750 | 12/1987 | Damouny et al. | 395/800 |
| 4,825,363 | 4/1989 | Baumann et al. | 395/375 |
| 4,905,277 | 2/1990 | Nakamura | 380/4 |
| 5,043,870 | 8/1991 | Ditzel et al. | 395/425 |

*Primary Examiner*—Alyssa H. Bowler
*Assistant Examiner*—Daniel H. Pan
*Attorney, Agent, or Firm*—Antonelli, Terry, Stout & Kraus

[57] ABSTRACT

A data processing system incorporating a main memory for storing instructions and operands and performing data processing in a mode of microprogram control system in response to instructions read out of the main memory. The system translates an instruction word read out of the main memory into an intermediate machine word having the orthogonal format, and addresses a microprogram memory in correspondence to the instruction word by analyzing the intermediate machine word. The system further incorporates a plurality of register sets so that each different task can use an individual register set, and a memory for memorizing the number of registers holding parameters used commonly among procedures corresponding to the register sets, so that the number of registers for each use can be changed arbitrarily for each register set by using the memory.

24 Claims, 42 Drawing Sheets

FIG. 4A
OPERATIONAL INSTRUCTIONS

| OPERATION CODE (10010) | | | | 1ST OPERAND CODE (10020) | 2ND OPERAND CODE (10030) |
|---|---|---|---|---|---|
| OPERATION CLASS CODE | OPERATION DATA SIZE | OPERATION TYPE | 1ST REGISTER NUMBER | ADDRESSING CODE | 2ND REGISTER NUMBER |
| 10011 | 10016 | 10012 | 10021 | 10031 | 10032 |

FIG. 4B
BRANCHING INSTRUCTIONS

| OPERATION CODE (10010) | | 1ST OPERAND CODE (10020) | |
|---|---|---|---|
| OPERATION CLASS CODE | BRANCH CONDITION | ADDRESSING CODE | 1ST REGISTER NUMBER |
| 10011 | 10013 | 10022 | 10021 |

FIG. 4C
BIT MANIPULATING INSTRUCTIONS

| OPERATION CODE (10010) | | | 1ST OPERAND CODE (10020) | 2ND OPERAND CODE (10030) |
|---|---|---|---|---|
| OPERATION CLASS CODE | BIT MANIPULATION TYPE | BIT NUMBER | ADDRESSING CODE | 2ND REGISTER NUMBER |
| 10011 | 10014 | 10022 | 10031 | 10032 |

SWITCHING FROM TASK #2n TO TASK #2n+1 (n=0,1,2,···)

SWITCHING FROM TASK #2n+1 TO TASK #2n+2 (n=0,1,2,···)

DATA PROCESSING SYSTEM WITH DEVICE FOR ARRANGING INSTRUCTIONS

This is a continuation of application Ser. No. 07/625,992, now abandoned, filed Dec. 11, 1990, which is a divisional of application Ser. No. 849,307, now abandoned, filed Apr. 8, 1986.

BACKGROUND OF THE INVENTION

1. Field of the Invention

The present invention relates to a data processing system and, particularly, to a microprogram-controlled data processing system incorporating an instruction decoder and multiple register sets, the system being suitable for constructing a microcomputer.

2. Description of the Related Art

Recent advanced micro-miniaturizing technology in the field of semiconductor devices, particularly MOS (Metal Oxide Semiconductor) devices has enabled upgraded functions and performance of microcomputers. In order to avoid the complexity of logics resulting from the enhanced circuit integration, the achievement of an integrated circuit by an orderly structured logic-circuit is becoming the mainstream method. One practice is the microprogram control system. A microprogram-controlled data processing system is generally constructed using an instruction decoder which generates the microprogram ROM address from the instruction word. However, this system necessitates a large scale hardware for the instruction decoder. A microprogram control system coping with this problem by elimination of the instruction decoder is proposed in Japanese Patent Unexamined Publication No. 57-203141. However, this system sets the instruction word directly in part of-the microprogram ROM address information, and therefore as the instruction word length increases from 8 bits to 16 bits and to 32 bits the length of the microprogram ROM address increases with it, resulting disadvantageously in an expanded microprogram ROM address decoder.

Another hardware scheme for upgrading the performance of microcomputers is the general-purpose register system, in which a microcomputer is provided with many registers so that various operations take place among the registers with the intention of high-speed processing. However, if the program includes frequent task switching such as procedures of call/return, the contents of the general-purpose registers need to be saved and output to/from the stack (a first-in-last-out memory) frequently at each switching in order to resume operations. The time used for the saving and resuming operations increases the total processing time, and the increase is the speed of processing is not possible. The time used for the saving and resuming operations is enormous for a system having a large number of general-purpose registers.

As a means for overcoming the problem, there has been proposed the multiple register sets system, in which a plurality of register sets are provided and a register set is used for each task by switching, as described in IEEE MICRO, Vol. 2, No. 4, p. 13, Nov. 1982. This system allows for avoidance of operations for saving the register contents at each procedure call and also for the restoring of original parameter at each procedure return. Moreover, this system does not require transactions of a parameter among procedures, and as a result high-speed register saving/resuming processing can be accomplished. On the other hand, however, only a small part of many register sets is used by application programs with the result of inefficient use of the hardware resources. In addition, the number of registers used for parameter transaction among procedures and the number of registers without connection among procedures are each fixed. Thus, processing, for example, of a procedure requiring an extremely large number of the latter-type registers will be forced to use a memory area even though many of the former-type registers are left unused. Accordingly, this system also has the problem of insufficient use of the hardware resources.

SUMMARY OF THE INVENTION

An object of this invention is to provide a data processing system having enhanced functions and performance.

Another object of this invention is to provide a data processing system of the type having an instruction decoding system which is responsive to various instruction formats.

A further object of this invention is to provide a versatile and flexible data processing system of the type having a multiple register sets system capable of defining arbitrarily the number of registers for storing parameters used commonly among procedures and the number of registers for storing data specific to each procedure.

The inventive data processing system is of the type having an instruction decoding system in which an instruction word (machine word) read out of the main memory is arranged into an intermediate machine instruction word in an orthogonal format suitable for the decoding hardware arrangement and then the intermediate machine word is decoded. An instruction word in the orthogonal format is defined here to be an instruction word having an operation code which specifies the operation to be executed and information bits representing operand specifies which identify locations of the main storage where the operands are contained. In a data processing system in general, the bit positions for the operation code and operand specifier differ depending on each instruction so that information on the operation and operands is contained in the limited instruction word set with less redundancy. In the conventional system, this type of instruction has been decoded or used for microprogram ROM address generation, and therefore the system needs to incorporate a large scale address generating hardware for the decoders.

The inventive system performs instruction decoding by initially converting an instruction word into an instruction word of the orthogonal format suitable for decoding. The bit arrangement of instruction words which are not orthogonal is not completely random, but has some rule, and translation of non-orthogonal instruction words into orthogonal instruction words is relatively simple. Therefore, the decoding hardware and ROM capacity can be reduced when the microprogram ROM address is generated by decording an orthogonal instruction word.

The inventive system incorporates decoders for arranging instruction words into intermediate machine words separately for each instruction format so that the decoding of the intermediate machine words takes place commonly for every instruction format. The intention is that instruction words of different formats or different word length can be processed.

Having the foregoing arrangement, the inventive system can deal with instruction words in different formats without modifying or adding to the hardware arrangement within the processor. The instruction word storage and the translation unit which arranges instruction words into intermediate machine words for decoding, and the hardware arrangement used for instruction decoding can be reduced to ⅕ to ⅒ of the counterpart of the conventional instruction decoder system.

As another feature of this invention, the system can process instruction words having at least two instruction formats.

The inventive system is provided with instruction-controlled registers and a memory capable of arranging a register set in correspondence to the contents of the registers, so that the register sets for procedures are placed in the memory in accordance with the register contents. The number of register sets provided in the memory is made variable depending on each process. Therefore, the registers are used efficiently. The remaining portion of the memory where register sets are not placed can be used as part of the main memory, whereby the hardware resources can be used efficiently.

A single register in a physical sense is used to store data used commonly by several tasks in transacting parameters among procedures so as to eliminate the need of data transfer among registers when the procedure is changed. Thus, the overhead of data processing is reduced and the processing speed of the data processing system is enhanced.

The inventive system merely requires that the register sets be switched when the tasks are switched as caused by occurrence of interrupt events. Thus, the system eliminates the need for data saving and restoration to/from the main memory or other storage devices permitting tasks to be switched quickly and the processing speeds to be enhanced.

The ability of arbitrarily setting common access areas for tasks by the instruction eliminates the idle time spent for parameter transaction, increasing processing speed. Designation of a register local area in an arbitrary size for each procedure increases the latitude of choice of registers simplifying the software. The number of tasks can be set by the instruction, and a system best fit for the user's application can be constructed. Register areas left unused by the tasks can be used as a main memory area, which creats a function resembling a single-chip microcomputer with an on-chip RAM area providing the ability to flexibly construct a user system.

As described above, the present invention improves the decoding function for instructions in reading the microprogram ROM without increasing the scale of the hardware. The invention can provide a high performance, high functioning data processing system without a significant increase in the hardware arrangement. The hardware resources are efficiently used while employing the general-purpose register system.

BRIEF DESCRIPTION OF THE DRAWINGS

These and other objects and advantages of the present invention will become apparent by making reference to the following description and accompanying drawings, in which:

FIG. 4 is a set of diagrams showing examples of the instruction format;

FIG. 46 is a block diagram showing an embodiment of the processor capable of varying the number of memory access cycles; and.

DESCRIPTION OF THE PREFERRED EMBODIMENTS

Figure 1:
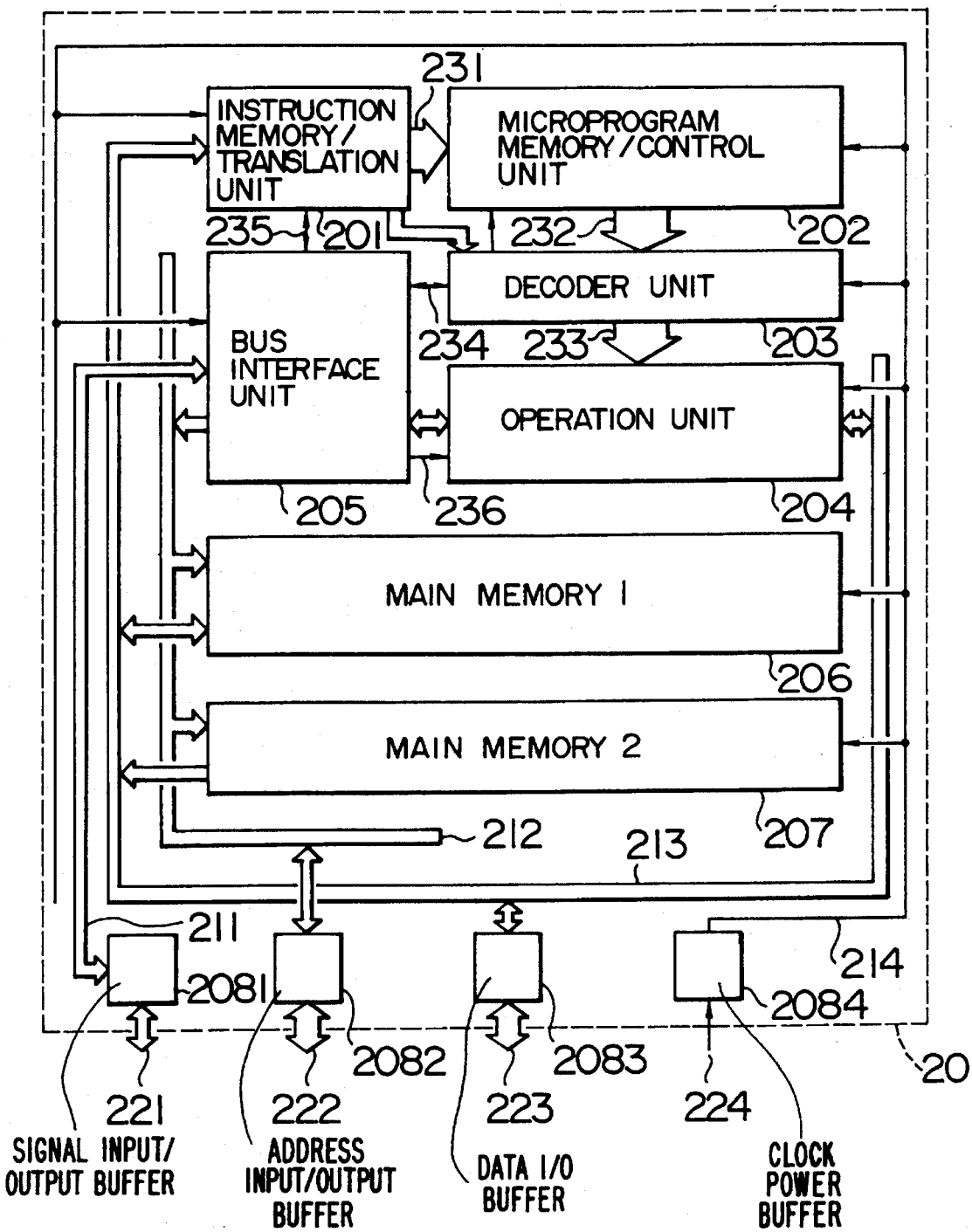
FIG. 1 is a block diagram showing the processor in the data processing system embodying the present invention.
Figure 2:
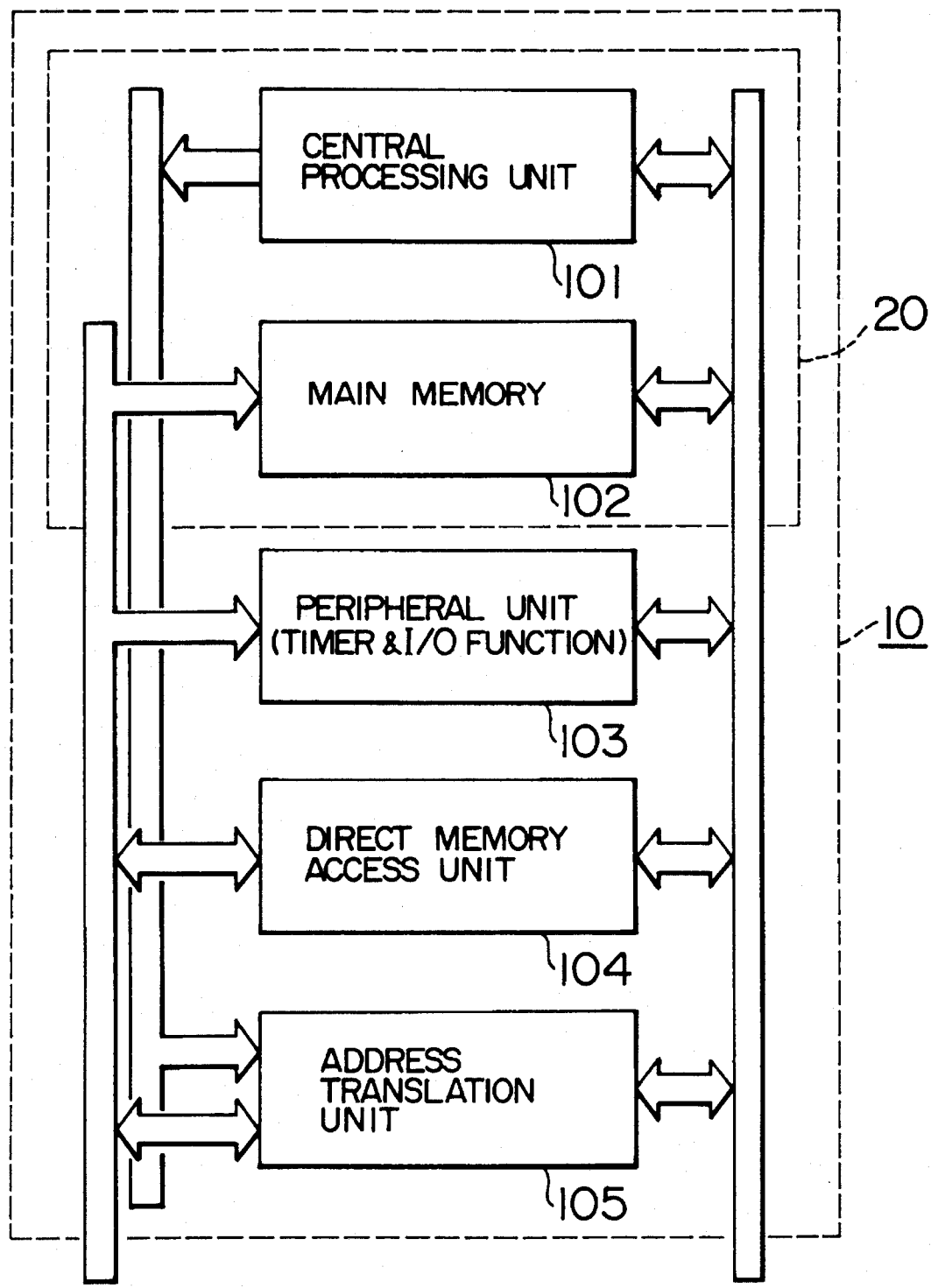
FIG. 2 as a block diagram showing the microcomputer formed on a single semiconductor substrate by application of the inventive data processing system.

FIG. 2 shows an embodiment of this invention, which is applied to a microcomputer 10 constructed on a single semiconductor substrate. The arrangement includes a central processing unit 101 as a nucleus, a main memory 102, a peripheral circuit 103 having the timer function and input/output function, a direct memory access controller 104, and an address translator 105. A processor section 20 enclosed by the dashed line in FIG. 2 will be described in detail in connection with FIGS. 1 and 3.

FIG. 1 shows an embodiment of the processor section 20, and it consists of an instruction word memory/translation unit 201, a microprogram memory/control unit including a microprogram ROM (Read Only Memory) as a principal element, a decoder unit 203, an operation unit 204, a bus interface unit 205, a first main memory 206 operative for reading and writing, a second memory 207 operative for only reading, an address input/output buffer 2082, a data input/output buffer 2083, a clock and power supply buffer 2084, and an input/output buffer 2081 for signals, except the address/data clock and power supply, transmitted or received by the processor section 20 to/from the other functional blocks 103, 104 and 105 in FIG. 2.

The following describes the processor operation from instruction fetching up to instruction execution with reference to FIG. 1.

(1) Instruction fetching

The contents of the program (instruction) fetching register (instruction address register) in the bus interface unit 205 are read out over the bus 212 into the main memories 206 and 207 in the processor 20 and, at the same time, into the address input/output buffer 2082 so that the contents are sent out over the bus 222 outside of the processor 20. An instruction word is read out of the first main memory 206 or second main memory 207 by being addressed by the above input and is output onto the bus 213. An instruction word on the bus 223 may also be read in through the data input/output buffer 2083 onto the bus 213. Information on the bus 213 is fed into the instruction word memory/translation unit 201.

(2) Instruction latching and translation

The instruction word received by the instruction memory/translation unit 201 is held in it and at the same time it is decoded into information to be sent to the microprogram memory/control unit 202.

(3) Microinstruction read-out

The microprogram memory/control unit 202 receives the information provided by the instruction word memory/translation unit 201 over the bus 231, and sends it as a microinstruction string over the bus 232.

(4) Microinstruction decoding

The microinstruction from the microprogram memory/control unit 202 is sent over the bus 232 into the decoder unit 203, which decodes the microinstruction into signals 233 which directly control the operation unit 204 and signals 234 which directly control the bus interface unit 205.

(5) Operation execution

The operation unit 204 implements data operations specified by the signals 233. The bus interface unit 205 performs the timing control for data transfer within the processor 20 or between the processor 20 and other functional blocks using the bus 211, input/output buffer 2081, bus 221 and signal lines 235 and 236.

The clock and power voltage supplied to the buffer 2084 are distributed to the units using a signal line 214.

Figure 3:
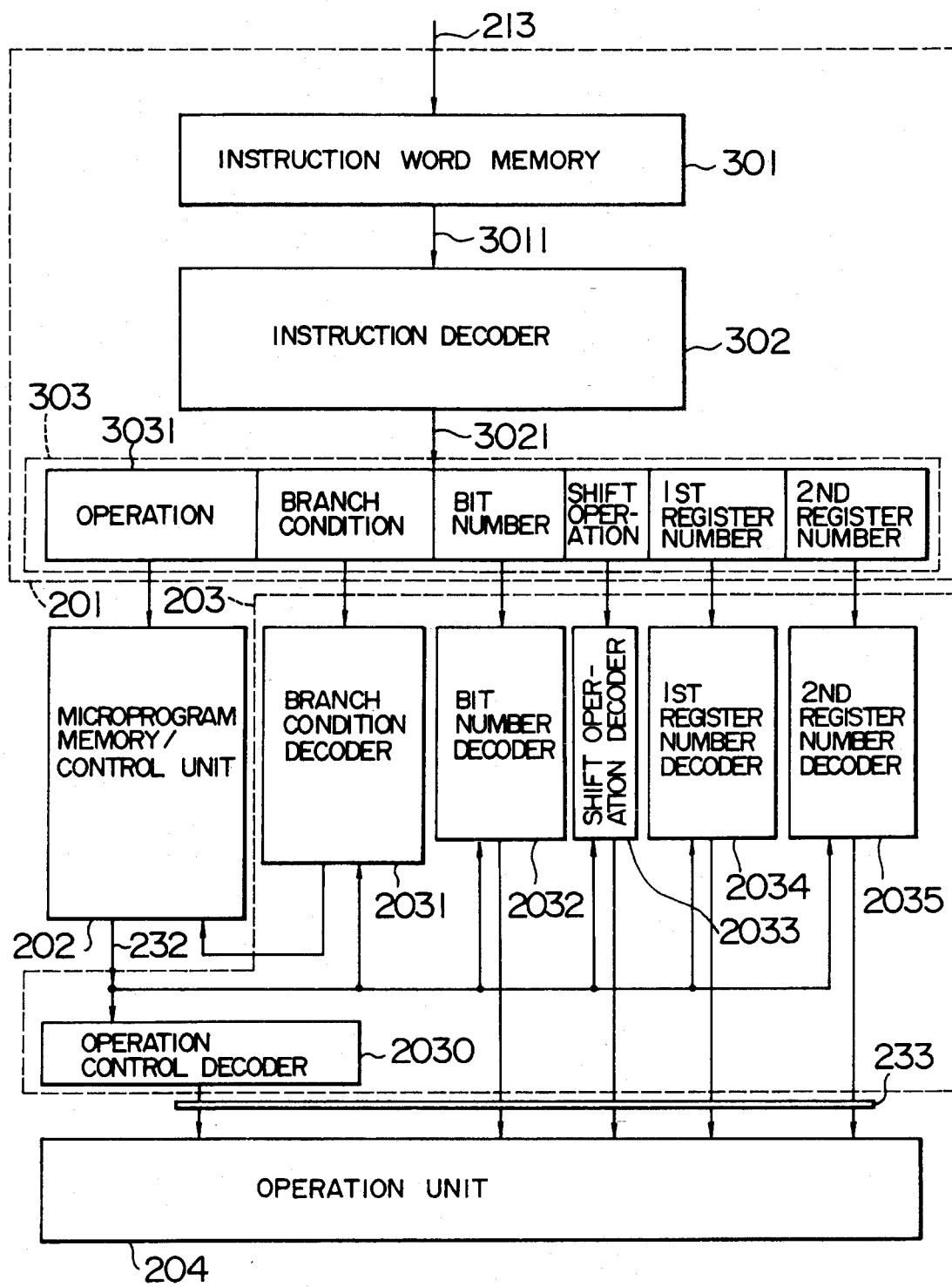
FIG. 3 is a block diagram showing the arrangement of the instruction word memory/translation unit, microprogram memory control unit, decoder unit, and operation unit included in the processor shown in FIG. 1.

FIG. 3 shows an example of the arrangement of the instruction word memory/translation unit 201, microprogram memory/control unit 202, decoder unit 203 and operation unit 204. The instruction word transferred over the bus 213 to the instruction word memory/translation unit 201 is held temporarily in the instruction word memory 301 and then transferred to the first instruction decoding means, i.e., the instruction decoder 302. FIG. 4 shows typical instruction formats of instruction words read into the instruction memory 301.

(1) Operational instructions

An instruction of this type implements an operation between a first operand specified by the first operand code 10020 and a second operand specified by the second operand code 10030 and stores the result in the location of the second operand. The type of operation specified in the operation code 10010 designates one of the arithmetic or logic operations. The instruction also includes operation class code 10011a, operation data size 1011b, operation type 1012, first register number 10021, addressing code 10031 and second register number 10032.

(2) Branching instructions

An instruction of this type causes the program sequence to branch to the program address indicated by an operand specified by the first operand code 10020 upon fulfillment of the branch condition given in the operation code 10010. If the branch condition is not met, the instruction causes the program sequence to proceed to the next instruction word. The instruction also includes an operation class 1001, branch condition 10013, addressing code 10022 and first register number 10021.

(3) Bit manipulating instructions

An instruction of this type tests the value of a bit position specified by the bit number 10022, i.e., a first operand, in the second operand 10020 specified by the second operand code 10030, and memorizes the bit value. Thereafter, the instruction implements one of operations (clear, set, change, test) indicated by the bit operation type in the operation code 10010 for the specified bit, and stores the result in the corresponding bit position of the second operand when necessary. The instruction also includes operation class code 10011, bit manipulation type 10014, addressing code 10031 and second register number 1032.

The instructions categorized as either (1), (2) and (3) as described above are systematized at the sacrifice of orthogonality due to the restriction in word length of an instruction as a result of formatting for the intended functions in a limited word length in accordance with a certain rule.

The embodiment shown in FIG. 3 operates in the instruction decoder 302 to decode instruction words read out of the instruction word memory 301 so that information of various kinds necessary for the instruction execution is converted into instructions having a complete orthogonal code system (will be termed "intermediate machine words" hereinafter). Each intermediate machine word has an operation code 10010 for specifying the operation to be executed and information bits representing some operand specifier codes which identifies the location in the main memory where the operand is contained.

The intermediate machine word is stored in the memory 303, and then fed to the microprogram memory/control unit 202 and the second instruction decoding means, i.e., the decoder unit 203. Some of the intermediate machine words include at least one operand specifier, and information as to whether the operand indicated by the operand specifier is a source operand or a destination operand which both are expressed in the operation code. Among information expressing the operation code and operand specifier, information of various kinds about the intermediate machine word except for the information 3031 that needs to be decoded by the microprogram memory/control unit 202 is in one-to-one correspondence to the decoders 2031, 2032, 2033, 2034 and 2035 in the decoder unit 203 which can be controlled by the microinstruction 232 (see FIG. 3). Control signals 233 produced by these decoders in the decoder unit 203 control the operation unit 204 so as to execute an intended operation indicated by the intermediate machine word.

Figure 5:
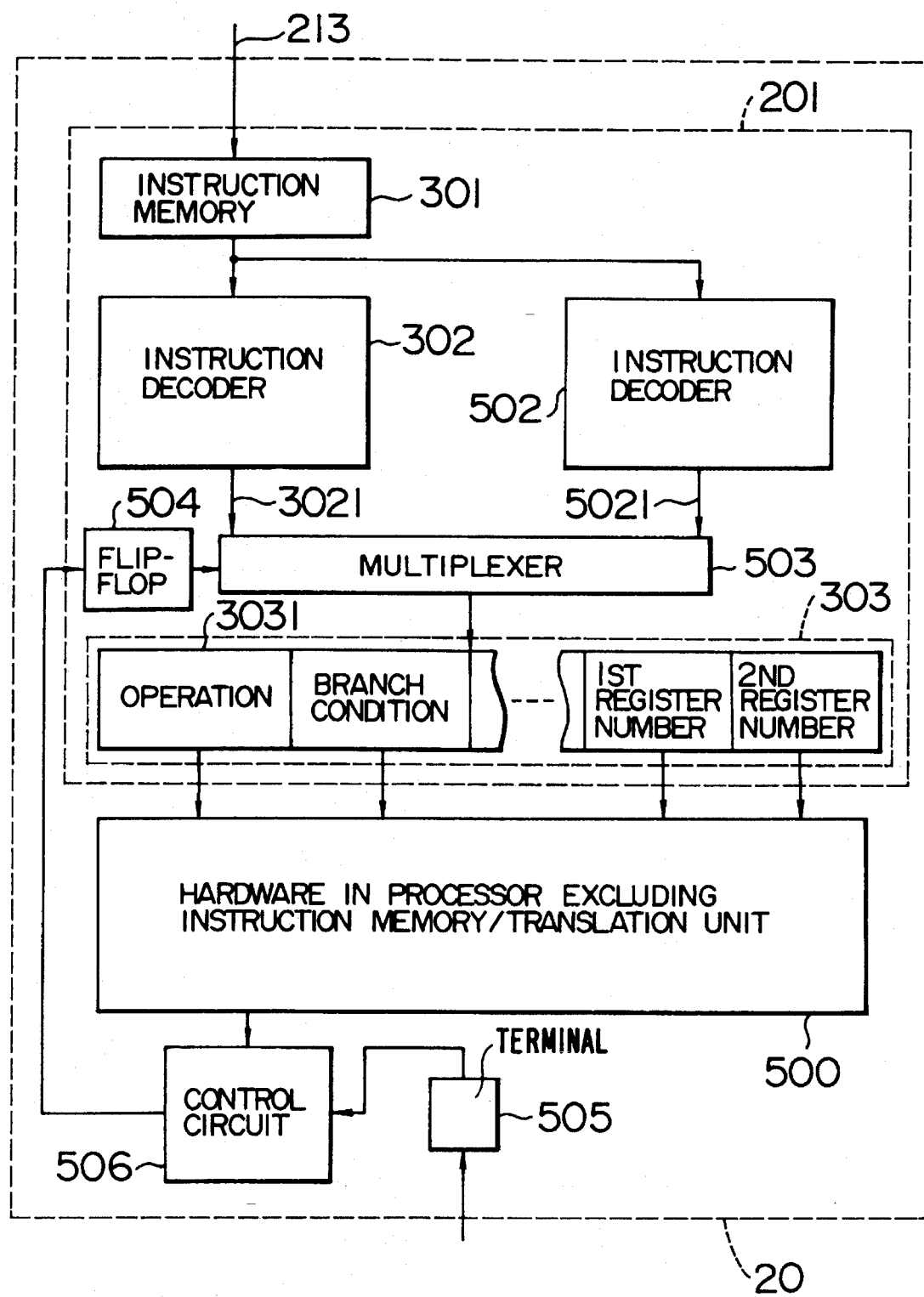
FIG. 5 is a block diagram showing another embodiment of the instruction word memory/translation unit in the processor shown in FIG. 1.

FIG. 5 shows another embodiment of the instruction word memory/translation unit, in which there are two instruction decoders for decoding an instruction held in the instruction memory means 301 into an intermediate machine word. In case the main memory storing user programs stores instruction words expressed in two different kinds of instruction systems A and B, i.e., different instruction process (instruction functions) for the same binary instruction code, the system is provided with an instruction decoder 302 for decoding instructions in instruction system A and an instruction decoder 502 for decoding instructions in instruction system B. Information created by the instruction decoder 302 is sent over the bus 3021 to the multiplexer 503. Similarly, information created by the instruction decoder 502 is sent over the bus 5021 to the multiplexer 503. The multiplexer 503 selects one of the buses 3021 and 5021 basing on the contents of the flip-flop 504, and stores the selected contents in the memory 303. In this case, if the instructions expressed in the instruction code of instruction system A and expressed in the instruction code of instruction system B have the same process even though their binary codes are different, the two instruction decoders 302 and 502 generate exactly the same intermediate machine word. Namely, if instruction words of different instruction systems have the same instruction function, they have the same information stored in the memory 303. Thus, the most hardware 500 in the processor 20 controlled by the intermediate machine word (hardware in the processor 20 excluding the instruction memory/translation unit 201 in FIG. 2) can be used and controlled commonly by instruction words of different instruction systems.

The flip-flop 504 is set to the predetermined signal level which is received at the terminal 505 and detected by the control circuit 506 when the processor 20 is reset. The terminal 505 uses the lowest-order bit of the address bus.

Figure 6:
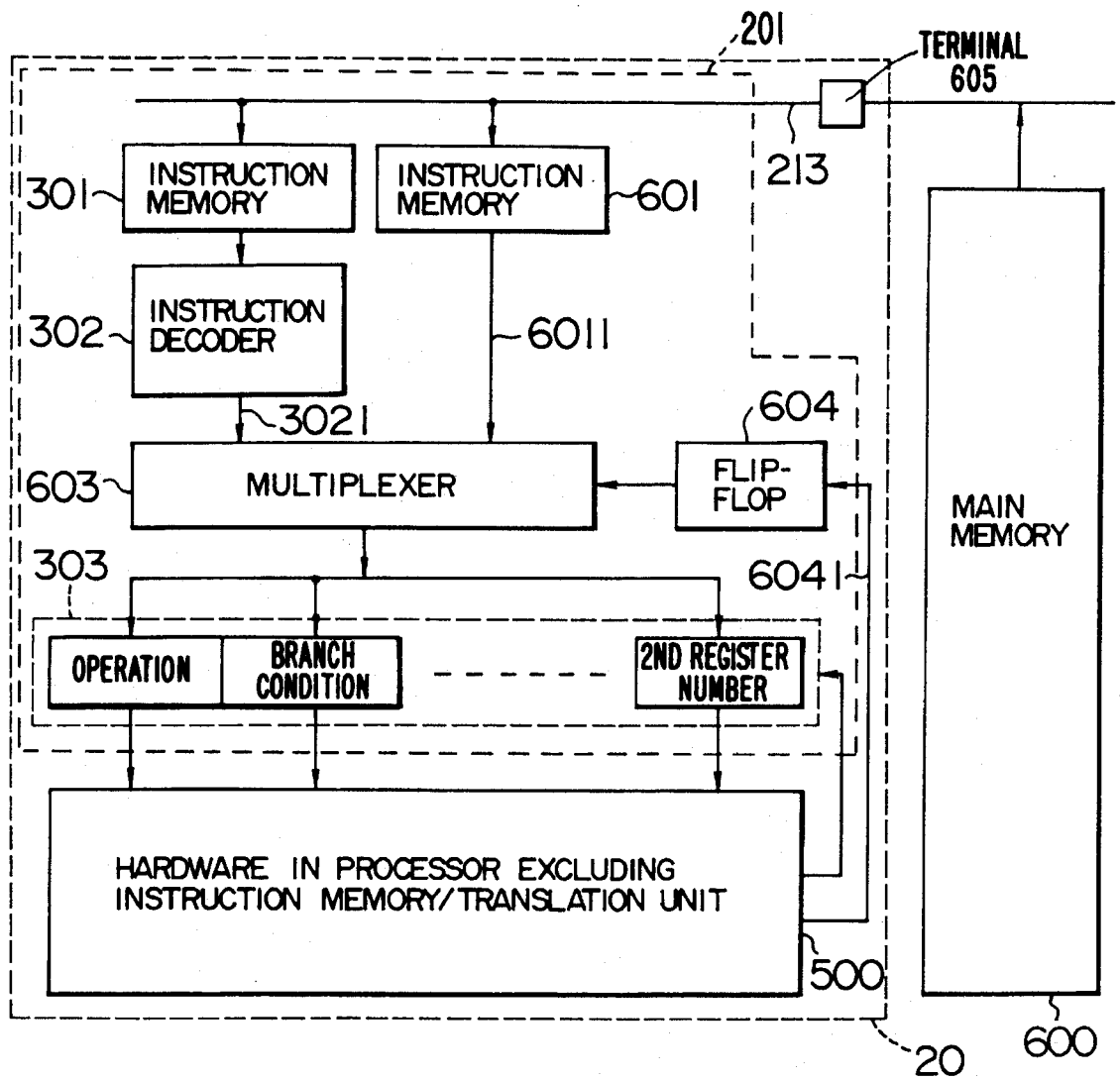
FIG. 6 is a block diagram showing still another embodiment of the instruction word memory/translation unit in the proessor shown in FIG. 1.
Figure 7:
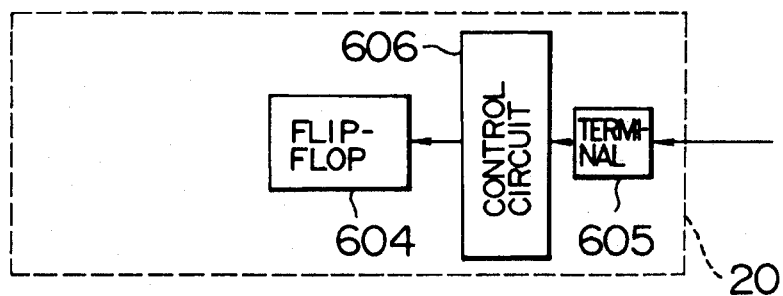
FIG. 7 is a block diagram showing an embodiment of the instruction word memory/translation unit derived from FIG. 6.

FIG. 6 shows still another embodiment of the instruction word memory/translation unit 201, in which instruction words read into the instruction memory 301 through terminal 605 and the bus 213 and intermediate machine words created by the instruction decoder 302 and instruction decoder 502 and stored in the memory 303, shown in FIG. 5, are stored together in the main memory 600. The main memory 600 stores instruction codes of two instruction systems, one type of code is fed via the instruction memory 301 to the instruction decoder 302 and translated into intermediate machine words by the decoder 302. The code is then fed over the bus 3021 to the multiplexer 603, selected by the multiplexer 603 and stored in the memory 303. Another type of code is fed through the instruction memory 601 bus 6011 and selected by multiplexer 603. The intermediate machine word including information 3031 is stored in the memory 303. The multiplexer 603 selects one of information on the bus 3021 and bus 6011 depending on the contents of the flip-flop 604. The instruction words stored in the main memory 600 have the definition of the instruction which can switch the multiplexer 603, and by executing the instruction the flip-flop 604 can be controlled through the control line 6041. The flip-flop 604 may be controlled by detecting the signal level received at the terminal 605 by the control circuit 606 as shown in FIG. 7. The multiplexer 603 and memory 303 are designed to control the contents of the instruction memory 601 in byte (8 bits) units, allowing applications which do not need the instruction memory 601 to enter information to the multiplexer 603 in the same word length as of the bus 213.

Figure 8:
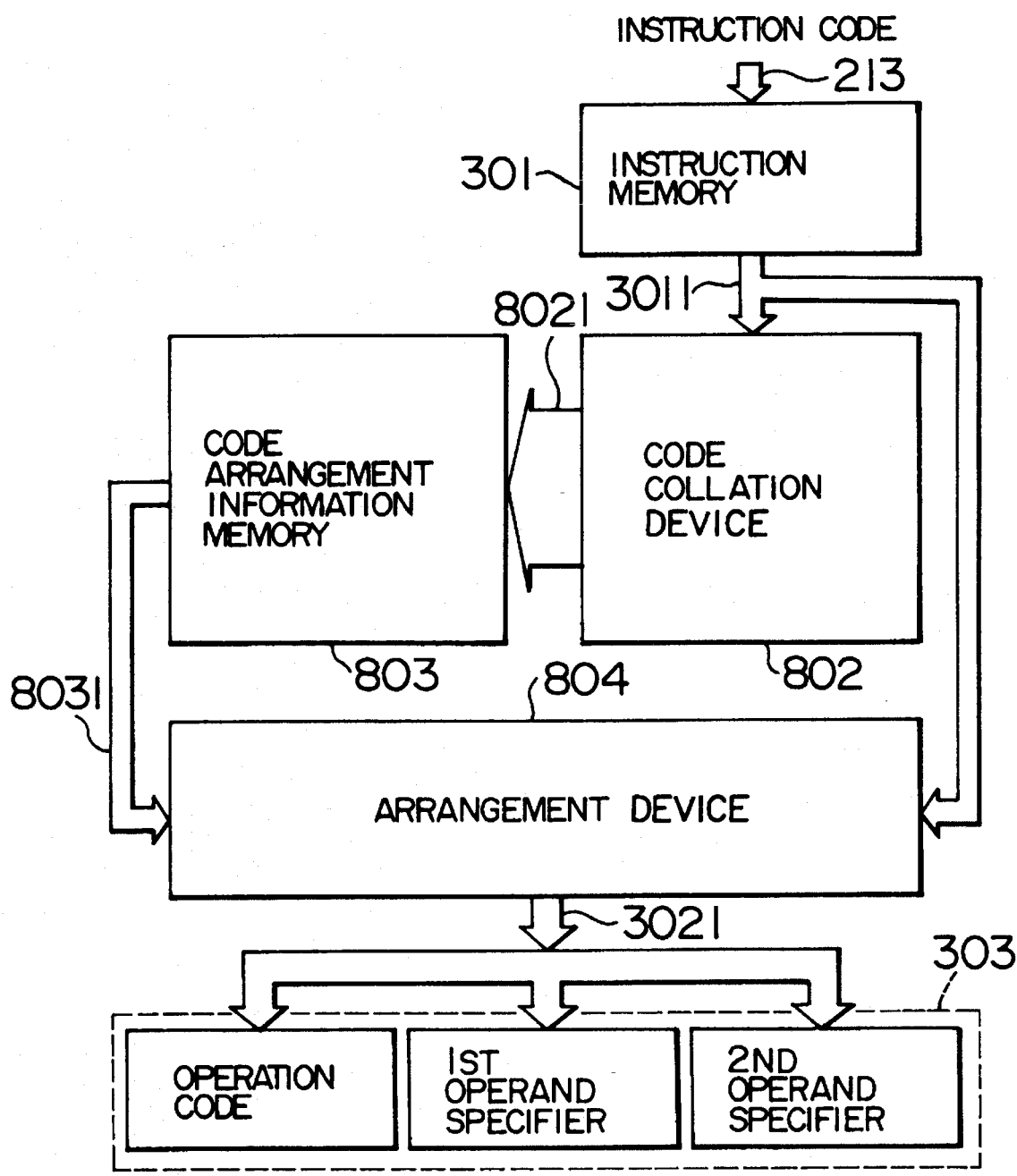
FIG. 8 is a block diagram showing separately the functions of the instruction word memory/translation unit in FIG. 3.

FIG. 8 is a block diagram showing separately the functions of the instruction memory/translation unit 201 shown in FIG. 3. The functions of the blocks are as follows.

(1) Instruction memory 301

This is a buffer memory for temporarily holding an instruction word read out from the main memory over the bus 213. An instruction word is read out of the main memory in advance so as to allow high-speed pipeline processing.

(2) Code collation device 802

The arrangement of the operation code and operand code differs depending on each instruction word. On this account, an instruction word read out of the instruction memory means 301 over the bus 3011 is collated with the code pattern which has been defined in the code collation unit 802 so that the coincidence is detected.

(3) Code arrangement information memory 803

Code arrangement information for translating an instruction word into an intermediate machine word having the orthogonal instruction format is defined and stored in this memory. The defined arrangement information is read out of the memory over the bus 8031 in response to the signal 8021 from the code collation unit 802.

(4) Arrangement device 804

In order to translate an instruction code entered through the bus 3011 into an intermediate machine word having the orthogonal instruction format, arrangement of the instruction code is carried out in accordance with information on the bus 8031. After translation, the intermediate machine word has its operation code for specifying the operation to be executed and its operand specifier for identifying the memory location containing the operand being arranged in separate bit positions. Some instructions except those which do not need operands include at least one operand specifier.

Figure 9:
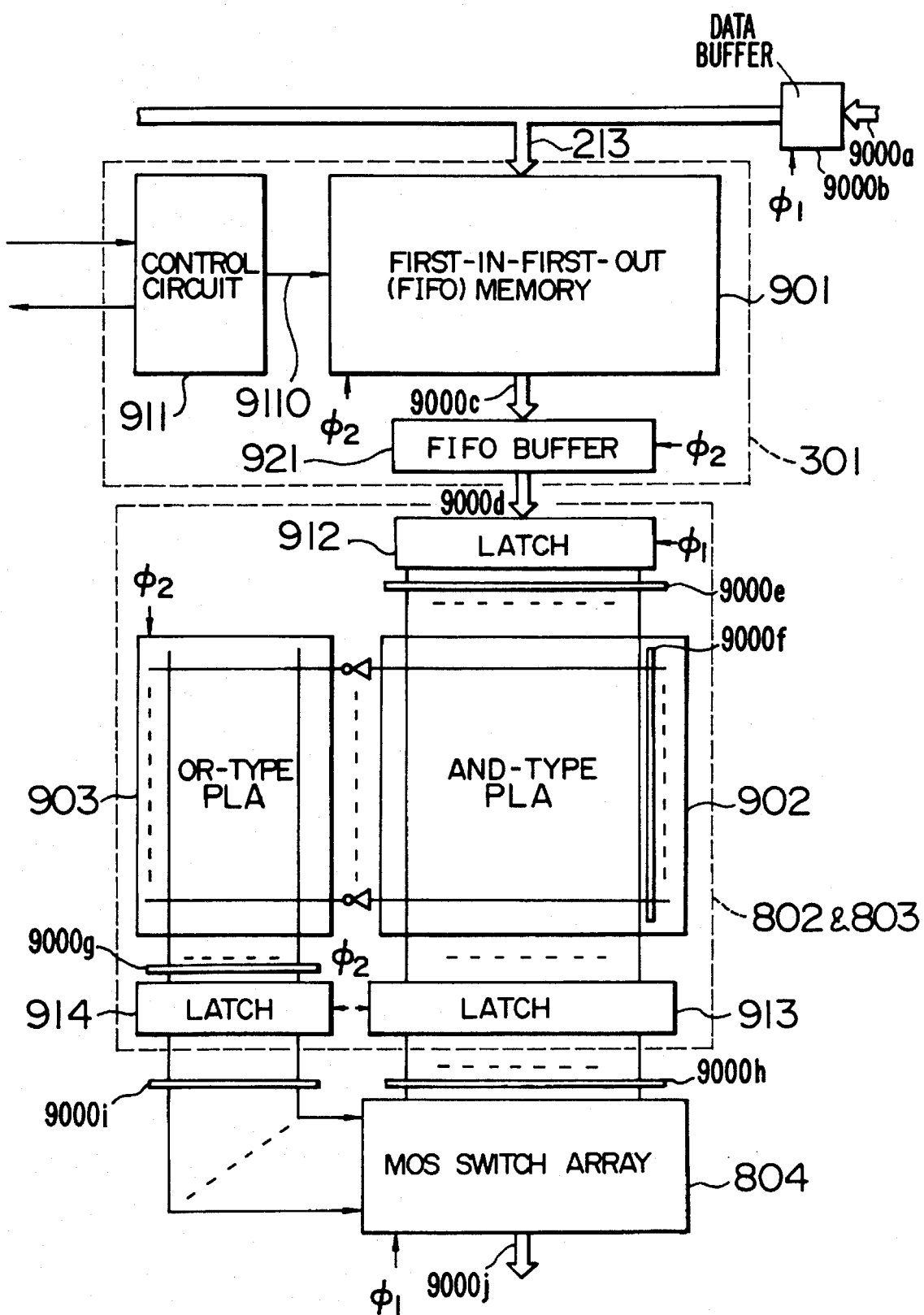
FIG. 9 is a block diagram showing an embodiment of the instruction word memory/translation unit shown in FIG. 8.
Figure 10:
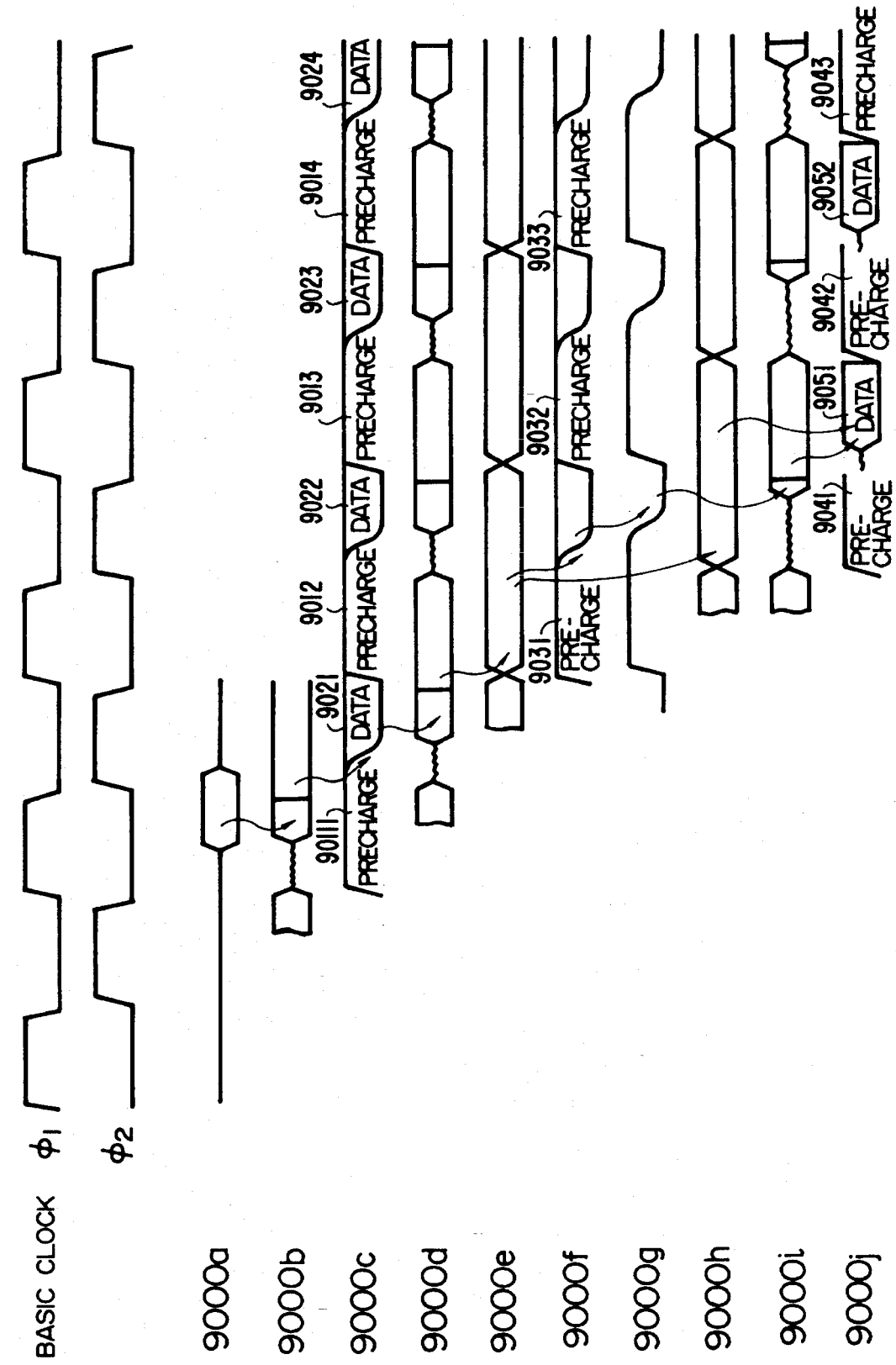
FIG. 10 is a timing chart showing the signals at various portions of the instruction word memory/translation unit shown in FIG. 9.

FIG. 9 shows an embodiment of the instruction memory/translation unit shown in FIG. 8, which includes an instruction memory 301 having first-in-first-out (will be termed simply "FIFO" hereinafter) memory 901 and its control circuit 911, a code collation device 802 and code arrangement information memory 803 having programmable logic arrays (will be termed simply "PLA" hereinafter), and an arrangement device 804 having a switch array using, for example, metal oxide semiconductor (will be termed "MOS" hereinafter) transistors. FIG. 10 shows the timing relationship of signals 9000a through 9000j as shown in FIG. 9 together with the basic clocks $\phi_1$ and $\phi_2$.

Initially, an instruction word read out of the main memory is fed over the bus 9000a and latched in the data buffer 9000b. The latched data is transferred over the bus 213 to the FIFO memory 901 in synchronism with the basic clock $\phi_2$. At this time, the control circuit 911 controls the writing of data on the bus 213 into the FIFO memory through the signal line 9110. At the same time, an instruction to be executed is read out of the FIFO memory 901 onto the bus 9000c and it is latched in the FIFO buffer 921. The code collation device 802 and code arrangement information memory 803 are formed of dynamic PLAs 902 and 903 made solely of NMOS transistors, except for the precharging circuit and driver. On this account, an input latch 912 and output latches 913 and 914 are added. The timing of signals 9000 after the signal d has been entered to the latch 912 until the output 9000h of the latch 913 and the output 9000i of the latch 914 is as shown in FIG. 10. The signal 9000h is the instruction code prior to arrangement, and the signal 9000i is arranged information. The arrangement means 804 produces a signal 9000j by making arrangement for the signal 9000h in accordance with the signal 9000i. On the bus 9000c precharges 9011, 9012, 9013 and 9014 are made in synchronism with the basic clock $\phi_1$. Each of the data 9021, 9022, 9023 and 9024 appear on the bus 9000c in synchronism with the basic clock $\phi_2$. The value of the data 9021, 9023 and 9024 is determined in accordance with data in the data buffer 9000b. In the row 9000f precharges 9031, 9032 and 9033 are made in synchronism with the basic clock $\phi_1$. At the output 9000j of the MOS switch array 804, precharges 9041, and 9043 are made in synchronism with the basic clock $\phi_2$, and the data 9051 and 9052 appear in the output 9000J in synchronism with the basic clock $\phi_1$.

Figure 11:
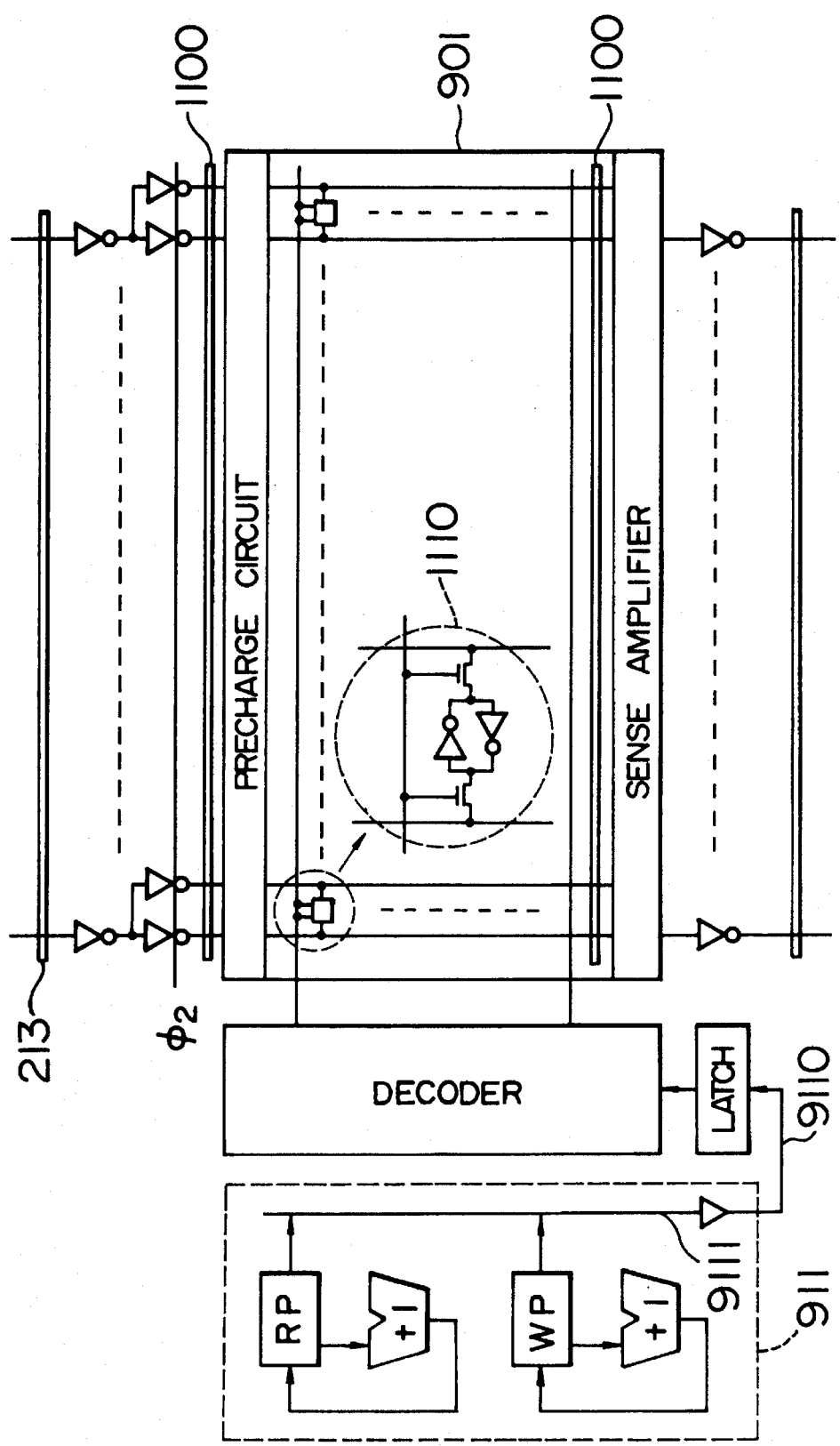
FIG. 11 is a block diagram showing in detail the instruction word memory in FIG. 9.

FIG. 11 shows in detail the instruction memory in FIG. 9. The FIFO memory 901 is formed of a single-port random access memory (will be termed simply "RAM" hereinafter). The data lines 1100 are charged by the precharging circuit during the period of the basic clock $\phi_1$, and they carry data during the period of the basic clock $\phi_2$. Sense amplifiers are provided for the amplification of read-out data. The control circuit 911 consists of a write pointer (shown by WP in FIG. 11) for specifying the write location in writing an instruction word on the bus 213 into the FIFO memory 901, a read pointer (shown by RP in FIG. 11) for specifying the read location in reading out an instruction word from the FIFO memory 901, and +1 adders for incrementing the pointers.

Figure 12:
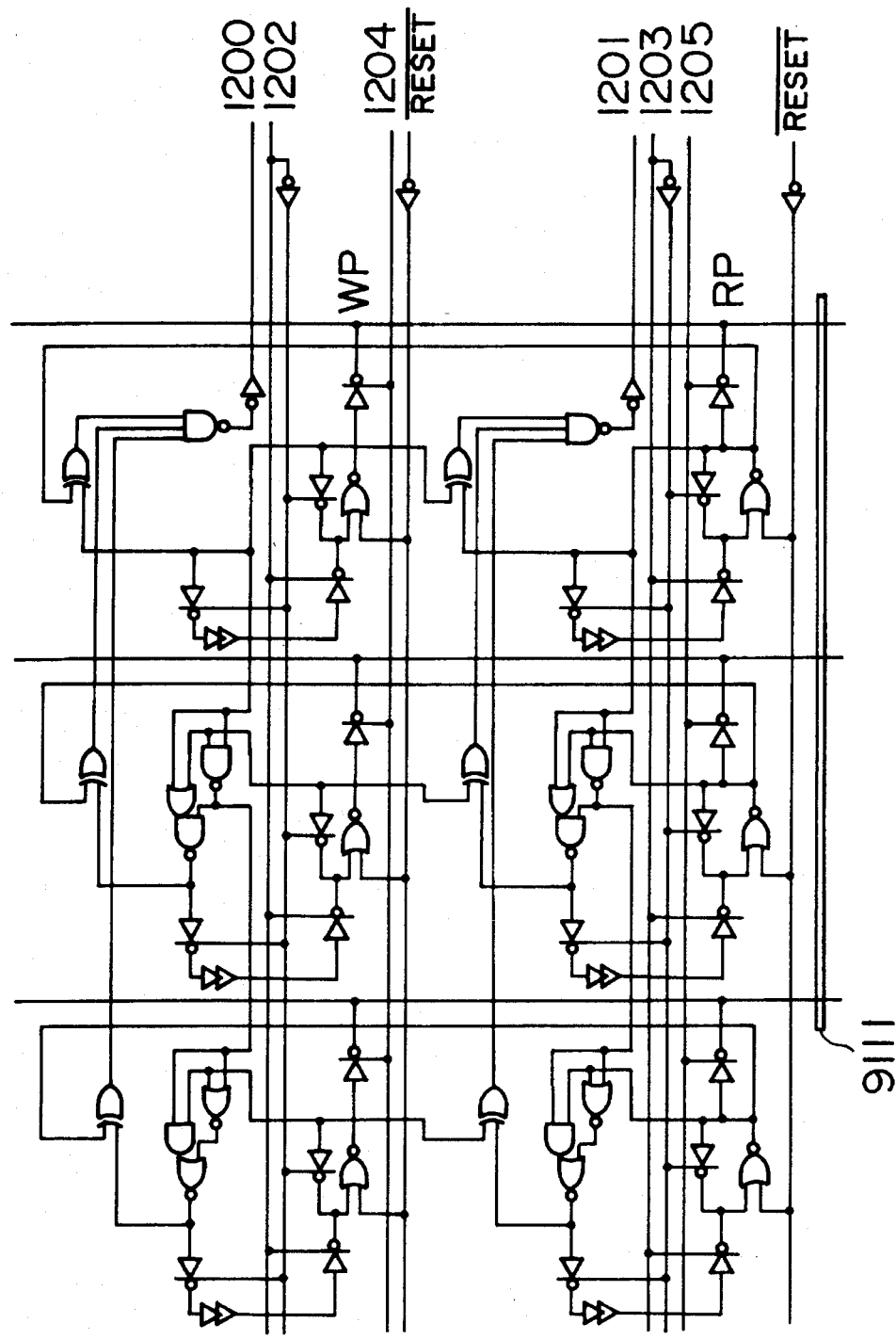
FIG. 12 is a schematic diagram of the control circuit shown in FIG. 11.

FIG. 12 is a logic circuit diagram showing in detail the control circuit 911 shown in FIG. 11. The figure shows an embodiment of the case where the FIFO memory 901 has a capacity of eight words (one word has the same word length as of the bus 213), i.e., each of the write pointer and read pointer is of three bits. A bus 9111 is provided for transferring the contents of the write pointer and read pointer. Both pointers can be reset by the $\overline{\text{RESET}}$ signal which becomes active when the FIFO memory 901 is cleared by the reset operation for the processor 20 or when a prefetched instruction in the FIFO memory is invalidated due to the execution of a branch instruction. Signal 1200 is the signal indicating that there is no memory space in the FIFO memory 901 for fetching an instruction from the main memory, i.e., the FIFO memory 901 is filled with a prefetched instruction word and there is no space physically. Signal 1201 is the signal indicating that there is a memory space of eight words available in the FIFO memory 901 for fetching instructions from the main memory, i.e., there is no instruction word prefetched in the FIFO memory 901. Signal 1202 is the incrementing signal for the write pointer, signal 1203 is the incrementing signal for the read pointer, signal 1204 is the signal outputting the value of the write pointer onto the bus 9111, and signal 1205 is the signal outputting the value of the read pointer onto the bus 9111.

Figure 13:
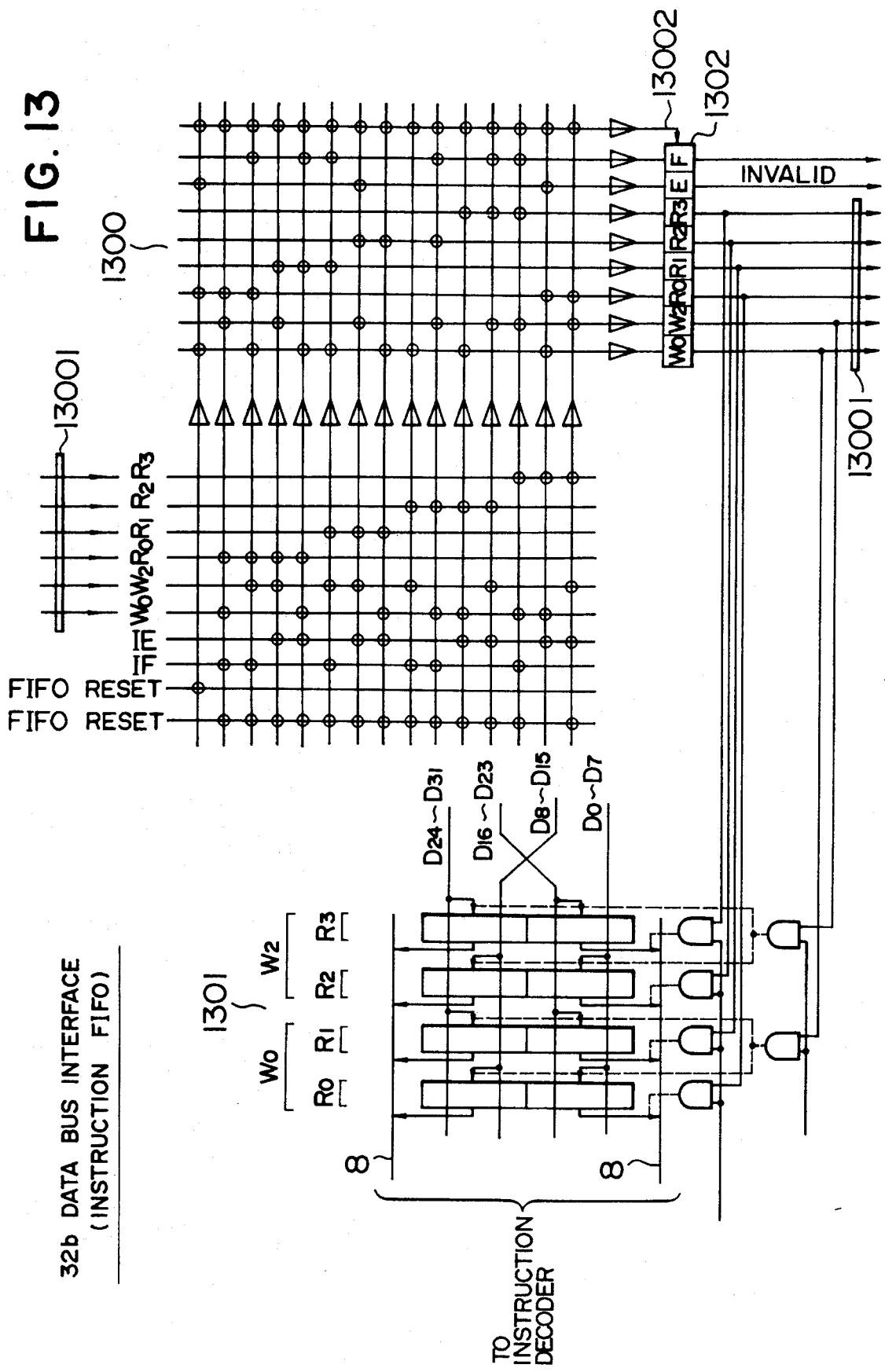
FIG. 13 is a block diagram showing another embodiment of the instruction word memory in FIG. 9.
Figure 14:
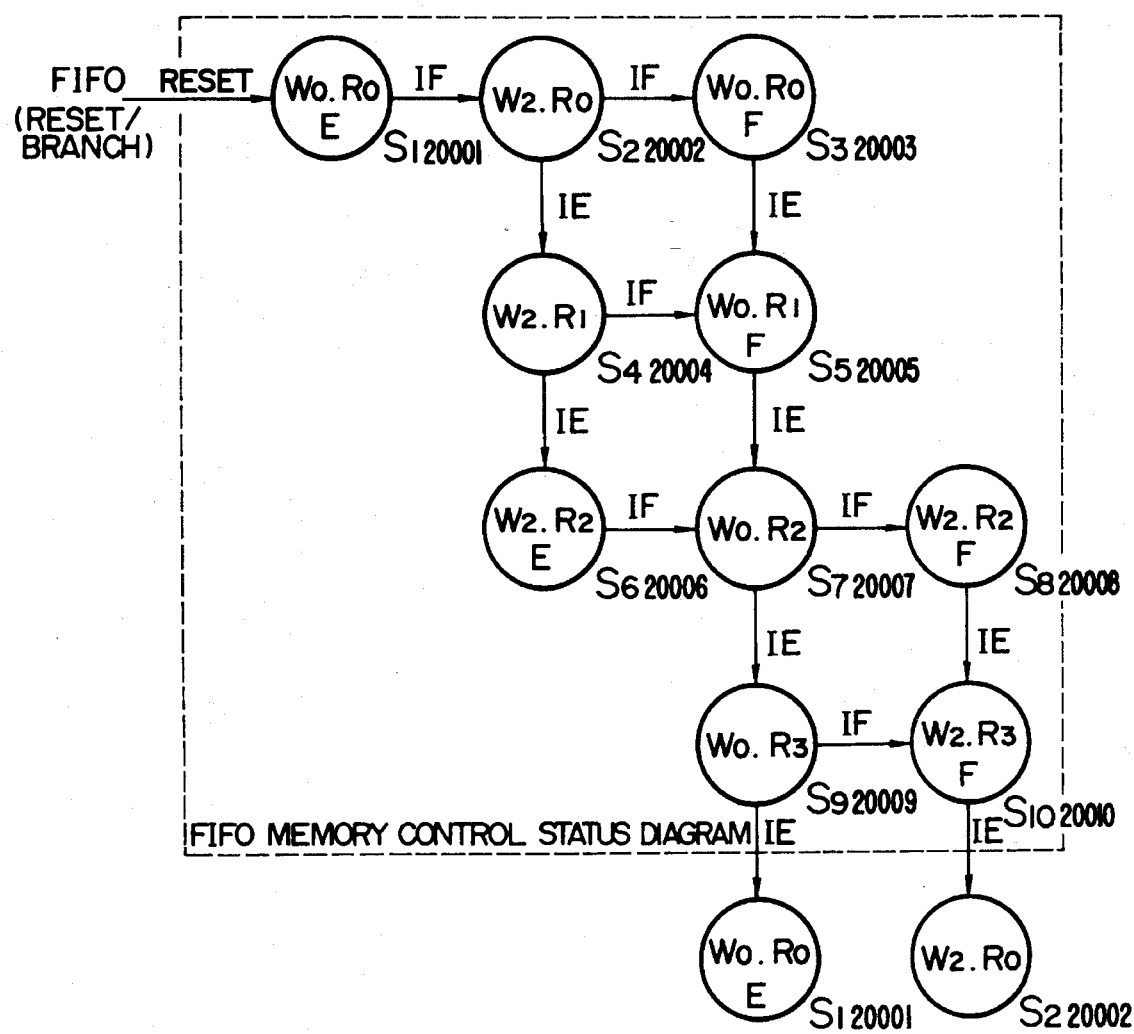
FIG. 14 is a diagram showing the control status of data input/output control on the first-in-first-out basis for the instruction word memory in FIG. 13.

FIG. 13 shows another embodiment of the instruction memory means 301 in FIG. 9, in which the FIFO memory 901 is controlled by the PLA. The arrangement implements concurrently the control for fetching an instruction word from the main memory to the FIFO memory through the 32-bit bus and the control for transferring the contents of the FIFO memory to the instruction decoder in 16-bit word length. The PLA which controls the data input/output to/from the FIFO memory satisfies the FIFO control state diagram shown in FIG. 14. The PLA 1300 changes in its state in the range of ten states from state $S_1$ 20001 to state $S_{10}$ 20010 as shown in FIG. 14, and it becomes the state $S_1$ 20001 from any state by receiving the FIFO reset signal. The states $S_1$ 20001 and $S_6$ 20006 indicate that the FIFO memory 1301 is empty (indicated by E in FIG. 14), i.e., no instruction word is yet fetched to the FIFO memory. The states $S_3$ 20003, $S_5$ 20005, $S_8$ 20008 and $S_{10}$ 20010 indicate that the FIFO memory is full (indicated by F in FIG. 14) and there is no space in the FIFO memory 1301 for fetching a new instruction word. The state of the PLA ($S_1$–$S_{10}$) is memorized in the state memory 1302, which is revised by the signal 13002 when the PLA 1300 issues a new state.

Figure 15:
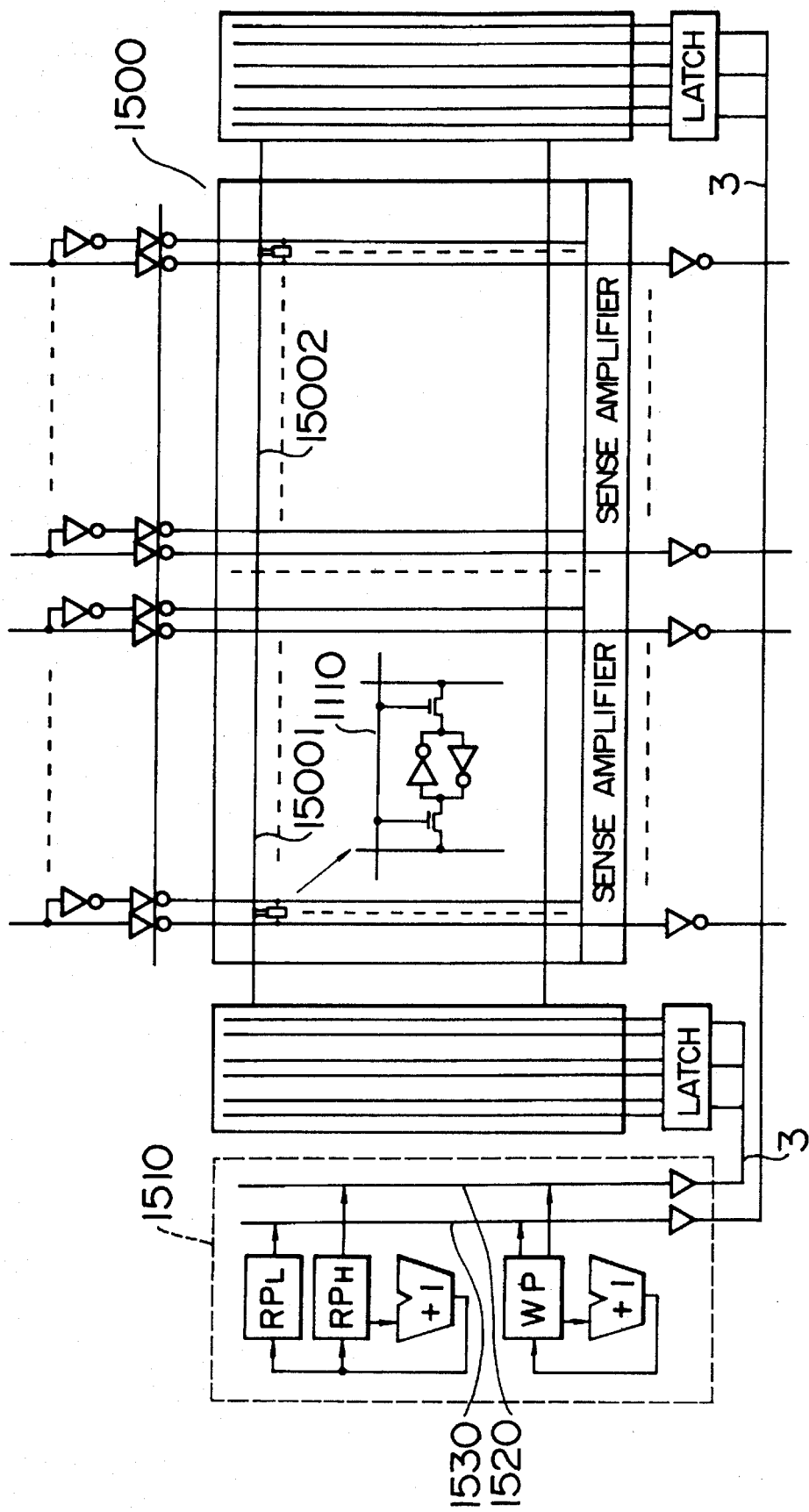
FIG. 15 is a schematic diagram showing another embodiment of the memory for temporarily storing instruction words in the instruction word memory in FIG. 11.

FIG. 15 shows another embodiment of the FIFO memory 901 shown in FIG. 11, in which the FIFO memory 901 is controlled for reading and writing through the provision of the input data word length (number of bits of the bus 213) twice the output data word length. The arrangement includes two word lines (15001 and 15002) for the read/write control of memory cells 1110.

Figure 16:
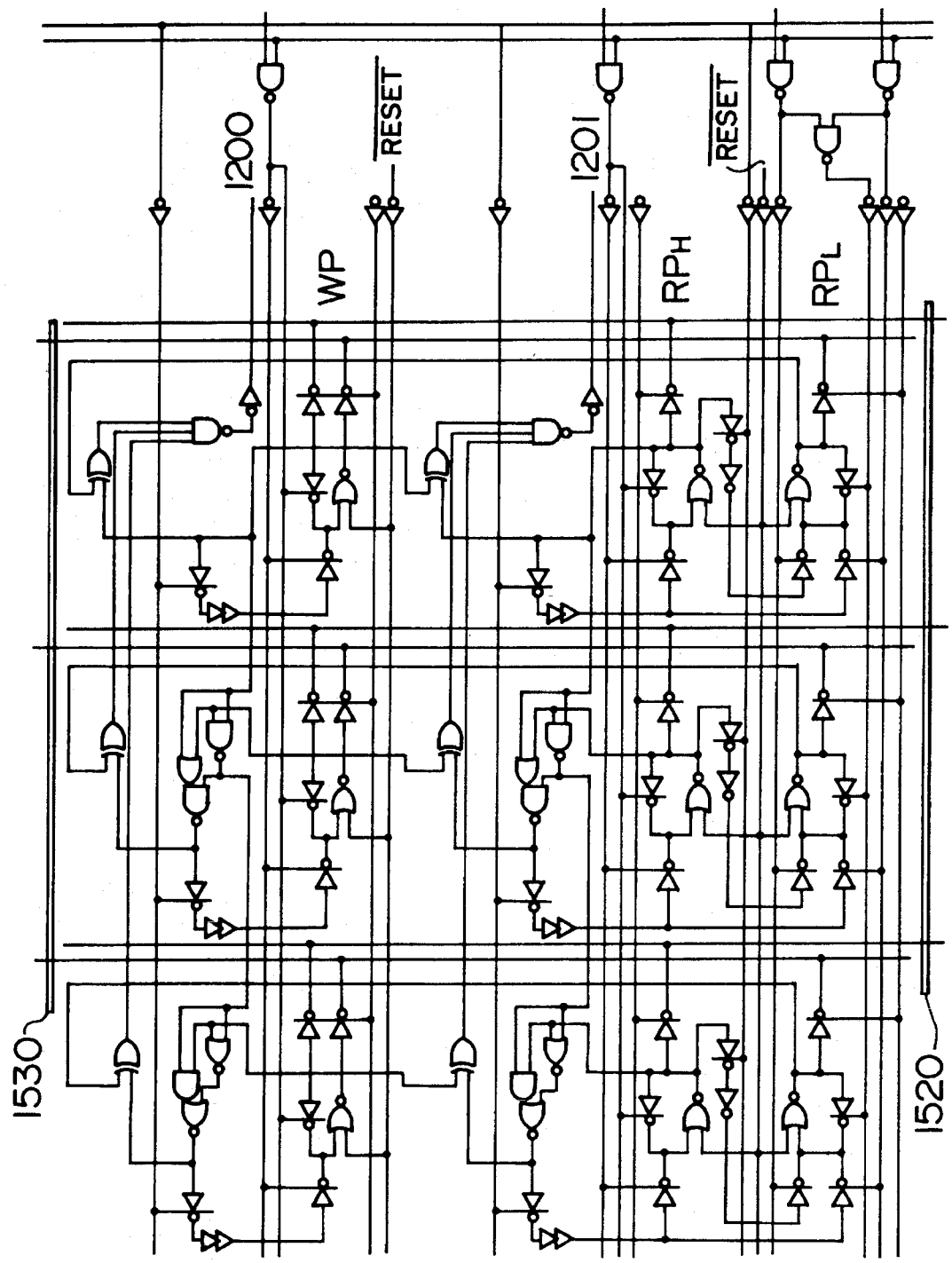
FIG. 16 is a schematic diagram of the control circuit for controlling the input/output of the memory shown in FIG. 15 ;/

FIG. 16 is a detailed logic circuit diagram of the control circuit 1510 for controlling the input/output operation of the FIFO memory 1500 in FIG. 15. A feature of this arrangement as compared with FIG. 12 is the presence of two read pointers ($RP_H$ and $RP_L$), which allows the handling of data in the FIFO memory in both half-word length and full-word length.

Figure 17:
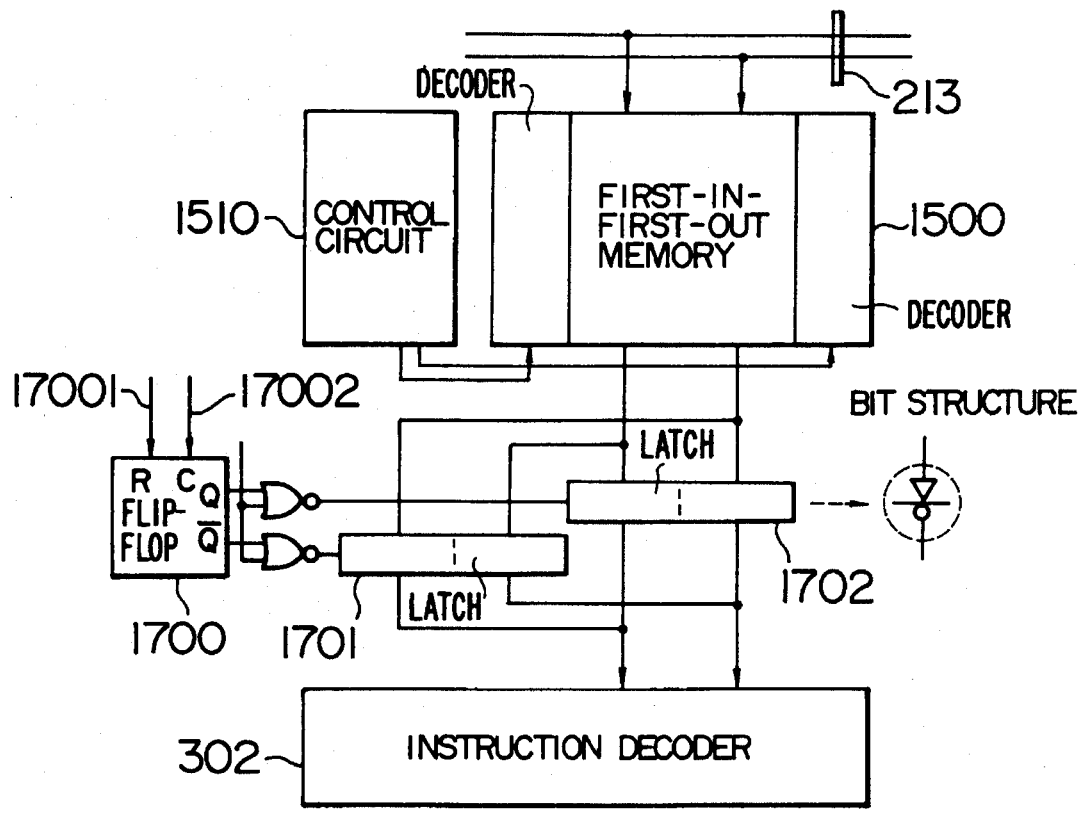
FIG. 17 is a block diagram showing an embodiment of the control circuit in the instruction word memory in FIG. 11 for setting the head of data always at the high-order bit for the case where data in the instruction word temporary memory is handled in half-word length.

FIG. 17 shows as an example the arrangement of the control circuit for setting the head of data always at the high-order bit in handling data in the FIFO memory 1500 in half-word length. Initially, the flip-flop 1700 is reset by the signal 17001 at a time point when the FIFO memory 1500 and control circuit 1510 are reset (state 0). Thereafter, the flip-flop 1700 selects the latch 1702 for the output destination. In case data in the FIFO memory 1500 is treated in half-word length, the flip-flop 1700 is set (state 1) by the signal 17002. At this time, the flip-flop selects the latch 1701 for the output destination. The FIFO memory 1500 includes decoders for decoding inputs from the control circuit 1510. In case data in the FIFO memory 1500 is treated in half-word length, the flip-flop 1700 is reset (state 0) by the signal 17002. By repeating these operations the head of data can be known.

Figure 18:
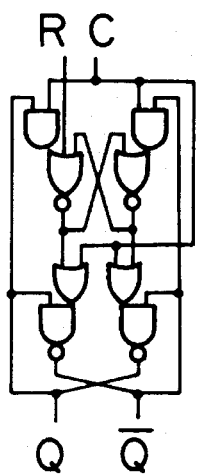
FIG. 18 is a schematic diagram showing part of the flip-flop in FIG. 17.
Figure 19:
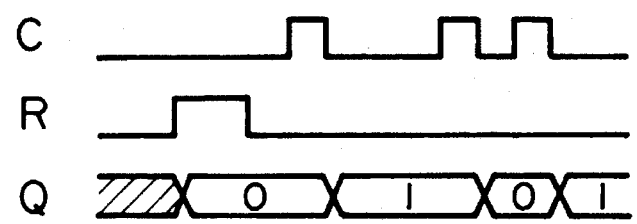
FIG. 19 is a timing chart showing the operation of the flip-flop shown in FIG. 18.

FIG. 18 shows in detail part of the flip-flop shown in FIG. 17, and FIG. 19 shows its operation on a timing chart.

Figure 20:
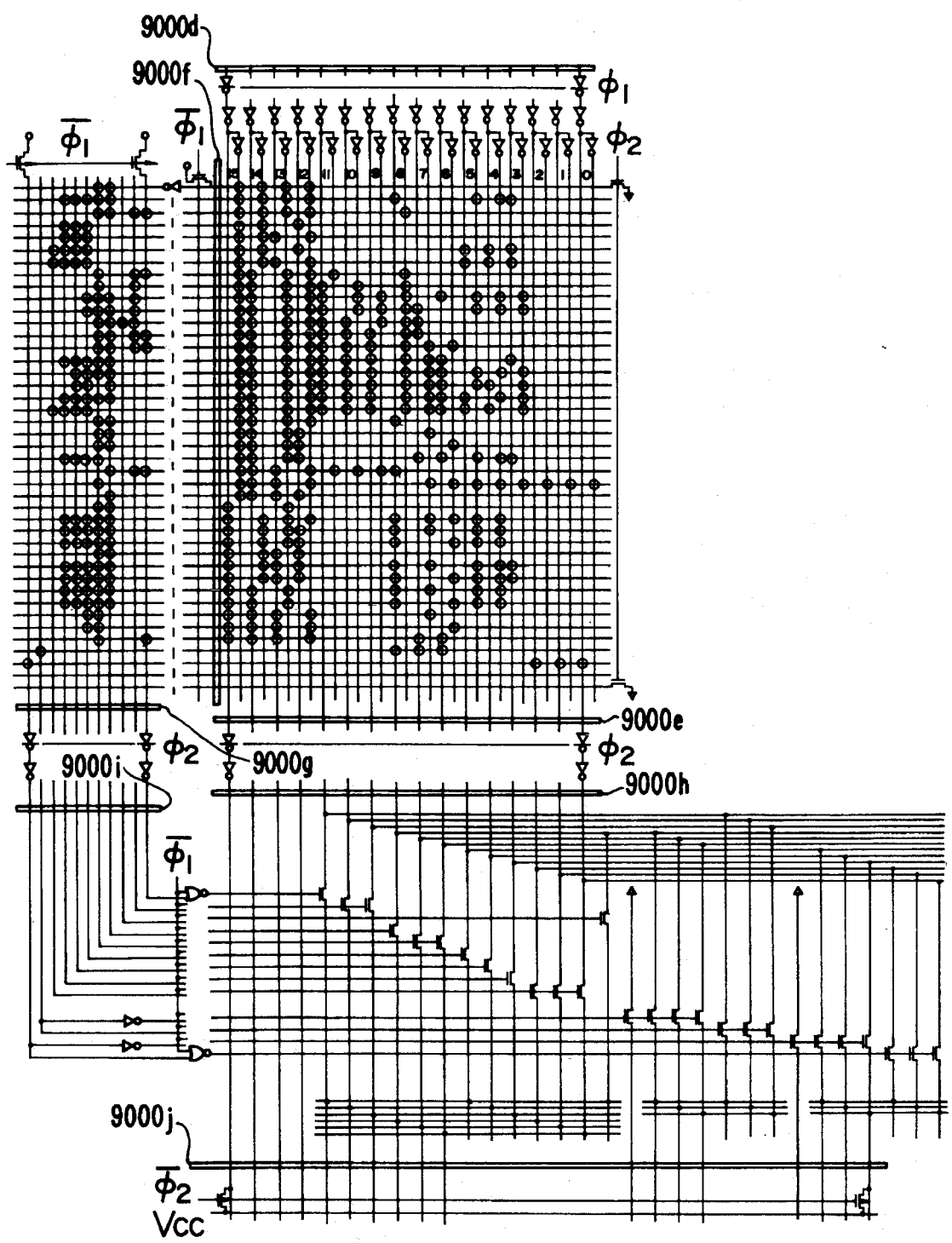
FIG. 20 is a schematic diagram showing an embodiment of the code reference means, code arrangement information memory and arrangement device shown in FIGS. 8 and 9.

FIG. 20 shows an embodiment of the code collation 802, code arrangement information memory means 803 and arrangement means 804 shown in FIGS. 8 and 9. Signal lines 9000d, 9000e, 9000f, 9000g, 9000h, 9000i and 9000j correspond to the signals referred to by the same symbols in FIG. 9, and their timing relationship is shown in FIG. 10. The code collation device 802 is formed of an AND-type dynamic PLA, while the code arrangement information memory 803 is formed of an OR-type dynamic PLA. The arrangement means 804 is made of n-channel MOS transistors as shown in the figure. The most noticeable feature of the arrangement is that instead of generating signals to be input to the microprogram memory/control unit 202 and decoder unit 203, i.e., information 9000j to be stored in the memory 303, by decoding an instruction word (signal line 9000d) to make a new binary code (identical to information 9000j) different completely from the instruction word, information 9000j is created by using part of the binary code expressing the instruction word or completely arranging again the code. Another feature is that for the arrangement of the binary code of an instruction word, arrangement information is defined so that instruction words having the completely same procedure of the arrangement format will fall in the same arrangement even if their codes are completely different. This embodiment realizes the function of the conventional instruction decoder for generating the microprogram address to be inputted to the microprogram memory/control unit from the instruction word using the hardware structure about ⅕–1/10 in scale as compared with the conventional decoder.

Figure 21:
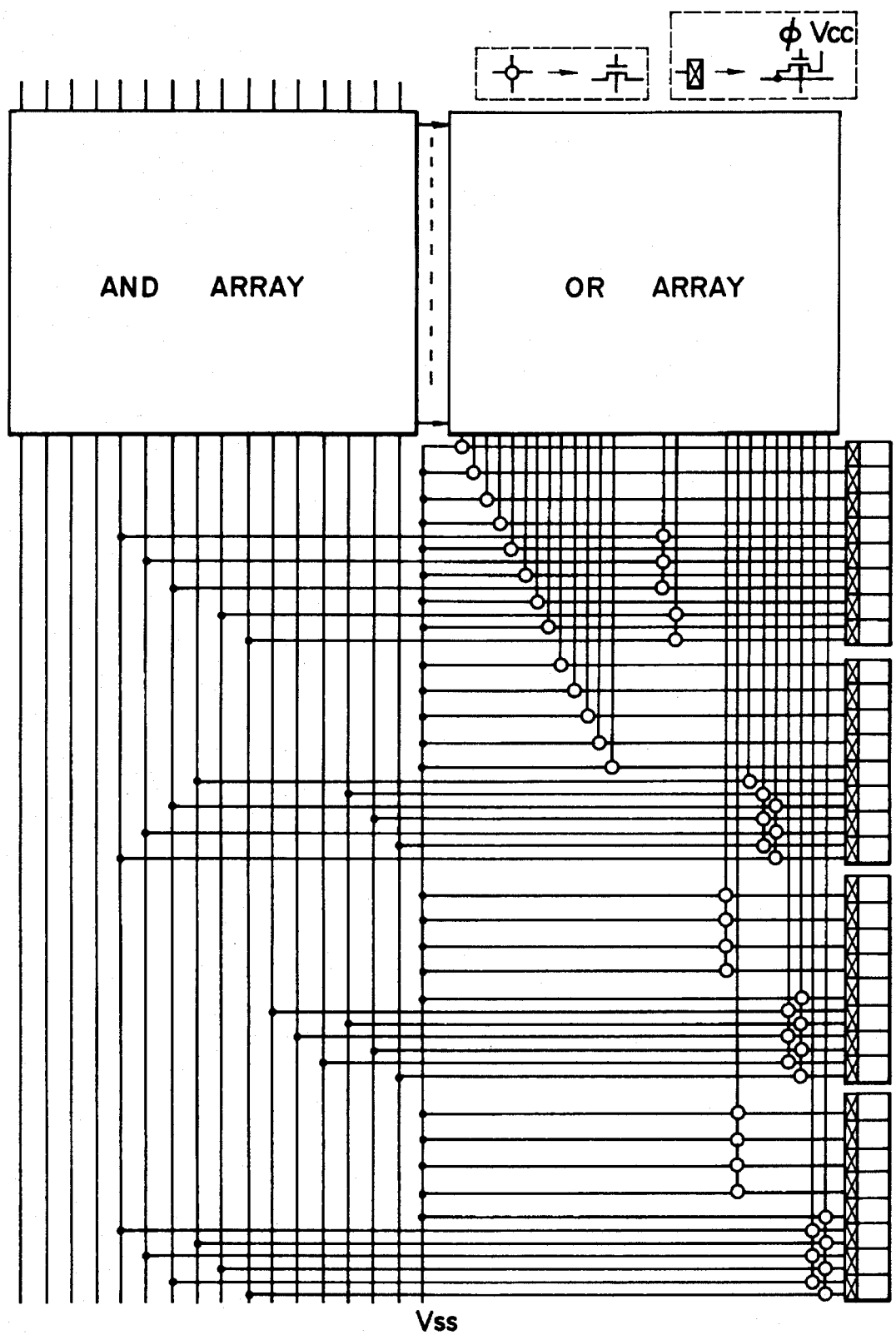
FIG. 21 is a schematic diagram showing another embodiment of the arrangement device in FIG. 20.

FIG. 21 shows another embodiment of the arrangement device 804, which differs from the embodiment of FIG. 20 in that information 9000j can be specified arbitrarily in accordance with the output of the OR array of the PLA (the code arrangement information memory 803). The embodiment of FIG. 20 provides information 9000j by arranging part or whole of the instruction code, whereas the new embodiment can produce a code as information 9000j independent of the instruction code. Namely, information 9000j having an arbitrary code pattern can be obtained for any binary code expressing an instruction word merely by changing the contents of the code arrangement information memory 803.

Figure 22:
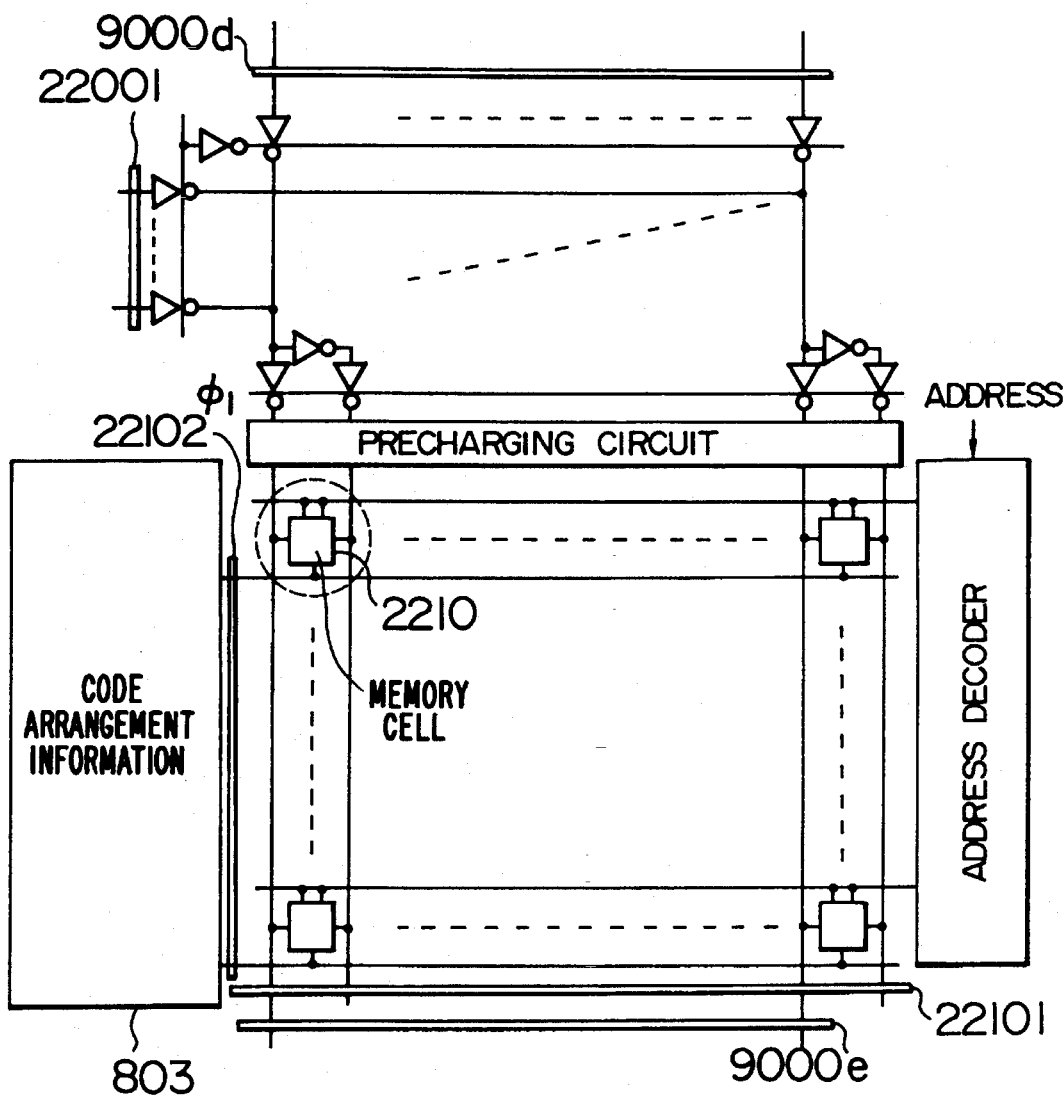
FIG. 22 is a schematic diagram of the code reference means in FIG. 8 constructed using read/write memory cells so that its contents can be translated dynamically.

FIG. 22 shows an embodiment of the code collation device 802 in FIG. 8, which is constructed using memory cells 2210 capable of access for reading and writing so that its contents can be translated dynamically. Information for collating instruction codes is defined word by word sequentially in the memory cells 2210 through the bus 22001. After all bits of the memory cells 2210 have been defined, an instruction word intended for collation is put onto the data lines 22101 through the bus 9000d. The memory cells 2210 compare the defined data with data on the data lines 22101, and drives signal lines with inconsistent results to the low level. If consistent results are reached for all bits of a word, the signal lines 22102 retain the high level. At least one of the signal lines 22102 for coincident detection is used to drive the code arrangement information memory 803 in the next stage.

Figure 23:
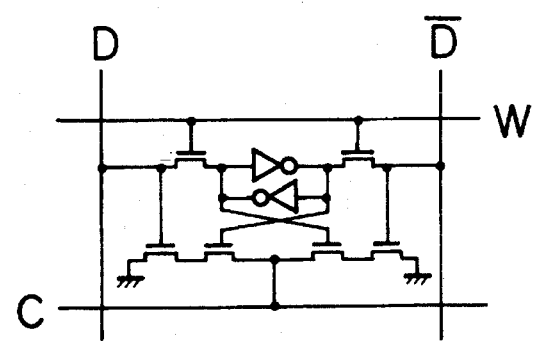
FIG. 23 is a schematic diagram showing an example of the memory cell in FIG. 22.

FIG. 23 shows in detail an example of the memory cell 2210 in FIG. 22. The memory cell 2210 is written into with data by being controlled through the signal line W. The data lines D and $\bar{D}$ have opposite polarities, and both lines are driven to the high level during the precharging cycle. At this time, the signal line C is driven to the low level, and therefore the precharging operation is desirable for the code arrangement information memory 803.

Figure 24:
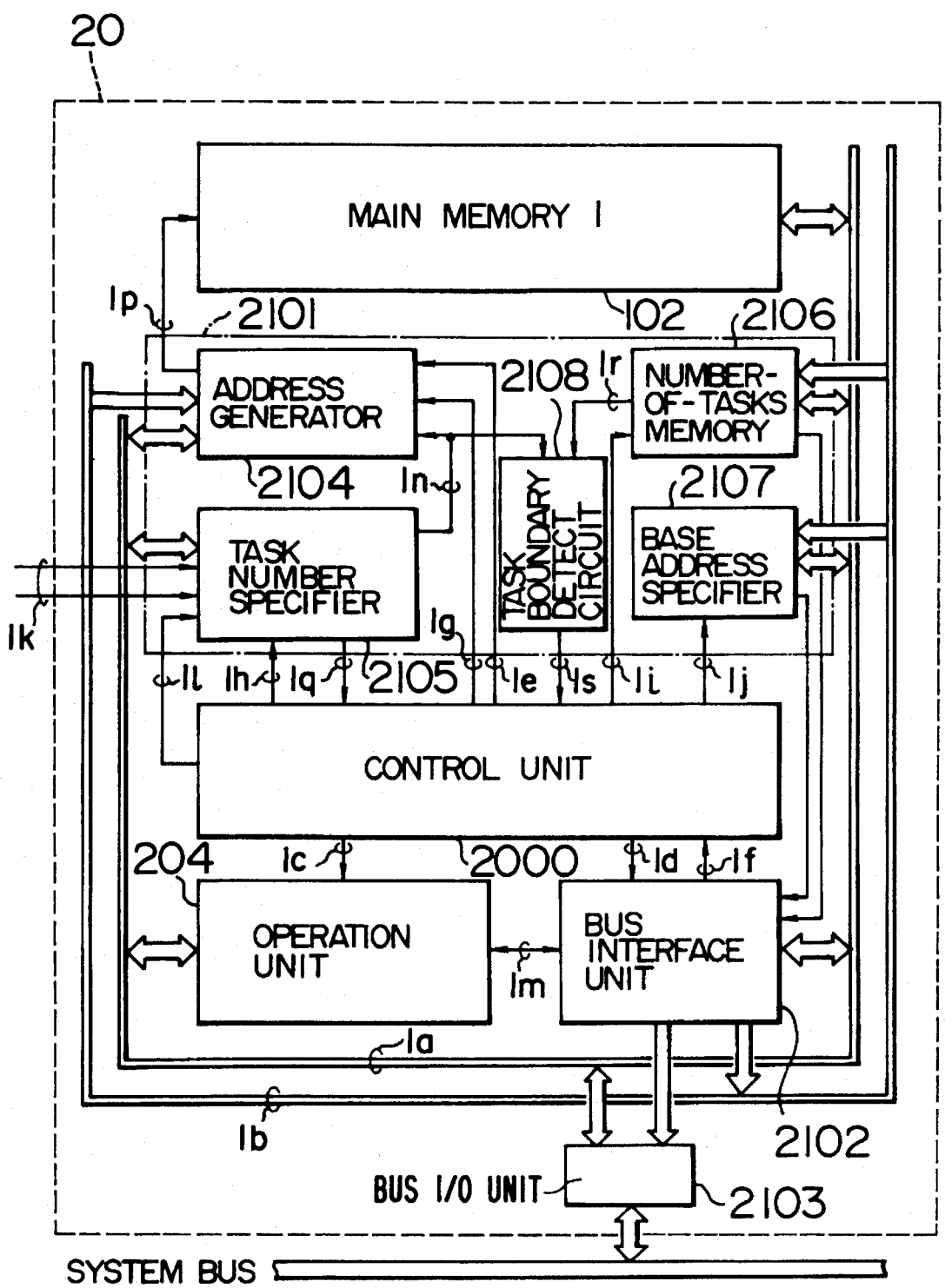
FIG. 24 is a block diagram showing part of the processor in FIG. 1 pertaining to the multiple register system.

FIG. 24 shows part of the processor shown in FIG. 1 pertinent to the multiple register system. In this arrangement, the bus interface unit 205 in FIG. 1 is split into a bus interface unit 2101 and another bus interface unit 2102, while the instruction word translation unit 201, microprogram memory/control unit 202 and decoder unit 203 are shown as a unitary control unit 2000. The bus input/output units 2081, 2082 and 2083 in FIG. 1 are shown as a bus input/output unit 2103. The bus interface unit 2101 includes an address generator 2104, task number specifier 2105, task number memory 2106, base address specifier 2107 and task boundary detection circuit 2108, all controlled by the control unit 2000. Among these functional blocks, the bus interface unit 2102, address generator 2104, task number memory 2106 and base address specifier 2107 are connected to the D-bus 1a and A-bus 1b, while the main memory 102, operation unit 204 and task number specifier 2105 are connected to the D-bus 1a. The control unit 2000 provides a control signal 1c to the operation unit 204, a control signal 1d to the bus interface unit 2102, a control signal 1e and register specifying information 1g which is included in the signal 1f from the bus interface unit to the address generator 2104, a control signal 1h to the task number specifier 2105, a control signal 1i to the taks number memory 2106, and a control signal j to the base address specifier 2107. The task number specifier 2105 is designed to receive the event occurrence signal 1k in response to an interrupt request from a peripheral unit (not shown) and the event occurrence signal 1l at the time of procedure call/return. The operation unit 204 is connected with the bus interface unit 2102 through a data transfer bus 1m. The signal 1n carries the task number obtained in the task number specifier 2105, and the signal 1p carries physical address information issued by the address generator 2104 to the main memory 102.

The following describes in brief the operation of the processor 20 incorporating the foregoing functional blocks. An instruction word read out of the main memory outside of the processor 20 is fed over the D-bus 1a to the bus interface unit 2102. The instruction word is also transferred in some cases to the control unit 2000 as signal 1f. The control unit 2000 decodes the input instruction word and, if it is an instruction using a register, sends register specifying information which is set in the register specifying field in the instruction word to the address generator 2104 and the control signal 1c to the operation unit 204.

The task number specifier 2105 responds to the event occurrence signal 1k or 1l, which arise in response to an external interrupt request or the execution of an internal subroutine interrupt, to select a task corresponding to the event and at the same time issues a task number for identifying a register set corresponding to the task to the specified address generator 2104 in accordance with the procedure described later. The address generator 2104 generates a physical address corresponding to the main memory 102 from the task number in and register specifying information 1g in accordance with the procedure described later, and sends it to the main memory 102. The main memory 102 reads out the contents of the location corresponding to the given physical address, and sends it over the D-bus 1a. The operation unit 204 takes data on the D-bus 1a in response to the control signal 1c, and implements the specified operation. After the operation, the resultant data is fed over the D-bus 1a and written into the memory specified by the instruction.

If, during the execution of a task, an event occurrence signal 1k or 1l higher in priority than the task is given, the task number specifier 2105 issues a task change request by the signal 1q, and the control unit 2000 operates to save various data such as the task number pertinent to the task in execution through the D-bus 1a to the stack in the main memory. The control unit 2000 further implements the control so as to modify the environment to meet the task of the higher priority event. In the same way as the previous case, the task number specifier 2105 issues a task number which identifies a register set corresponding to the new task. In this way, each time an event occurrence signal 1k or 1l has been applied its priority is compared with that of the current task and the task is replaced when the latter event is higher in priority. When the task number 1n has exceeded the number of tasks 1r preset in the task number memory 2106, it is detected by the task boundary detection circuit 2108 and indicated to the control unit by the signal 1s so that the control unit performs the predetermined process.

Figure 25:
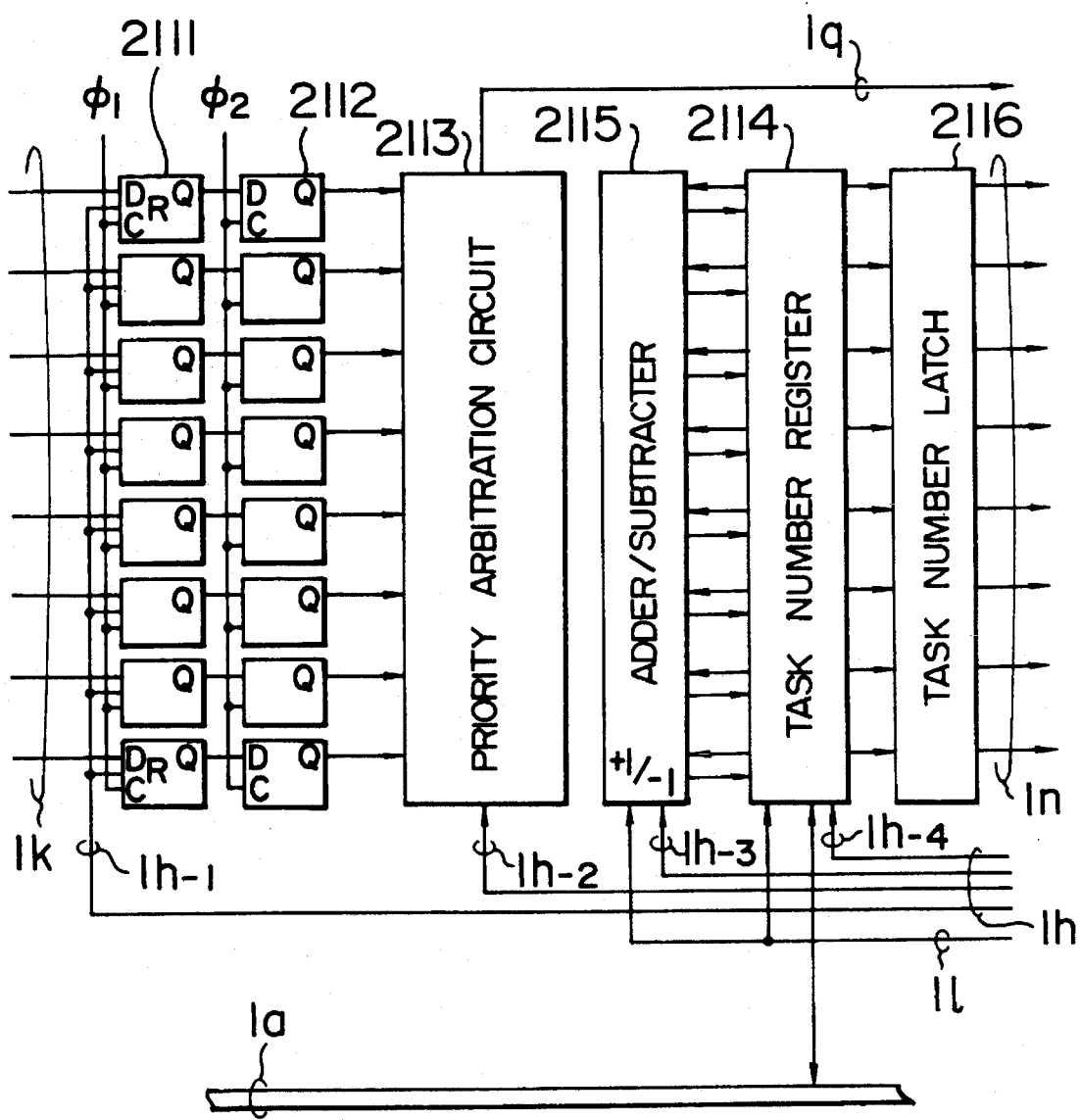
FIG. 25 is a block diagram of the task number specifying section in the arrangement of FIG. 24.

FIG. 25 shows the detailed arrangement of the task number specifier 2105, which consists of a first flip-flop group 2111 and second flip-flop group 2112 for timing the event occurrence signals 1k, a priority arbitration circuit 2113 for testing the priority among the events, a task number register 2114 for holding the task number, an adder/subtracter 2115 for incrementing or decrementing by one the contents of the task number register 2114 depending on the value 1h–3 which is part of the control signal 1h, and a task number latch 2116 for temporarily holding the task number.

The operation of the above arrangement will be described with reference to FIG. 25. The event occurrence signals 1k entered asynchronously with the basic clocks $\phi_1$ and $\phi_2$ in the processor 20 are sampled by the first flip-flop group 2111 and synchronized with the basic clock $\phi_2$ by the second flip-flop group 2112. Synchronized event signals are delivered to the priority arbitration circuit 2113, and an event signal which is determined to be higher in priority than the current task causes the issuance of the event occurrence detect signal 1q to the control unit 2000. In response to this signal, the control unit 2000 issues a control signal 1h to replace the task number which has been effective until the event has occurred with the new task number in the task number register 2114. In case a procedure call/return or the like occurs during the task process execution, the control unit 2000 issues a signal 1l so as to replace the task immediately.

It should be noted that the task number register 2114 is connected to the D-bus 1a with the intention of allowing the instruction to access to the task number register 2114 for reading or revising the contents. In this embodiment, when the instruction for revising the contents of the task number register 2114 has been executed, the task number indicated by the task number register 2114 immediately before the execution of the instruction, i.e., the task number before revision, is saved to the stack using the stack pointer in the register set specified by the revised task number after the execution of the instruction. In order to retrieve the former task number which has been saved, there is provided an instruction which reads out the contents of the stack indicated by the stack pointer in the register set specified by the current task number and sets it in the task number register 2114.

Figure 26:
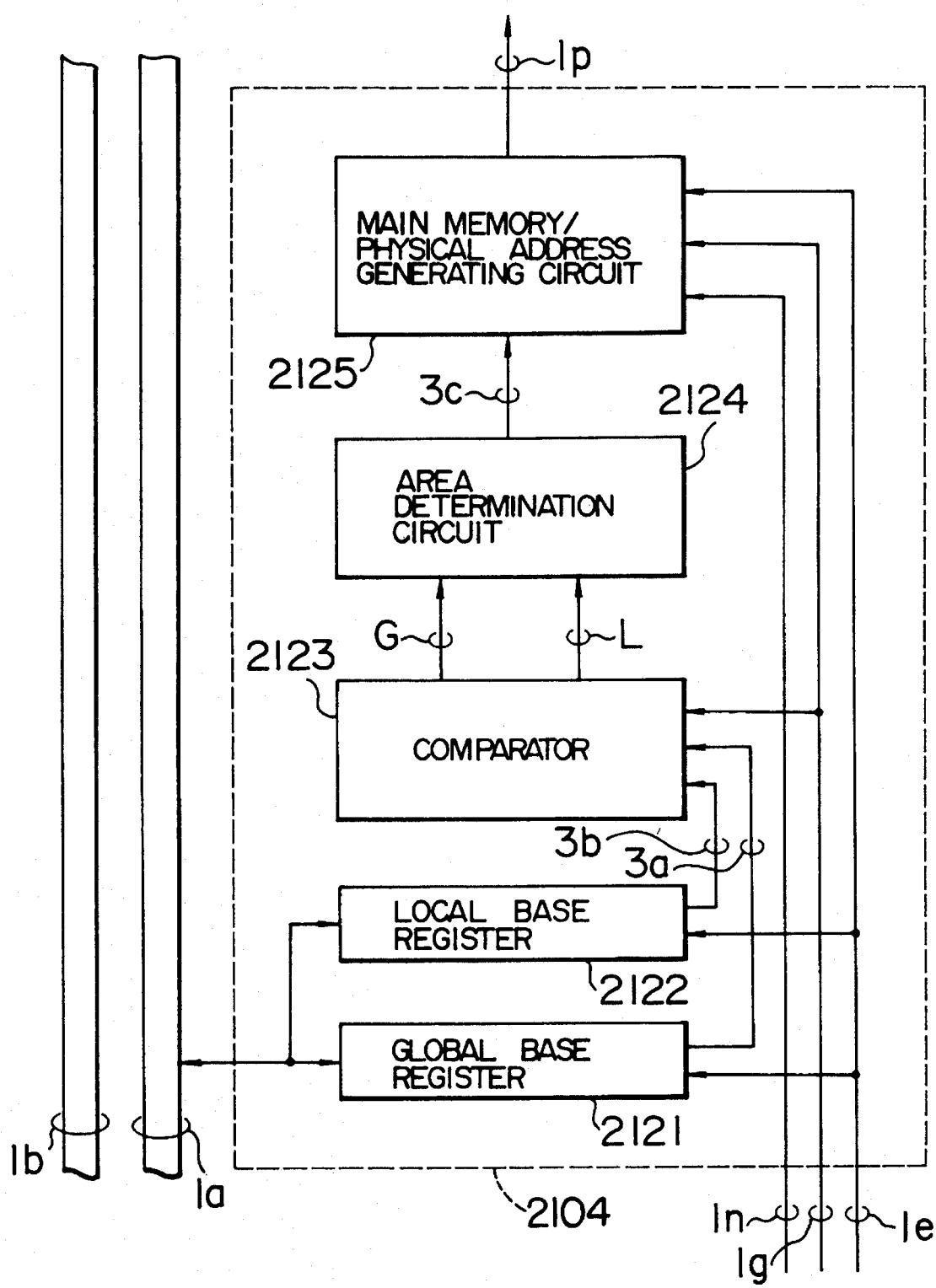
FIG. 26 is a block diagram of the address generating section in the arrangement of FIG. 24.

FIG. 26 shows in detail the arrangement of the address generator 2104. The address generator 2104 is to produce physical address information for the main memory 2107 basing on the task number in and register specifying information 1g, and it consists of a global base register 2121, a local base register 2122, a comparator 2123, an area determination circuit 2124 and a RAM physical address generating circuit 2125. The global base register 2121 and local base register 2122 can be accessed by the instruction for revising the contents. The comparator 2123 operates to compare the contents 3a of the global base register 2121 and the register number included in the register designating information 1g and also compare the contents 3b of the local base register 122 with the register number in 1g. The results of comparison are delivered as signals G and L, respectively, to the area determination circuit 2124. The area determination circuit 2124 determines one of the global area, local common area and local bank area in accordance with the signals G and L, and provides information as a control signal 3c necessary for generating the physical address of the main memory 102. The RAM physical address generating circuit 2125 produces the physical address of the on-chip RAM from the task number in and register number included in the register specifying information 1g in accordance with the control signals 3c and 1e. In this embodiment, the main memory 102 has a capacity of 1152 bytes, 64 bytes for each task. Accordingly, sixteen 32-bit registers can be provided for each task.

The following describes, as an example, the operation of each functional block of the address generator 2104.

(1) Task switching from an even-numbered task to an odd-numbered task

Figure 27A:
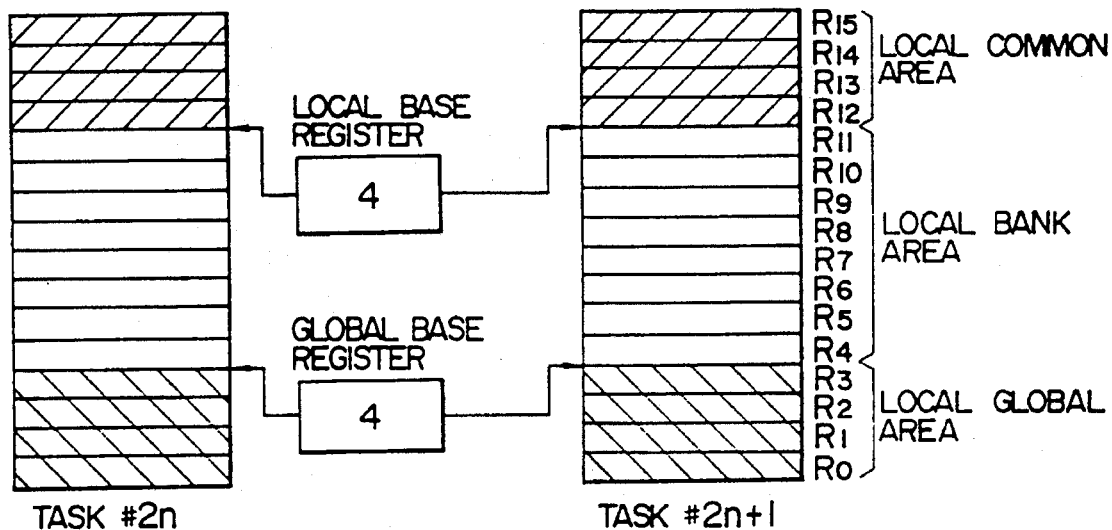
FIG. 27 is a set of diagrams used to explain the overlapping states of the general-purpose registers.
Figure 27B:
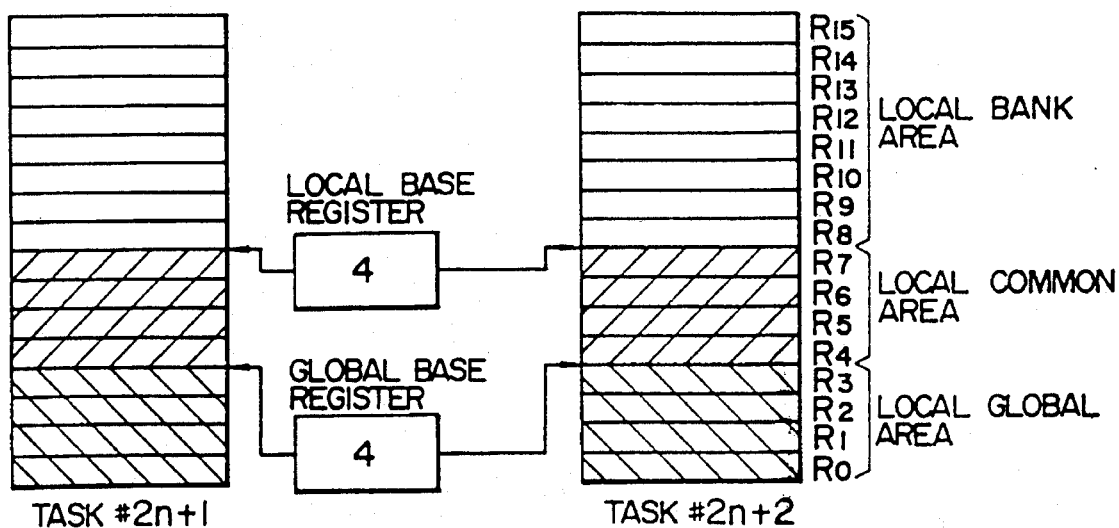

When the global base register 2121 contains "4" and the local base register 2122 contains "4", the registers for task #2n+1 are grouped into a global area, local common area and local bank area, as shown in FIG. 27(a). These areas include registers as follows.

(i) Global area: R0–R3

(ii) Local common area: R15–R12

(iii) Local bank area: R4–R11

(2) Task switching from an odd-numbered task to an even-numbered task

When the global base register 2121 contains "4" and the local base register 2122 contains "4", the registers for task #2n+2 are grouped into the three areas as in case (1). These areas include registers as follows.

(i) Global area 21201: R0–R3

(ii) Local common area 21202: R4–R7

(iii) Local bank area 21203: R8–R15

Supposing a task switching from task #1 to task #2, which is relevant to the above case (2) of task switching from odd to even task number, the following operation takes place.

(i) Access to registers R0–R3 in the global area 21201

When registers R0–R3 for task #2 are specified, R0–R3 for task #0 are accessed.

(ii) Access to registers R4–R7 in the local common area 21202

When registers R4–R7 for task #2 are specified, R4–R7 for task #1 are accessed.

(iii) Access to registers R8–R15 in the local bank area 21203

When registers R4–R7 for task #2 are specified, R4–R7 for the current task #2 are accessed.

Figure 28:
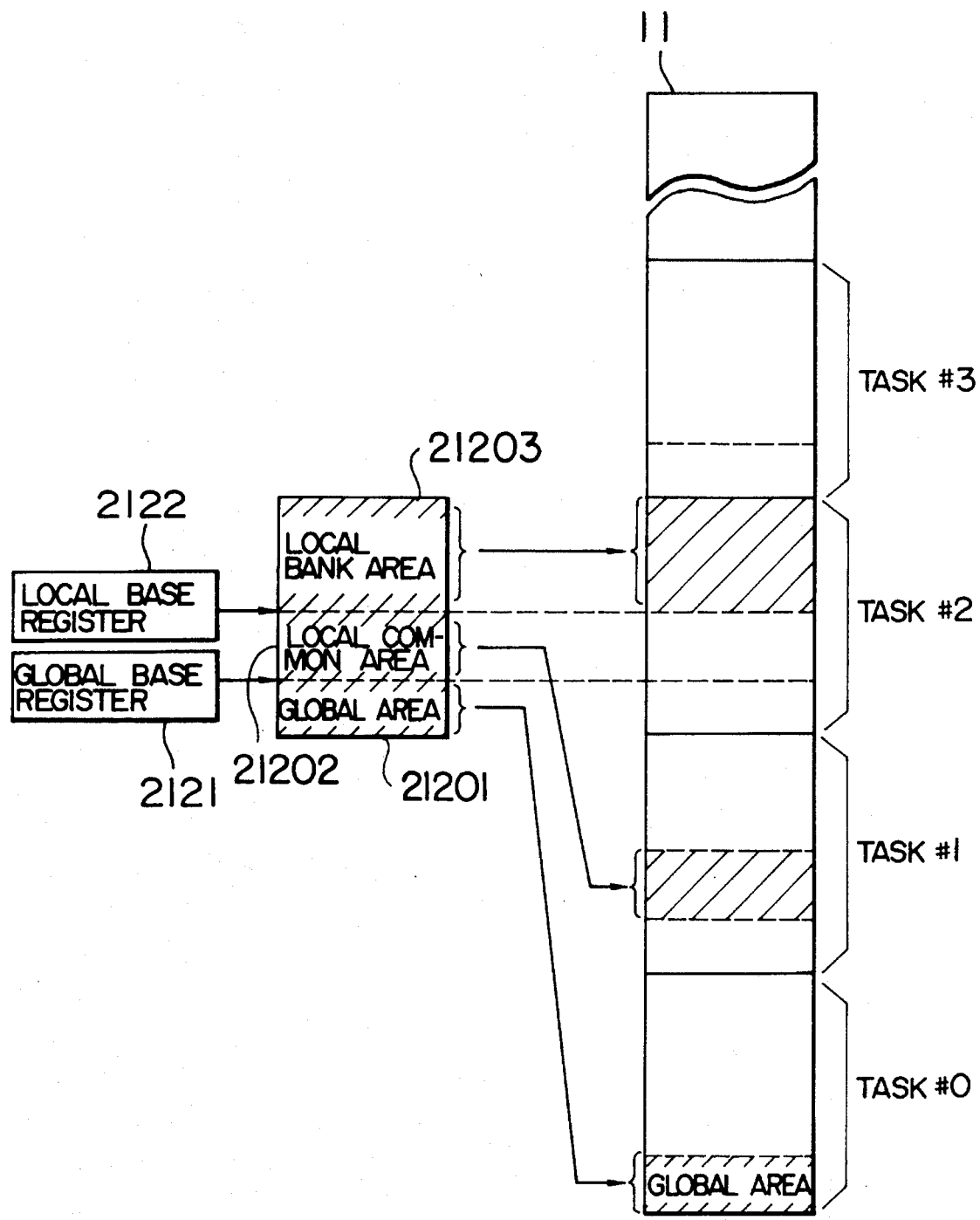
FIG. 28 is another diagram used to explain the overlapping states of the general-purpose registers.

These access operations are shown in FIG. 28. In any task, when a register in the global area 21201 is specified, a corresponding register for task #0 is accessed When a register in the local common area 21202 is specified, a corresponding register for the previous task is accessed. When a register in the local bank area 21203 is specified, a corresponding register for the current task is accessed.

Accordingly, when it is intended to transact parameters among tasks, the only requirement is to specify the contents of the global base register 2121 and local base register 2122 in advance and actual parameter transaction among tasks is not needed, whereby high-speed task switching is made possible.

Figure 29:
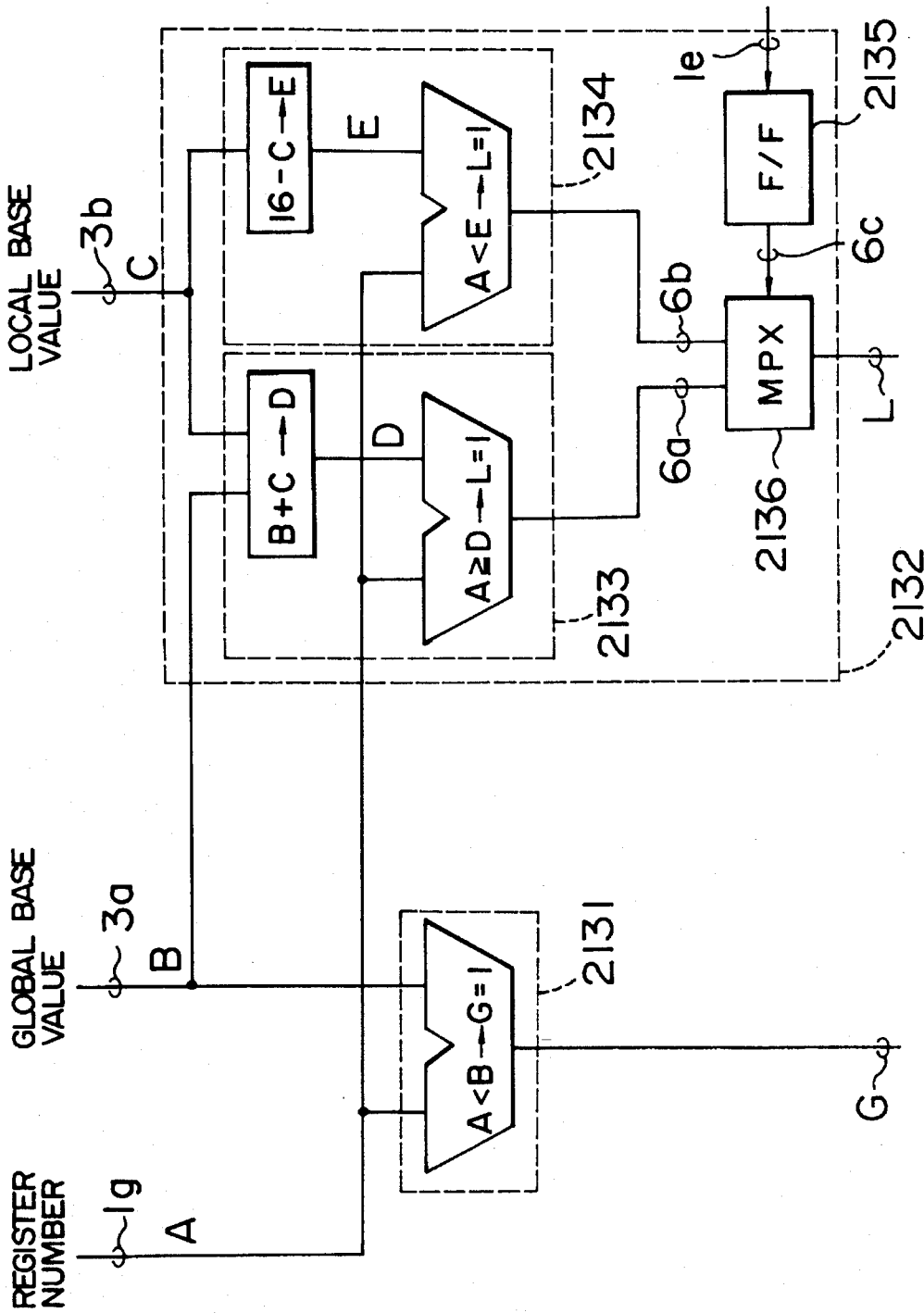
FIG. 29 is a block diagram of the comparator in the address generating section in FIG. 26.

FIG. 29 shows in detail the arrangement of the comparator 2123. The comparator 2123 consists of a comparison circuit 2131 capable of identifying a global area 21201 and a comparison circuit 2132 capable of identifying a local bank area 21203. The comparison circuit 2131 compares the register number A included in the register specifying information 1g with the global base value B which is the output 3a of the global base register 2121, and produces an output signal G at logical level "1" if A is smaller than B, or otherwise produces a "0" output. The comparison circuit 2132 consists of a comparison circuit 2133 capable of identifying a local bank area when switching has been made from an odd-numbered task to an even-numbered task, and a comparison circuit 2134 capable of identifying a local bank area 21203 when switching has been made from an even-numbered task to an odd-numbered task, both circuits having their outputs 6a and 6b at logical level "1" when the register number A belongs to the local bank area 21203. A multiplexer 2136 selects one of the outputs 6a and 6b to produce a signal L in accordance with the output 6 of the flip-flop 2135 which is controlled by the signal 1e from the control unit 2000.

Figure 30:
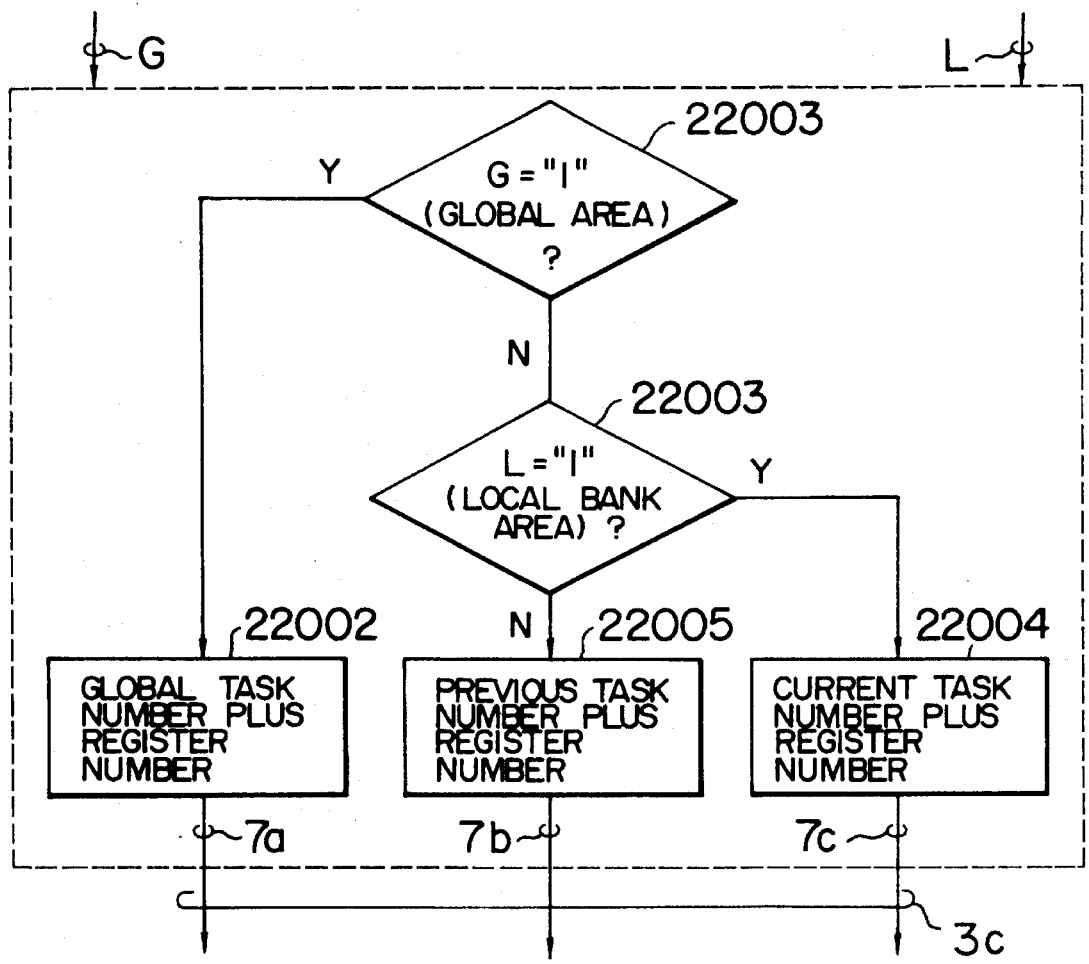
FIG. 30 is a flowchart showing the determining process carried out by the area determination circuit in FIG. 26.

FIG. 30 shows the process carried out by the area determination circuit 2124.

Initially, the relevance of the global area is tested basing on the value of the signal G 22001.

(i) Affirmative test result: The circuit recognizes the area to be the global area, and issues a signal 7a dictating that the physical address of the main memory 102 be generated using the global task number and register number (step 22002).

(ii) Negative test result: The circuit recognizes the area to be not the global area, and proceeds to the next decision step. In this step, the circuit tests whether the area is the local bank area or the local common area basing on the value of the signal L (step 220032).

(iii) Affirmative test result: The circuit recognizes the area to be the local bank area, and issues a signal 7c dictating that the physical address of the main memory 102 be generated using the current task number and register number (step 22004).

(iv) Negative test result: The circuit recognizes the area to be the local common area, and issues a signal 7b dictating that the physical address of the main memory 102 be generated using the previous task number and register number (step 22005).

These signals 7a, 7b and 7c produced as a result of the above decision process are delivered as signal 3c to the RAM physical address generating circuit 2125.

Figure 31:
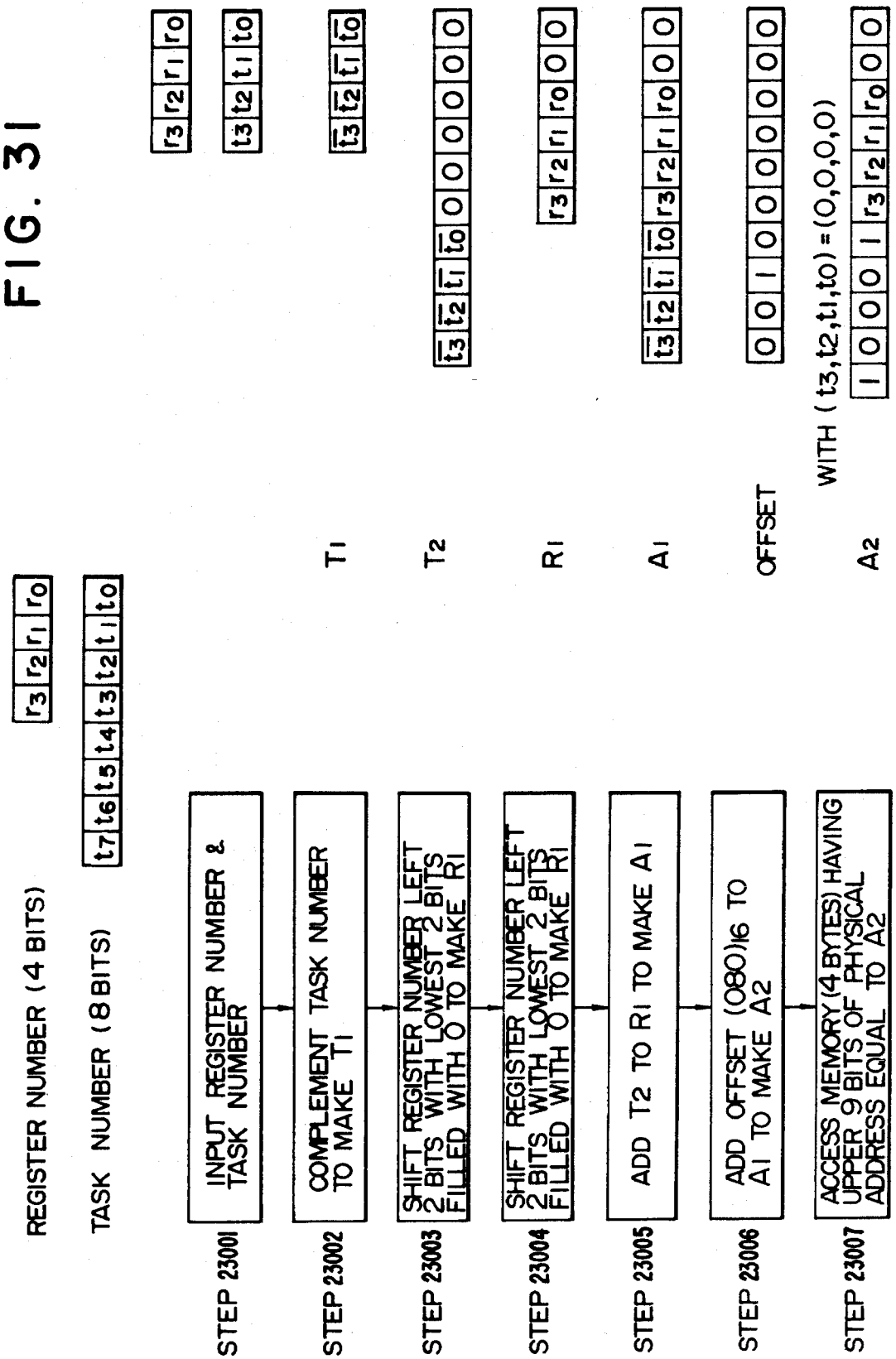
FIG. 31 is a diagram used to explain the physical address generating procedure for the main memory address generating circuit in FIG. 26.

FIG. 31 shows the procedure of physical address generation by the main memory address generating circuit 2125. In this embodiment, the main memory 102 has a capacity of 1152 bytes and therefore the physical address ranges from 0 to 1151. The following describes the operation of the case of 16 tasks provided in the main memory 102. In this case, the low-order four bits of the task number in provided by the task number specifier 2105 are effective to indicate the task number. The physical address is generated in accordance with the following procedure.

(1) Step 1 23001

The address generator receives a task number $(t3t2t1t0)_2$ which is based on the register number $(r3r2r1r0)_2$ included in the register specifying information 1g and the signal 3c provided by the area determination circuit 2124.

(2) Step 2 23002

The task number is complemented to obtain $T1=(\overline{t3}\,\overline{t2}\,\overline{t1}\,\overline{t0})_2$.

(3) Step 3 23003

The T1 shifted to the left with a "0" being entered to the lowest-order bit. The shift operation is repeated six times to obtain $T2=(\overline{t3}\,\overline{t2}\,\overline{t1}\,\overline{t0}\,0\,0\,0\,0\,0\,0)_2$.

(4) Step 4 23004

The register number is shifted to the left with a "0" being entered to the lowest-order bit. The shift operation is repeated twice to obtain $R1=(r3r2r1r0\,0\,0)_2$.

(5) Step 5 23005

The T2 is added to the R1 to obtain $A1=(t3t2t1t0r3r2r1r0\,0\,0)_2$.

(6) Step 6 23006

Offset value $(080)_{16}$ is added to the A1 to obtain the result A2. For example, task number $(0000)_2$ produces the result $A2=(1\,0\,0\,0\,1\,r3r2r1r0\,0\,0)_2$. The offset value at this time is determined uniquely from the total capacity of the main memory 102, and it takes the above-mentioned value for a 1152 byte main memory.

(7) Step 7 23007

The main memory 102 is accessed with high-order nine bits "1 0 0 1 r3r2r1r0" of A2 being set to the high-order nine bits of the address. Namely, four bytes are accessed concurrently. This operation results from the assumption of 32-bit registers, and is confined to this embodiment.

Figure 32:
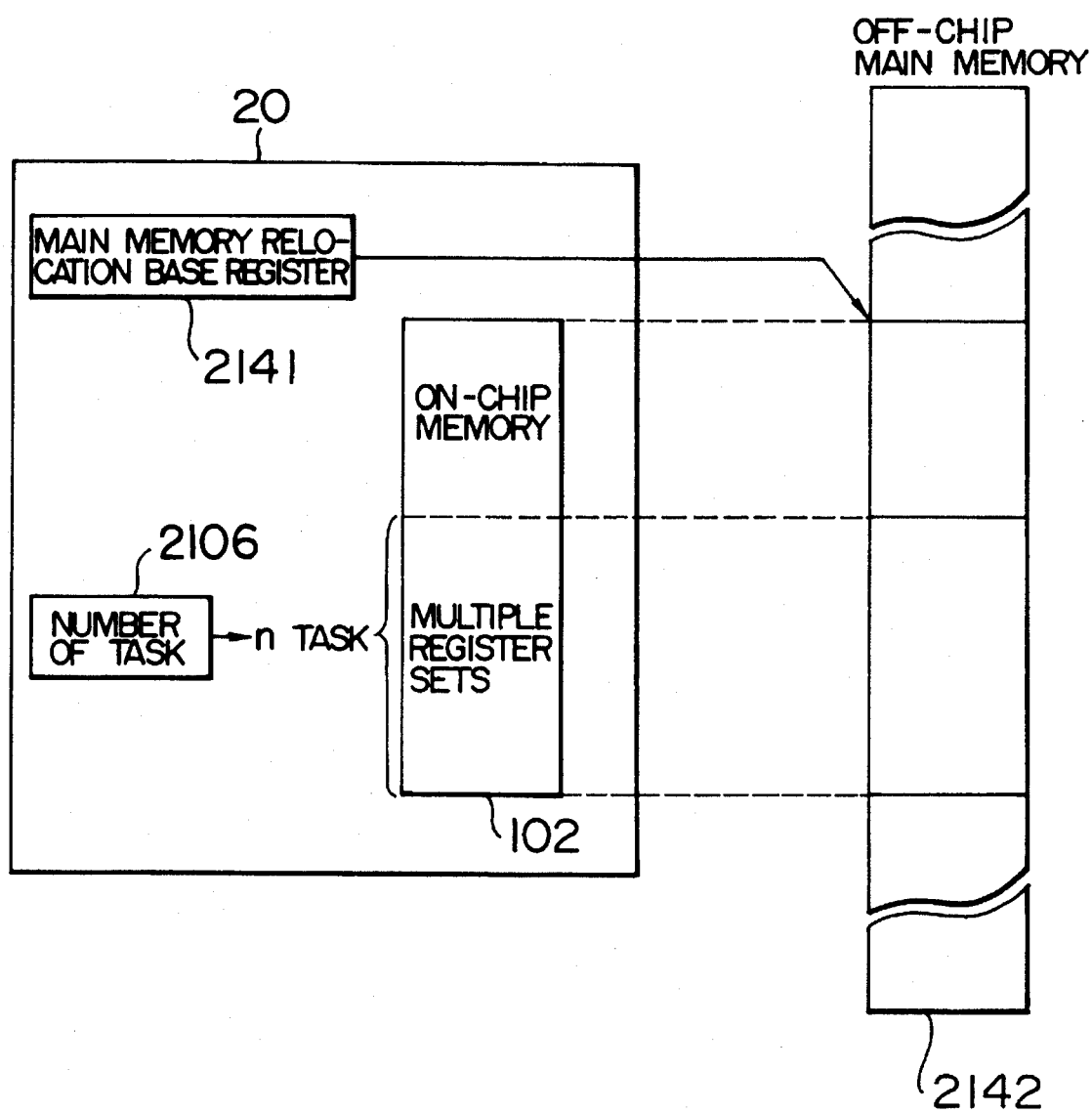
FIG. 32 is a block diagram showing the relationship between the main memory and the off-chip main memory.

FIG. 32 shows the relationship between the off-chip main memory 2142 and on-chip main memory 102 based on the contents of the main memory base register 2141 included in the base address specifier 2107. The main memory base register 2142 can be accessed by the instruction for setting the contents arbitrarily. When an arbitrary address of the off-chip main memory 2142 is set in the main memory base register 2142, an address space ranging from that address up to 1152 is assigned to the on-chip main memory 102. Accordingly, when the address of the memory specified by the bus interface unit 2102 is included in the above-mentioned address space, the processor 20 makes access to the main memory 102. Namely, it is controlled so that the main memory 102 in the processor 20 is arranged in arbitrary location of the off-chip main memory 2142 by merely changing the contents of the main memory base register 2141. This embodiment is provided with an address detection means for distinguishing the register area in the main memory 102 and other area so that the area defined to be register sets for the task process is not accessed as a memory area. For n tasks indicated by the task number memory 2106 the area for register sets in defined.

Figure 33:
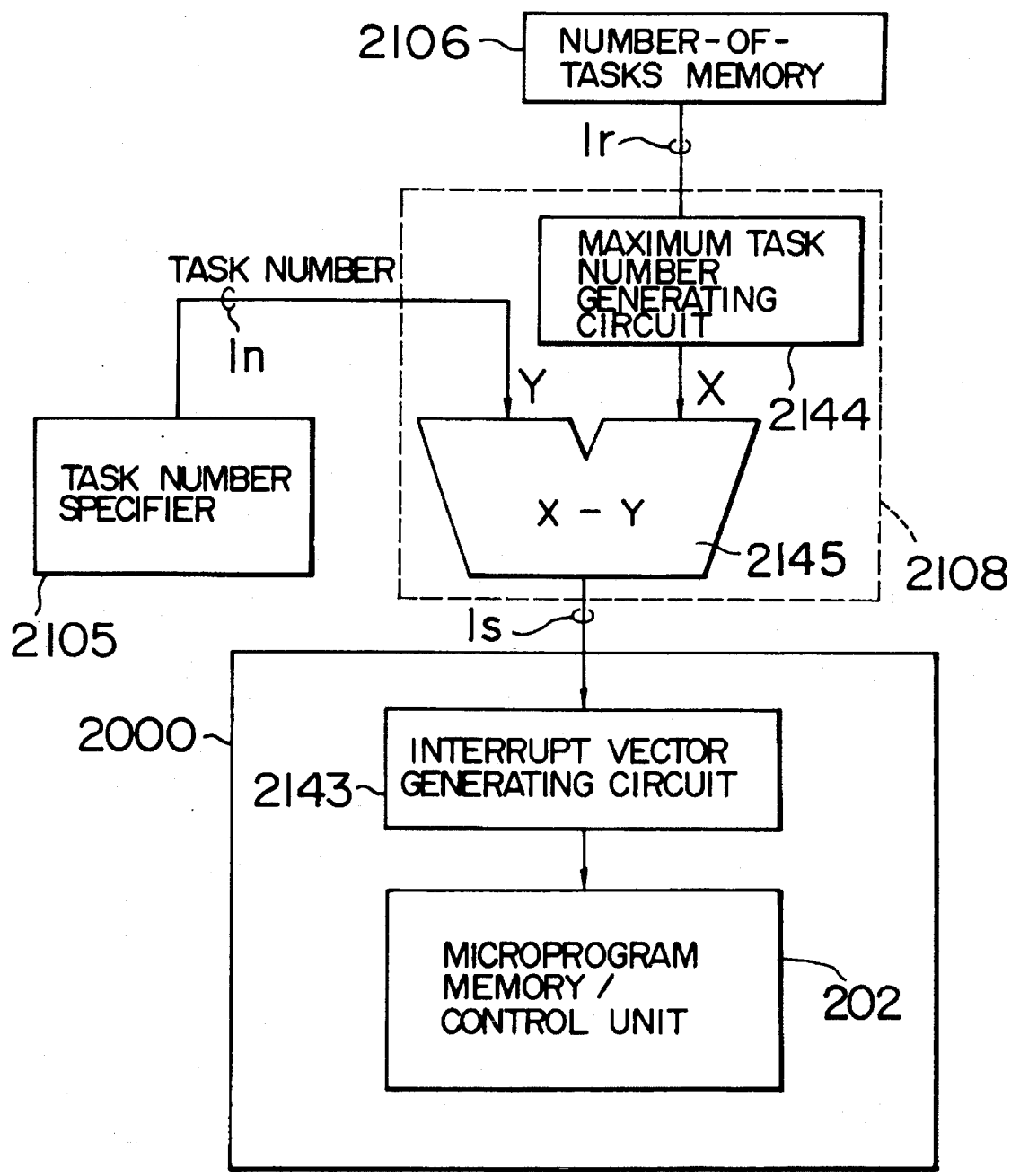
FIG. 33 is a block diagram of the task boundary detecting circuit.

FIG. 33 shows the arrangement of the task boundary detection circuit 2108. The task number 1n is compared with the number of tasks 1r which is set in the task number memory 2106 by the comparison circuit 2145, and if the task number 1n has exceeded the number of tasks 1r, it is indicated by the signal 1s to the interrupt vector generating circuit 2143 in the control unit 2000, which then executes a predetermined exceptional process by the control of the microprogram memory/control unit 202. In this embodiment, the task number memory 2106 can be accessed by the instruction for revision, and the memory contents signifies the number of tasks as follows.

(i) 0: two tasks (ii) 1: four tasks (iii) 2: eight tasks (iv) 3: 16 tasks

Accordingly, for the task number memory contents of N, the maximum task number is $2^{N+1}$. There is provided a maximum value generating circuit 2144 for calculating $2^{N+1}$ from N, but the provision of this circuit 2144 is confined to this embodiment.

Figure 34:
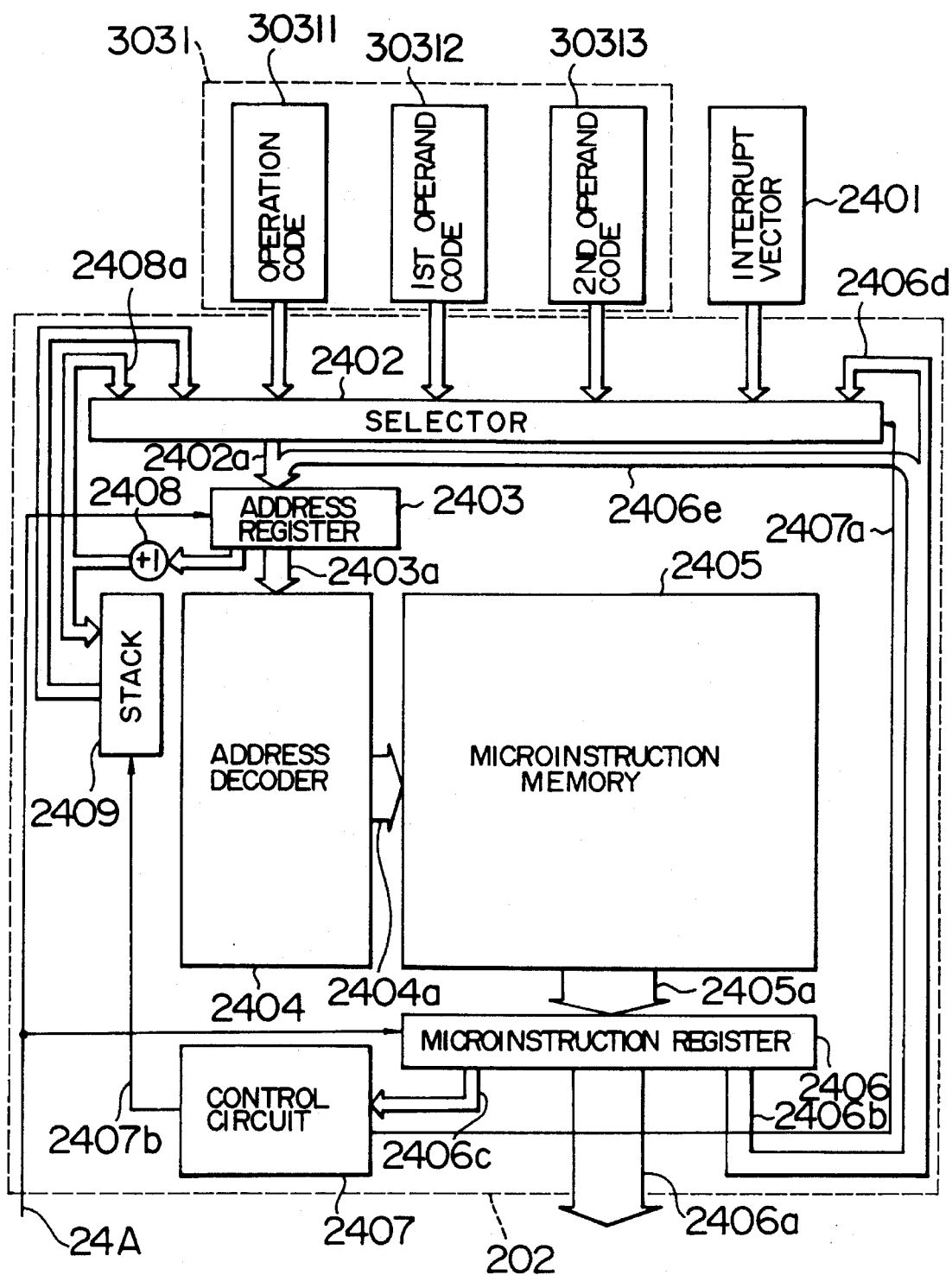
FIG. 34 is a block diagram showing an embodiment of the microprogram memory/control unit in the arrangement of FIG. 1.

FIG. 34 shows an embodiment of the microprogram memory/control unit 202. The microprogram memory/control unit 202 receives in the information 3031 including operation code 30311, 1st operation code 30312, and 2nd operation code 30313, and interrupt vector 2401, and part of the microprogram address to be set in the microprogram address register 2403 is selected by the selector 2402. The selected signal 2402a is merged with the signal 2406e which is part of the output from the microinstruction register 2406, and the result is held in the microprogram address register 2403. The output of the microprogram address register 2403 is delivered to the address decoder 2404 and, at the same time, incremented by the +1 adder 2408 and the resultant signal 2408a is fed to the selector 2402. The address decoder 2404 decodes the microprogram address and sends the result to the microinstruction memory 2405. The microinstruction memory 2405 reads out a specified microinstruction and sets it in the microinstruction register 2406. The microinstruction register 2406 provides three major outputs including signal 2406a which is the signal for controlling the decoder unit 203 and operation unit 204, signal 2406b which is the signal for specifying a branch destination address when the microprogram makes branching, and signal 2406c which is the signal for controlling the next address of the microprogram. A control circuit 2407 responds to the signal 2406c to produce a signal 2407a for controlling the selector 2402 and a signal 2407b for controlling the stack 2409 used for saving the microprogram address.

Figure 35:
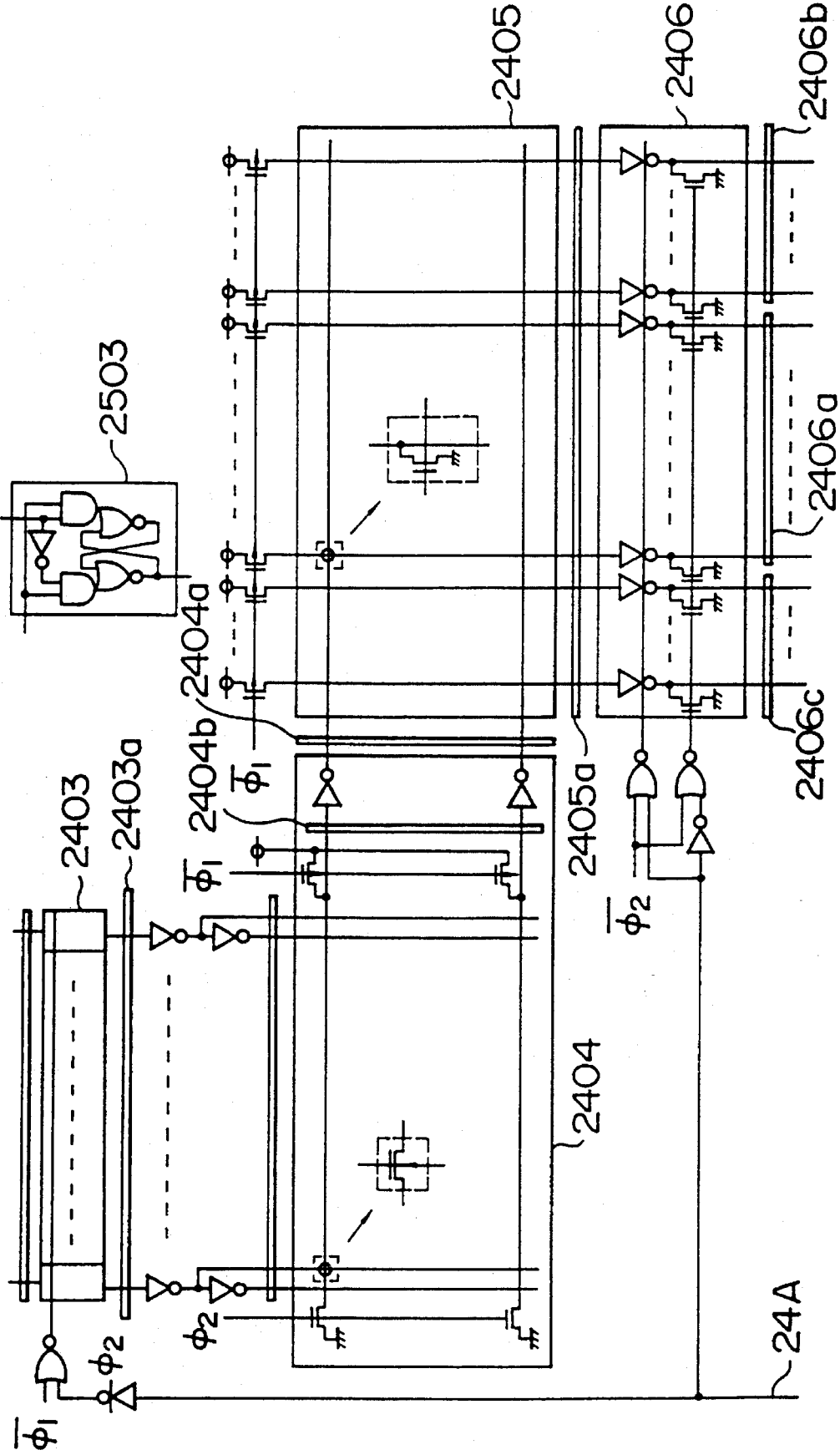
FIG. 35a is a schematic diagram showing an embodiment of the microprogram address register, address decoder, microinstruction memory and microinstruction register.
FIG. 35b shows a flip-flop in the microprogram address register.

FIG. 35(a) shows an embodiment of the microprogram address register 2403, address decoder 2404, microinstruction memory 2405 and microinstruction register 2406 shown in FIG. 34. Each bit of the microprogram address register 2403 is formed of a flip-flop 2503 as shown in FIG. 35(b), for example. The address decoder 2404 is formed of an AND-type dynamic PLA, while the microinstruction memory 2405 is formed of an OR type dynamic PLA. The microinstruction register 2406 is formed of a dynamic latch.

Figure 36:
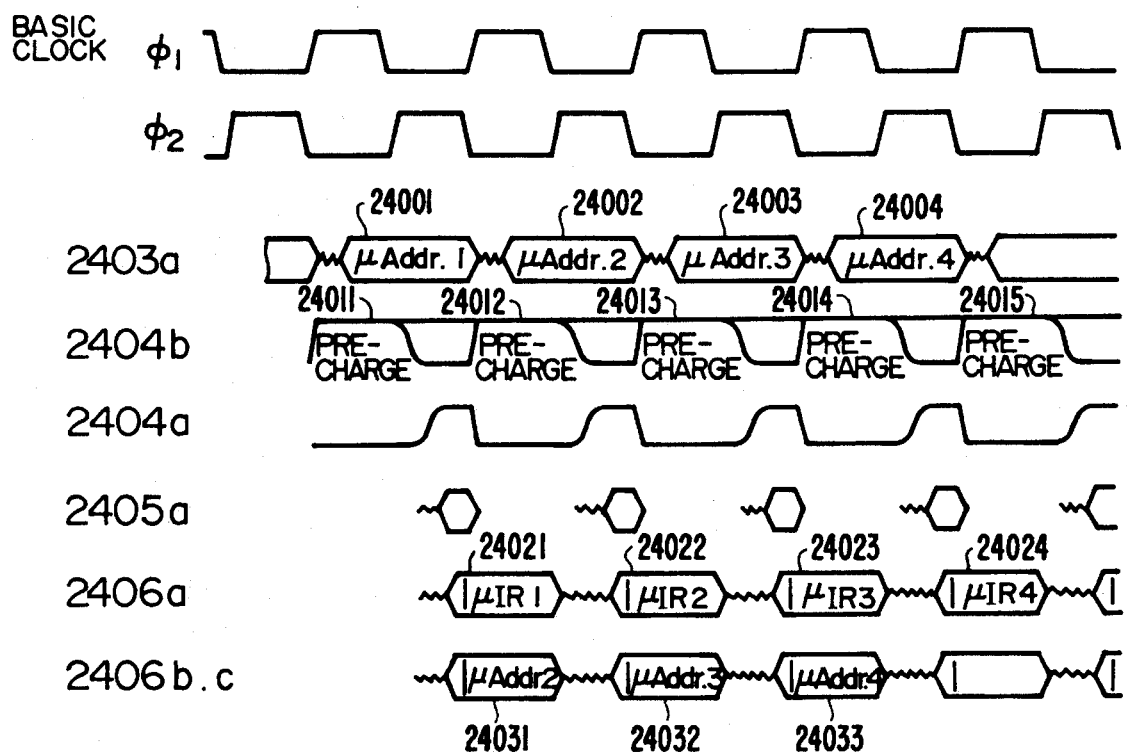
FIG. 36 is a timing chart showing the signals at various portions of the arrangement shown in FIG. 35.

FIG. 36 shows the timing relationship of the signals together with the basic clocks $\phi_1$ and $\phi_2$. Microprogram addresses 24001 to 24004 are outputted at the output 2403a of the microprogram address register 2403 successively in synchronism with the basic clock $\phi_1$. At the output 2404b of the address decoder 2404, the precharge 24011 to 24015 are made in synchronism with the basic clock $\phi_2$. At the output 2406a of the microinstruction register 2406 microinstructions 24021 to 24023 appear successively in synchronism with the basic clock $\phi_2$, and at the outputs 2406b and 2406c of the microinstruction register 2406, microaddresses 24031 to 24033 appear also in synchronism with the basic clock $\phi_2$. As can be seen from FIG. 36, one clock period is needed to obtain the output of the microinstruction register 2406 after the output 2403a of the microprogram address register 2403 has settled.

Figure 37:
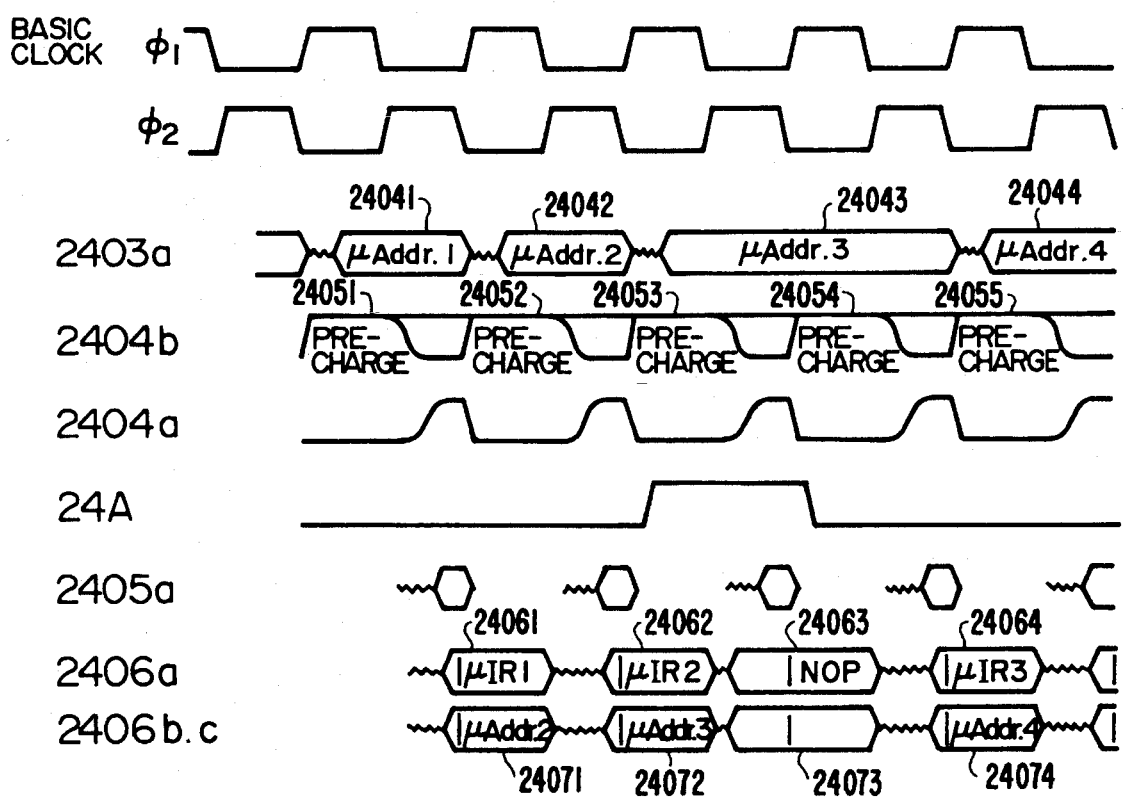
FIG. 37 is a timing chart showing the signals for the case where the microprogram memory/control unit is halted without suspending the basic clock.

FIG. 37 shows the timing relationship of the signals when the microprogram memory/control unit 202 is halted without suspending the basic clocks $\phi_1$ and $\phi_2$. Signal 24A is the signal for halting the microprogram memory/control unit 202, and the signal at high level causes the microprogram address register 2403 to stay unchanged and the microinstruction register 2406 to produce a low level output for all bits. By assigning this special value (all low bits) of the microinstruction register to be a "no operation" command for the application system, the microprogram memory/control unit 202 can apparently be halted. The example of FIG. 37 shows the timing relationship of the case where a halt of one clock period is placed (shown by Nop in the figure) between the cycle of microinstruction 2 (shown by µIR2 in the figure) and the cycle of microinstruction 3 (shown by µIR3 in the figure). In FIG. 37, at the output 2403a microprogram addresses 24041 to 24044 appear in synchronism with the basic clock $\phi_1$. The microprogram address 24043 is outputted for two clock cycles since the renewal of the microprogram address register 2403 is stopped. At the output 2404b the precharges 24051 to 24055 are made in synchronism with the basic clock $\phi_2$. At the output 2406b and the outputs 2406 b, c, or the microinstruction register 2406 the microinstructions 24061, 24062 and 24064 and the microaddresses 24061, 24062, 24064, 24071, 24072 and 24074 appear in synchronism with the basic clock $\phi_2$. The level of the output 2406a and the outputs 2406 b and c becomes low at the periods 24063 and 24073.

Figure 38:
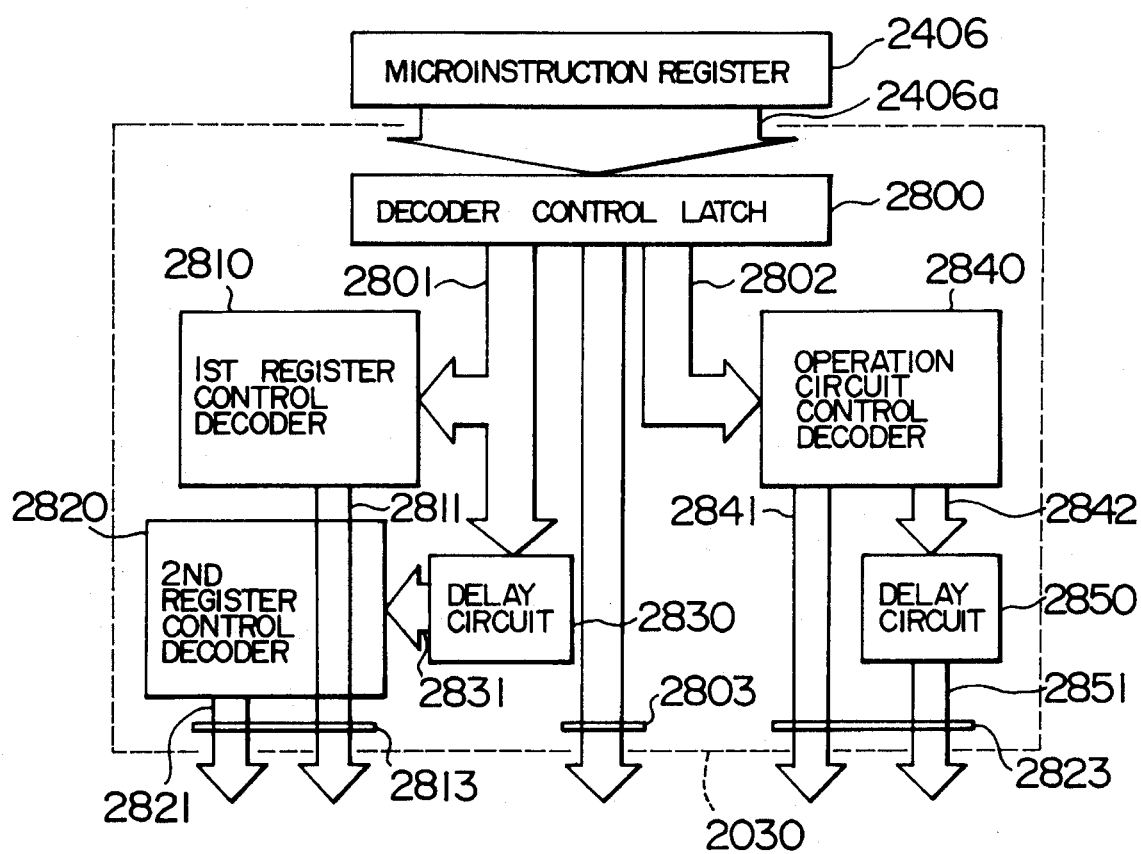
FIG. 38 is a block diagram showing the operation control decoder within the decoder unit shown in FIG. 1.

FIG. 38 shows the arrangement of the operation control decoder 2030 in the decoder unit 203. The decoder 2030 consists of a decoder control latch 2800, a first register control decoder 2810, a second register control decoder 2820, an operation circuit control decoder 2840 and delay circuits 2830 and 2850. The first register control decoder 2810 specifies the source register which contains data to be operated, the second register control decoder 2820 specifies the destination register in which the operation result is stored, and the operation circuit control decoder 2840 specifies the type of operation (addition, subtraction, logical sum, logical product, exclusive logical sum). It takes one clock period after a source register has been read until the result of operation is reached, and therefore the signal 2801 is delayed for one clock period by the delay circuit 2830. Because of different timing of use of the output signals 2841 and 2842 from the operation circuit control decoder 2840, the signal 2842 is delayed by the delay circuit 2850.

Figure 39:
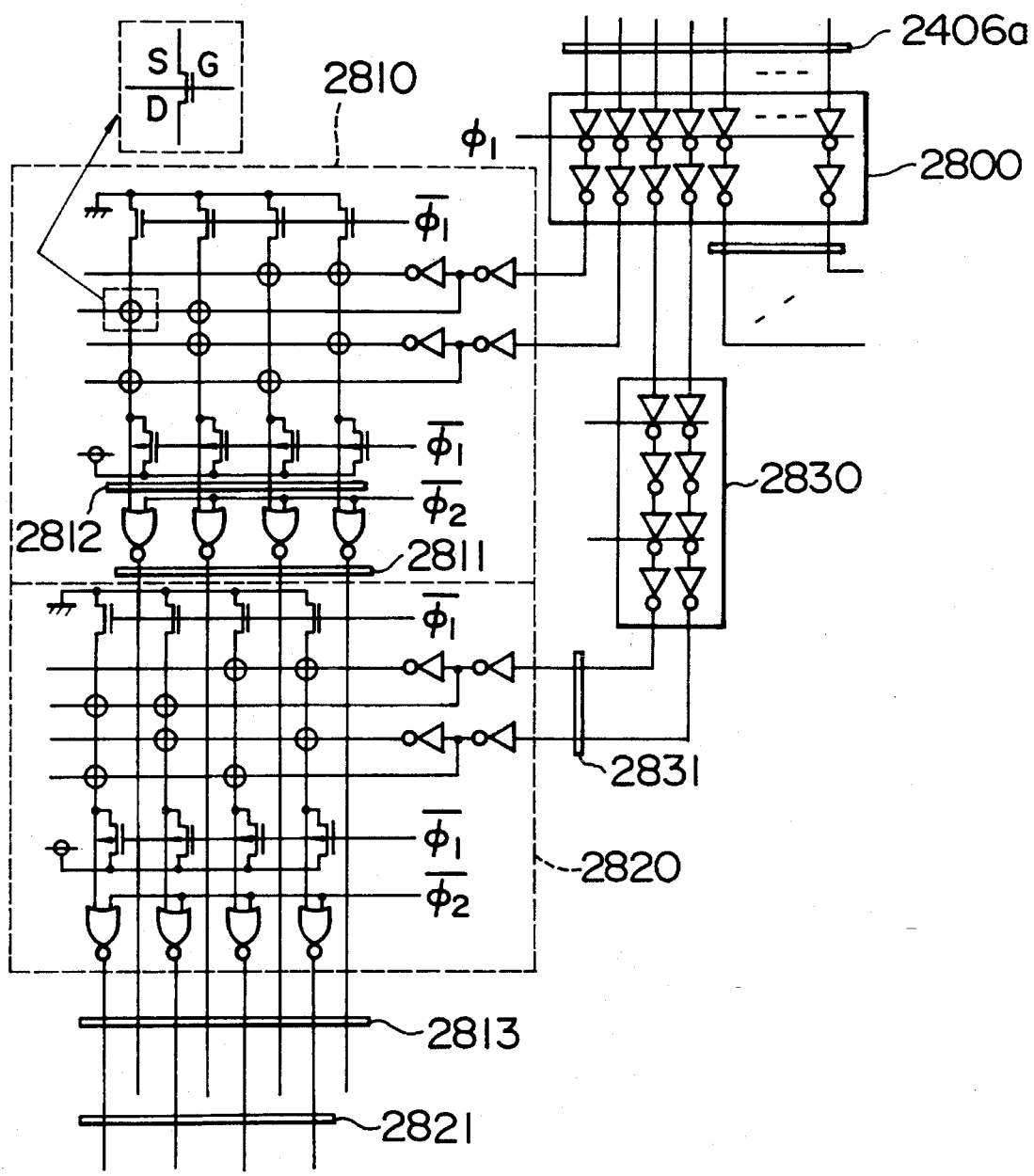
FIG. 39 is a schematic diagram showing an embodiment of the decoder control latch, first and second register control decoders and delay circuit shown in FIG. 38.

FIG. 39 shows an embodiment of the decoder control latch 2800, first register control decoder 2810, second register control decoder 2820 and delay circuit 2830 shown in FIG. 38. The most noticeable feature of this embodiment is that the first and second register control decoders 2810 and 2820 are arranged by AND-type dynamic PLAs, whose output lines 2812 are precharged using p-channel MOS transistors, a specific level (high level in this embodiment)

of the signals 2812 outputted during the precharging period is defined to be the unselected state for the input/output of the register, only signal lines 2812 which meet the PLA logic following the precharging period are discharged, and the register input/output lines 2813 are made the register selection stage.

Figure 40:
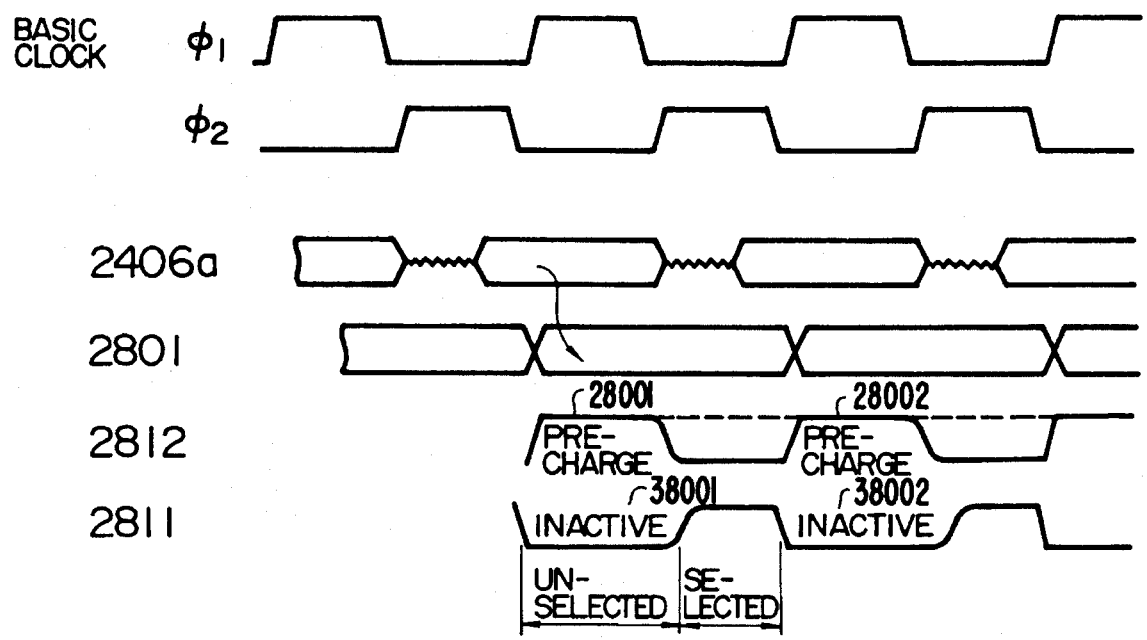
FIG. 40 is a timing chart showing the signals of the first register control recoder.

FIG. 40 shows the timing relationship of the signals of the first register control decoder 2810 in relation with the basic clocks. Precharges 28001 and 28002 are made in synchronism with the basic clock $\phi_2$. During the precharge periods 28001 and 28002, the signal line 28 11 is made inactive as shown in periods 28001 and 28002. It takes one clock period after the output 2801 of the decoder control unit 2800 has settled until the register contents are read out by the register read-out control signal 2811. This embodiment can be realized by hardware as little as about one third of the static PLA structure. Only selected ones of the signal lines 2812 carry discharge currents, which reduces the power dissipation, and the circuit is operative in the register access timing comparable to the conventional static decoder. When logical sum for the output lines of the PLA is required, it can be achieved by the wired-OR configuration for the output lines.

Figure 41:
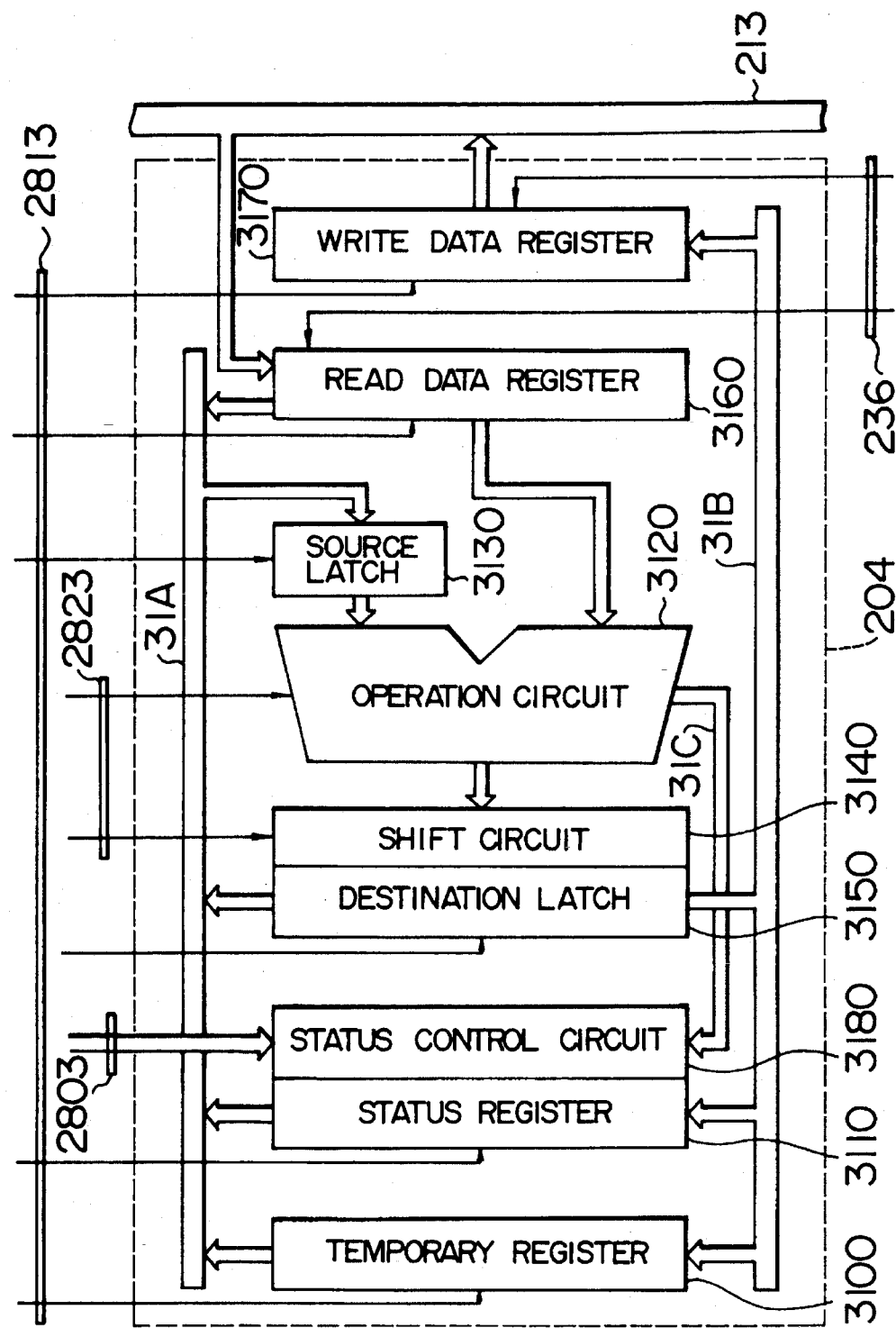
FIG. 41 is a block diagram showing an embodiment of the operation unit shown in FIG. 1.

FIG. 41 shows, as an example, the arrangement of the operation unit 204. The unit 204 consists of a temporary register 3100 for holding data, a status register 3110 for holding the state of the operation result, an operation circuit 3120, a source latch 3130 for temporarily holding data to be operated, a shift circuit 3140 operative to shift one bit right or left for the operation result, a destination latch 3150 for temporarily holding the operation result, a read data register 3160 for temporarily holding data read on the bus 213 and a write data register 3170 for temporarily holding data sent out over the bus 213.

Initially, one of operation data is fed over the bus 31A into the source latch 3130. The contents of the source latch 3130 and read data register 3160 are entered to the operation circuit 3120, which implements an operation specified on the signal line 2823. The result of operation is held temporarily in the destination latch 3150, and then it is fed over the bus 31B to a register specified by the signal 2813. Signals produced as a result of operation indicative of the sign of the result, the result of zero, the occurrence of carry (borrow), the occurrence of overflow are fed over the signal lines 31C into the status control circuit 3180, and then the states of the signals specified by the signal 2803 which is part of a microinstruction are stored in the status register 3110.

Figure 42:
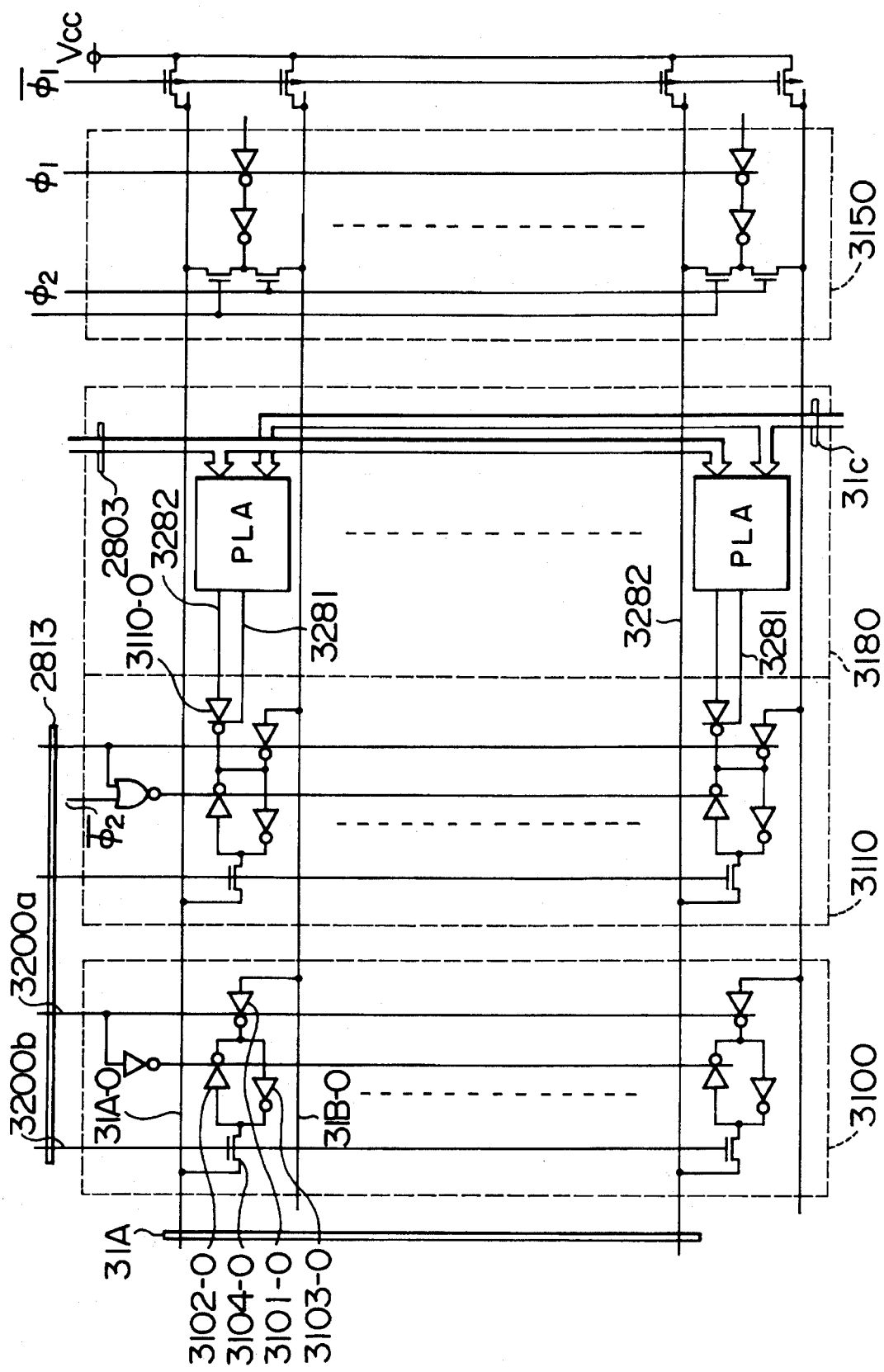
FIGS. 42, 43 and 44 are schematic diagrams of the functional blocks shown in FIG. 41.
Figure 43:
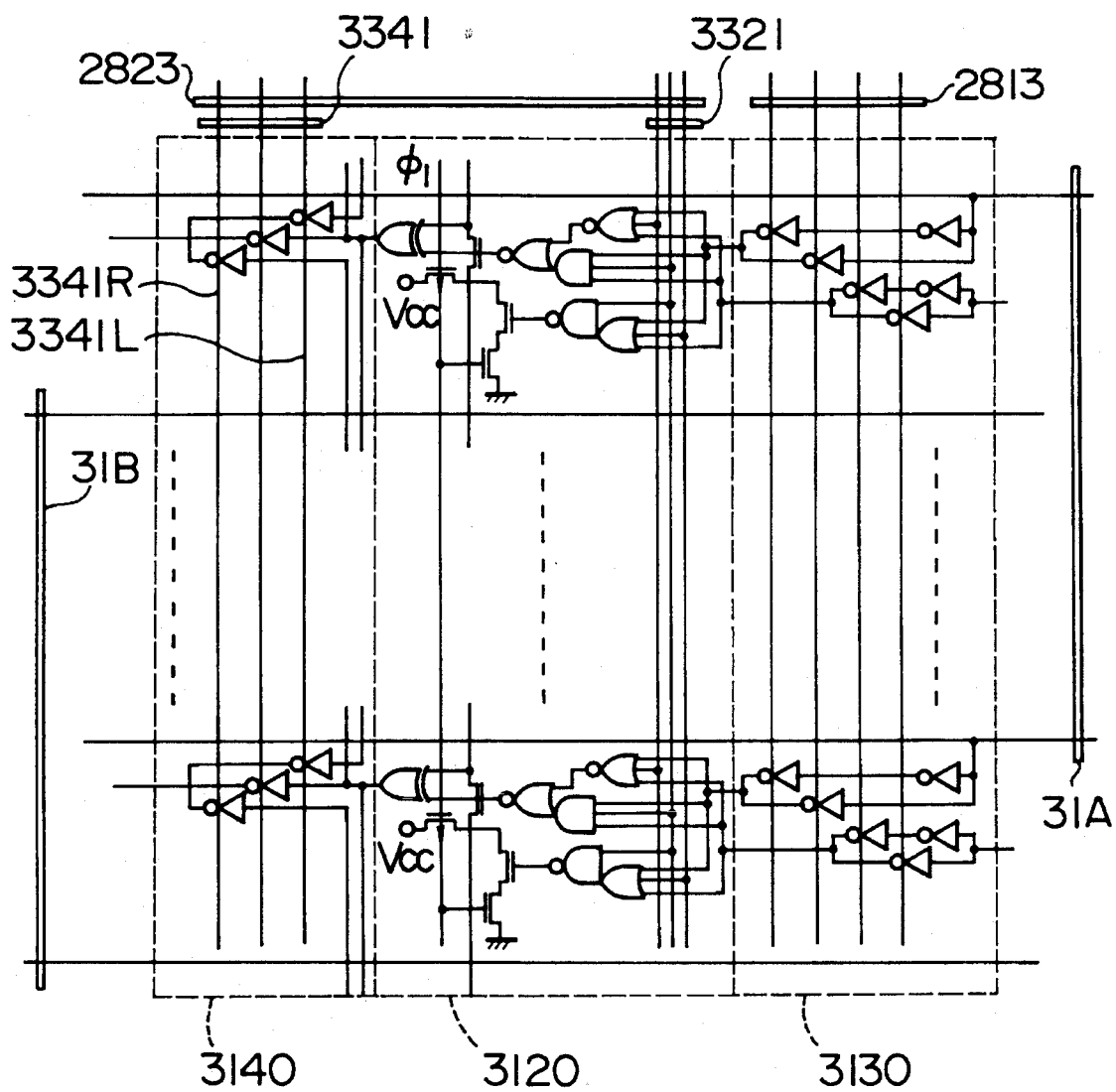
Figure 44:
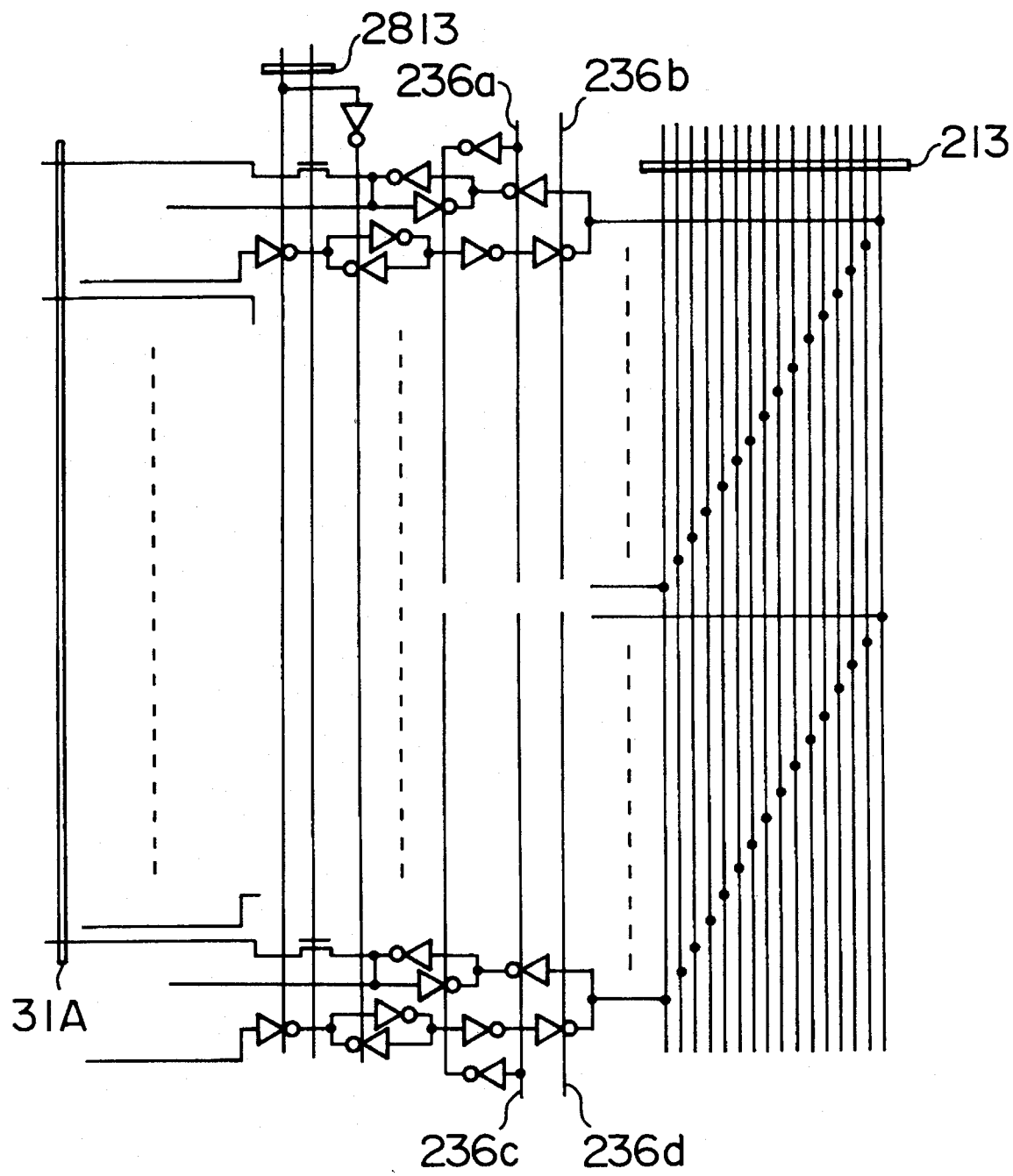

FIGS. 42, 43 and 44 are schematic diagrams showing an example of the functional blocks shown in FIG. 41. The buses 31A and 31B are precharged during a high period of the basic clock $\phi_1$ and they transfer data in a high period of the basic clock $\phi_2$.

(1) Bit arrangement of temporary register 3100

Each bit of the temporary register 3100, e.g., the lowest-order bit, is made up of a write gate 3101-0 connected to the bus 31B-0, a drive gate 3103-0, a feedback gate 3102-0, and a read gate 3104-0 connected to the bus 31A-0. The temporary register is written by making the control signal 3200a high so that data on the write bus 31B-0 is conducted through the write gate 3101-0, and it is read out by making the control signal 3200b high so that the output of the drive gate 3103-0 is conducted through the read gate 3104-0 onto the read bus 31A-0.

(2) Status control circuit 3180 and status register 3110

The status control circuit 3180 is formed of a PLA which receives the microinstruction 2803 and status information 31C reflecting the operation result, and produces the set signal 3281 written in the status register and data 3282 to be written. The status register 3110 is similar to the temporary register 3100, but has an additional input gate 3110-0 as shown for the lowest-order bit. It should be noted that the write operation of data 3282 through the gate 3110-0 takes place during the precharge period for the buses 31A and 31B in the operation unit 204.

(3) Source latch 3130

This is a dynamic latch for temporarily holding operation data, and it can receive data in inverted version in accordance with the control signal 2813.

(4) Operation circuit 3120

The circuit implements the addition, logical sum, logical product and exclusive logical sum operations in accordance with the control signals on three control lines 3321.

(5) Shift circuit 3140

The circuit shifts data by one bit right or left in accordance with the states of the signal lines 3341. A high state of signal line 3341R causes a right shift, while a high state of signal line 3341L causes a left shift.

(6) Destination latch 3150

This is a dynamic latch for temporarily holding the output of the shift circuit 3140, and it is the only source of data to the bus 31B.

(7) Read data register 3160 and write data register 3170

The read data register 3160 holds data on the bus 213 and transfers it to one input of the operation circuit 3120 or onto the bus 31A. The write data register 3170 holds data to be sent over the bus 213, and it receives data on the bus 31B which carries the operation result.

FIG. 44 shows the arrangement of the casw ehere the bus 213 has 16 bits and the read data register 3160 and write data register 3170 have 32 bits each. Control signals 236a, 236b, 236c and 236d for controlling the input/output to the bus 213 operate on the above two registers so that their high-order 16 bits and low-order 16 bits are controlled independently.

Figure 45:
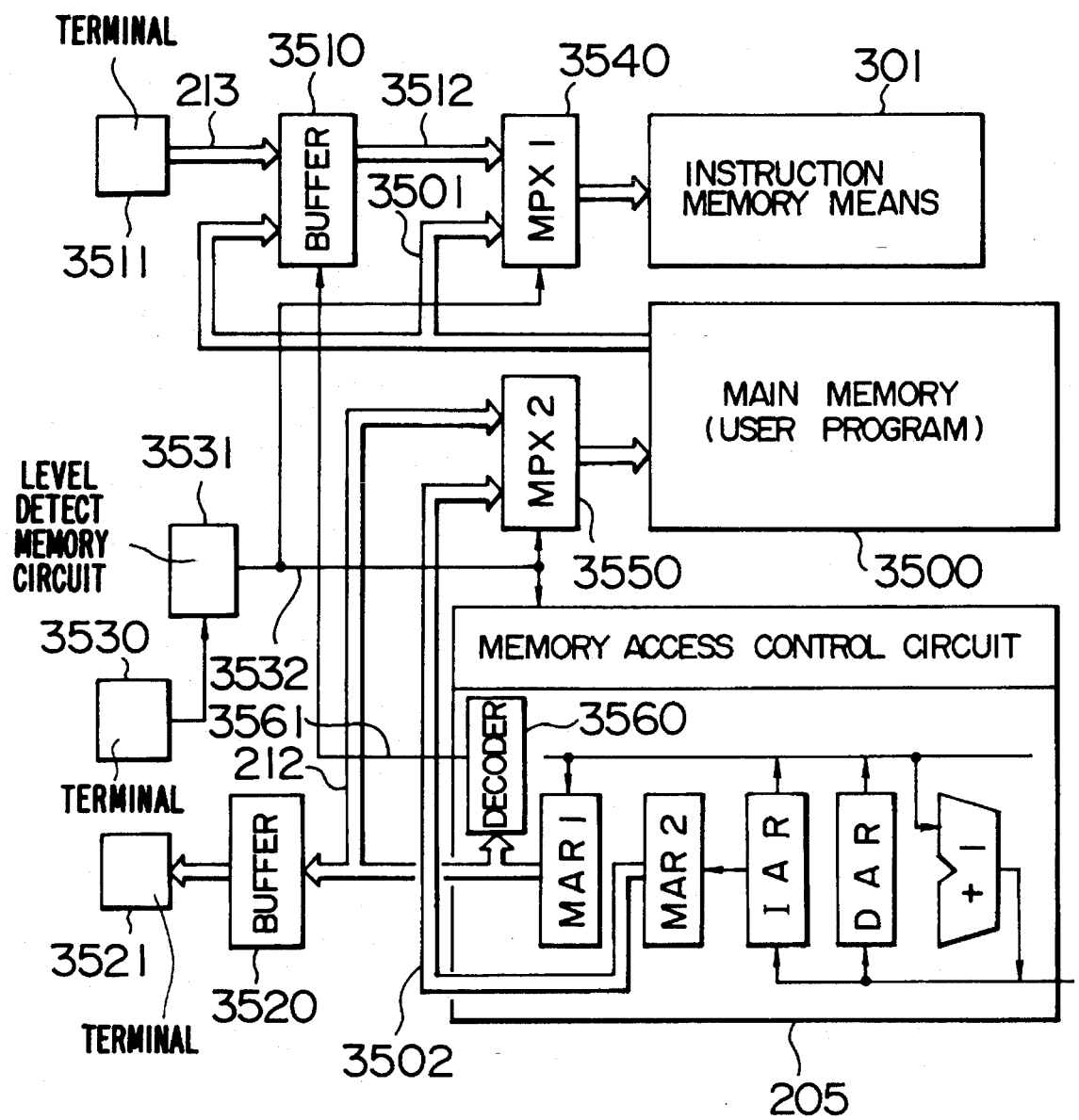
FIG. 45 is a block diagram showing an embodiment of the processor incorporating a main memory operative at least for reading.

FIG. 45 shows an embodiment of the processor 20 incorporating a main memory 3500 capable of access for at least reading. When the processor 20 is reset, a level detect/memory circuit 3531 detects and memorizes the level at terminal 3530. The operation of the processor 20 will be described for the following two cases.

(1) Operation when the level detect/memory circuit 3531 provides a low output 3532

The contents of the memory address register 1 (shown by MAR1 in FIG. 45) are fed over the bus 212 through the buffer 3520 to the terminal 3521. The multiplexer 2 (shown by MPX2 in the figure) 3550 selects the contents on the bus 212 and supplies a selected one to the main memory 3500. In case the value on the bus 212 indicates the address of the main memory outside of the processor 20, the buffer 3510 selects data on the bus 213 received at the terminal 3511. In another case when the bus 212 indicates the address of the main memory within the processor 20, the buffer 3510 selects data on the bus 3501. The buffer 3510 is controlled by the output 3561 of the decoder 3560 which discriminates whether the address carried by the bus 212 indicates the main memory 3500 in the processor 20. The output 3512 of the buffer 3510 is selected by the multiplexer 1 (shown by MPX1 in the figure) 3540 and sent to the instruction memory means 301.

(i) Instruction fetch

The contents of the instruction address register (IAR) are set in the memory address register 1 (MAR1) to read out the main memory.

(ii) Data read/write

The contents of the data address register (DAR) are set in the memory address register 1 (MAR1) to read or write the main memory. At this time, the data address register (DAR) contains the effective address which has been calculated by the operation unit 204.

(2) Operation when the level detect/memory circuit 3532 provides a high output 3532

(i) Instruction fetch

The contents of the instruction address register (IAR) are set in the memory address register 2 (MAR2) and transferred over the bus 3502 to the multiplexer 2 (MPX2) 3550. The multiplexer 2 (MPX2) selects the contents of the bus 3502 and supplies a selected one to the main memory 3500. The output of the main memory 3500 is fed over the bus 3501, selected by the multiplexer 1 (MPX1), and transferred to the instruction memory 301.

(ii) Data read/write

The effective address which has been calculated by the operation unit 204 and held in the data address register (DAR) is transferred to the memory address register 1 (MAR1) and transferred over the bus 212 to the buffer 3520. The contents of the buffer 3520 are fed through the terminal 3521 to the main memory outside of the processor 20. Data to be read or written is transacted through the terminal 3511 and bus 213 between the operation unit 204 in the processor 20 and the main memory outside of the processor 20 or the main memory in connection with the bus 213 within the processor 20. Namely, with the level detect/memory circuit 3531 providing a high output 3522, instruction fetching takes place with the main memory 3500 within the processor 20 and data reading/writing takes place with a main memory other than 3500. This concurrent operation for instruction fetching and data reading/writing is the feature of this embodiment, and it reduces the instruction processing time.

Figure 46:
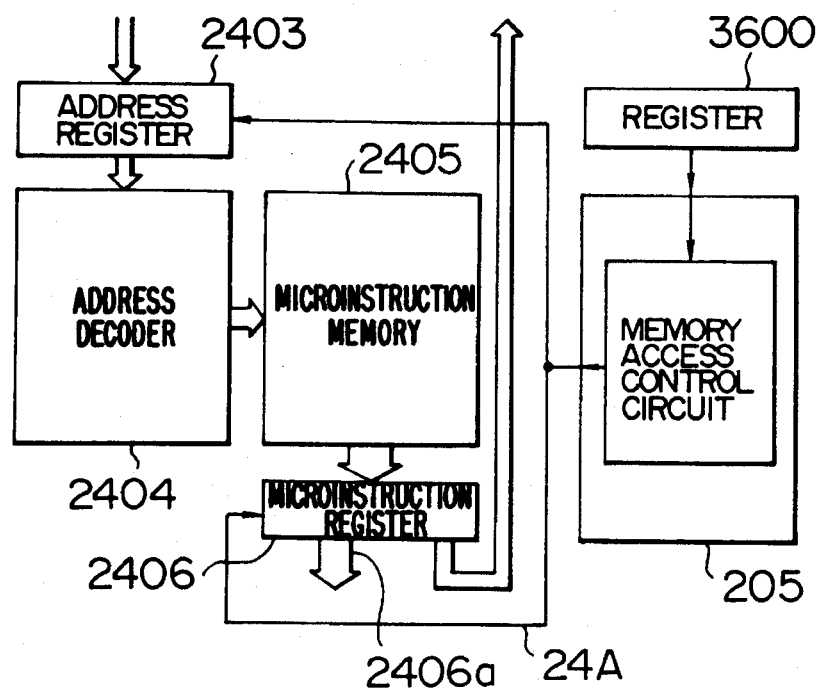

FIG. 46 shows an embodiment of the processor 20 which is operative in variable memory access cycles (instruction fetch cycle, data read cycle and data write cycle). The length of the memory access cycles is varied in accordance with the contents of the register 3600 which can be accessed for reading or writing by the instruction.

Figure 47:
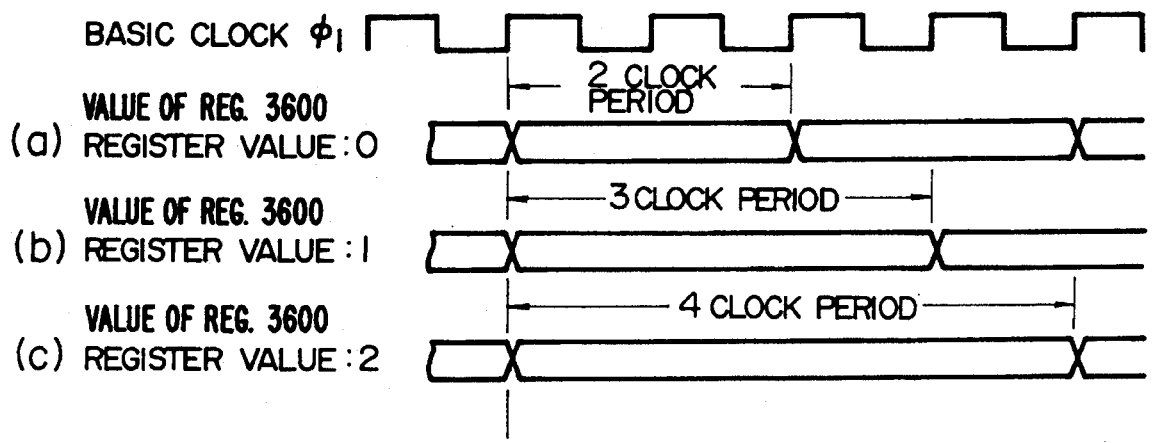
FIG. 47 is a timing chart showing the operations of the processor shown in FIG. 46 in various number of memory access cycles.

FIG. 47 shows, as an example, memory access cycles determined by the values of the register 3600. Register contents "0" shown in FIG. 47 (a) achieves the fastest memory access. By constructing the microprogram memory/control unit 202 to suit this case, or by halting the operation for one clock period by issuing a signal 24A from the memory access control circuit to the microprogram memory/control unit 202 for the case of register contents "1", a 3-clock memory access can be realized. Namely, according to this embodiment, the access cycle of the main memory used in combination with the processor 20 can be varied by setting the register using the instruction, whereby the system can be adapted to the variation of access cycle which results from the change in the main memory used, without adding extra control circuits outside of the processor 20.

While particular embodiments of the invention have been shown and described, it will be obvious to those skilled in the art that various changes and modifications may be made without departing from the present invention in its broader aspect.

We claim:

1. A data processing system in which at least one of a plurality of instruction words including operation information for specifying an operation to be executed is an instruction word including at least one piece of operand specifying information for identifying a location of a main memory at which an operand is contained, said operand being processed in response to said instruction word, said system comprising:

a) instruction word memory means for storing at least one instruction word obtained by one reading operation of said main memory;

b) first instruction decoding means connected to said instruction word memory means for arranging an instruction word read out of said instruction word memory means into an intermediate machine word, said intermediate machine word including first information having an operation code for specifying the operation to be executed and an operand specifier code which identifies the location in said main memory where said operand is contained and second information other than said first information and outputting said intermediate machine word;

c) second memory means connected to said first instruction decoding means for storing an intermediate machine word outputted by said first instruction decoding means; and d) second instruction decoding means, connected to said second memory means, for decoding the content of said second memory means, said second instruction decoding means including a microinstruction decoder for decoding an intermediate machine word read from said second memory means into a microinstruction based on said first information in said intermediate machine word and a control signal decoder, responsive to said microinstruction generated by said microinstruction decoder, for decoding said second information in said intermediate machine word into a control signal for controlling an operation unit, said operation unit performing operations based on said operation information.

2. A data processing system according to claim 1, wherein said first instruction decoding means is connected to said instruction word memory means and detects positions of operation information and operand designating information included in an instruction word and extracts the operation information and operand specifying information separately; and said second memory means is connected to said instruction word memory means and has predetermined bit positions for storing the operation information and operand specifying information.

3. A data processing system according to claim 2, wherein said first instruction decoding means comprises:

a first bus for transferring information which has been extracted and arranged for storing operation information and operand specifying information included in an instruction word read out of said main memory in said predetermined bit positions of said second memory means;

a second bus for connecting said second memory means with said main memory;

a multiplexer operative to select one of said first bus and said second bus; and a control circuit operative to control said multiplexer.

4. A data processing system according to claim 3, wherein said control means controls said control multiplexer by executing an instruction in said main memory or an instruction supplied from outside said system.

5. A data processing system according to claim 3, wherein said main memory for storing instructions and operands and said data processing system are constructed on a single semiconductor substrate.

6. A data processing system according to claim 1, wherein said main memory has contents expressed in instruction words having at least two kinds of instruction formats of different instruction binary codes even though instruction functions of said instruction words are equal;

said first instruction decoding means includes a plurality of instruction decoding means connected to said instruction word memory means for detecting positions of operation information and operand specifying information included in an instruction word, and extracting operation information and operand specifying information separately, said plurality of instruction decoding means corresponding to a plurality of instruction formats of instruction words in said main memory, a multiplexer for selecting one of a plurality of outputs corresponding to said plurality of instruction decoding means, and control means for controlling said multiplexer; and wherein said operand is processed in response to said instruction words having at least two instruction formats.

7. A data processing system according to claim 6, wherein said control means controls said multiplexer by executing an instruction in said main memory or an instruction supplied from outside said system.

8. A data processing system according to claim 1, wherein said instruction word memory means sequentially stores at least one instruction word in instruction words read successively from said main memory, said instruction word memory means comprises a memory section for storing an instruction word and a control section for controlling the data read/write operation for operation for said memory section, said instruction word memory means being capable of reading out data in a data length half a data length used in a single write operation.

9. A data processing system according to claim 8, wherein said memory control section is formed of a programmable logic array.

10. A data processing system in which at least one of a plurality of instruction words including operation information for specifying an operation to be executed is an instruction word including at least one piece of operand specifying information for identifying a location of a main memory at which an operand is contained, said operand being processed in response to said instruction word, said system comprising:

a) instruction word memory means for storing at least one instruction word obtained by one reading operation of said main memory;

b) first instruction decoding means connected to said instruction word memory means for arranging an instruction word read out of said instruction word memory means into an intermediate machine word having an operation code for specifying the operation to be executed and information bits representing an operand specifier code which identifies the location in said main memory where said operand is contained and outputting said intermediate machine word;

c) second memory means connected to said first instruction decoding means wherein said second memory means stores an intermediate machine word outputted by said first instruction decoding means; and d) second instruction decoding means, connected to said second memory means, for decoding the content of said second memory means to generate a signal for controlling an operation unit, said operation unit performing operations based on said operation information;

wherein said first instruction decoding means is connected to said instruction word memory means and generates addresses of a microprogram memory by decoding said instruction word, said first instruction decoding means comprises:

code collation means for collating an instruction code with predetermined information to detect the coincidence, code arrangement information memory means which received a result from said code collation means and defines arrangement information for changing whole or part of the instruction code, and arranging means connected to said code arrangement information memory means for arranging the instruction code in accordance with said arrangement information, wherein a result from said arranging means in correspondence to said instruction code being an address of said microprogram memory.

11. A data processing system according to claim 10, wherein at least one of said code collation means and code arrangement information memory means is formed of a programmable logic array.

12. A data processing system according to claim 10, wherein said code collation means if formed of a random access read/write memory constructed of memory cells capable of detecting coincidence of a memorized value with a value on data lines.

13. A data processor in which at least one of a plurality of instruction words inputted thereto including operation information for specifying an operation to be executed is an instruction word including at least one piece of operand specifying information for identifying a location of a main memory at which an operand is contained, said operand being processed in response to said instruction word, comprising:

a) first instruction decoder for arranging an instruction word into an intermediate machine word, said intermediate machine word including first information having an operation code for specifying the operation to be executed and an operand specifier code which identifies the location in the main memory where said operand is contained and second information other than said first information and outputting said intermediate machine word; and b) a second instruction decoder including a microinstruction decoder for decoding said intermediate machine word into a microinstruction based on said first information in said intermediate machine word and a control signal decoder, responsive to said microinstruction generated by said microinstruction decoder, for decoding said second information in said intermediate machine word into a control signal for controlling an operation unit, said operation unit performing operations based on said operation code.

14. A data processor according to claim 13, wherein said first instruction decoder is connected to an instruction word register and detects positions of operation information and operand designating information included in an instruction word and extracts the operation information and operand specifying information separately; and a second register is connected to said instruction word register and has predetermined bit positions for storing the operation information and operand specifying information.

15. A data processor according to claim 14, wherein said first instruction decoder comprises:

a first bus for transferring information which has been extracted and arranged for storing operation information and operand specifying information included in an instruction word read out of said main memory in said predetermined bit positions of said second register;

a second bus for connecting said second register with said main memory;

a multiplexer operative to select one of said first bus and said second bus; and a control circuit operative to control said multiplexer.

16. A data processor according to claim 15, wherein said control means controls said multiplexer by executing an instruction in said main memory or an instruction supplied from outside said processor.

17. A data processor according to claim 15, wherein said main memory for storing instructions and operands and said data processor are constructed on a single semiconductor substrate.

18. A data processor according to claim 13, wherein said main memory has contents expressed in instruction words having at least two kinds of instruction formats of different instruction binary codes even though instruction functions of said instruction words are equal;

said first instruction decoder includes:

a plurality of instruction decoders connected to an instruction word register for detecting positions of operation information and operand specifying information included in an instruction word, and extracting operation information and operand specifying information separately, said plurality of instruction decoders corresponding to a plurality of instruction formats of instruction words in said main memory, a multiplexer for selecting one of a plurality of outputs corresponding to said plurality of instruction decoding means, and a control unit for controlling said multiplexer; and wherein said operand is processed in response to said instruction words having at least two instruction formats.

19. A data processor according to claim 18, wherein said control means controls said multiplexer by executing an instruction in said main memory or an instruction supplied from outside said system.

20. A data processor according to claim 13, wherein an instruction word memory register connected to said first instruction decoder sequentially stores at least one instruction word in instruction words read successively from said main memory, said instruction word memory register comprises a register section for storing an instruction word and a control section for controlling the data read/write operation for operation for said register section, said instruction word register being capable of reading out data in a data length half a data length used in a single write operation.

21. A data processor according to claim 20, wherein said register control section is formed of a programmable logic array.

22. A data processor in which at least one of a plurality of instruction words inputted thereto including operation information for specifying an operation to be executed is an instruction word including at least one piece of operand specifying information for identifying a location of a main memory at which an operand is contained, said operand being processed in response to said instruction word, comprising:

a) first instruction decoder for arranging an instruction word into an intermediate machine word having an operation code for specifying the operation to be executed and information bits representing an operand specifier code which identifies the location in the main memory where said operand is contained and outputting said intermediate machine word; and b) a second instruction decoder for decoding said intermediate machine word to generate a signal for controlling an operation unit, said operation unit performing operations based on said operation code;

wherein said first instruction decoder is connected to an instruction word register and generates addresses of a microprogram memory by decoding said instruction word, said first instruction decoder comprises:

a code collation unit for collating an instruction code with predetermined information to detect the coincidence, a code arrangement information register which received a result from said code collation unit and defines arrangement information for changing whole or part of the instruction code, and an arranging unit connected to said code arrangement information register for arranging the instruction code in accordance with said arrangement information, wherein a result from said arranging unit in correspondence to said instruction code being an address of said microprogram memory.

23. A data processor according to claim 22, wherein at least one of said code collation unit and code arrangement information register is formed of a programmable logic array.

24. A data processor according to claim 22, wherein said code collation unit is formed of a random access read/write memory constructed of memory cells capable of detecting coincidence of a memorized value with a value on data lines.

* * * * *